United States Patent [19]

Waugh et al.

[11] Patent Number: 4,858,119
[45] Date of Patent: Aug. 15, 1989

[54] INTELLIGENT COOKING APPLIANCE

[75] Inventors: Gerald Waugh; Charley Myers; John Davis; John Sullivan, all of Shreveport, La.

[73] Assignee: The Frymaster Corporation, Shreveport, La.

[21] Appl. No.: 29,524

[22] Filed: Mar. 23, 1987

Related U.S. Application Data

[63] Continuation of Ser. No. 512,204, Jul. 8, 1983, Pat. No. 4,663,710, which is a continuation-in-part of Ser. No. 264,173, May 15, 1981, Pat. No. 4,437,159.

[51] Int. Cl.[4] ............................................. G06F 15/20
[52] U.S. Cl. .................................. 364/400; 364/557; 219/492
[58] Field of Search ............... 364/400, 87, 400, 557, 364/143, 146, 192, 154, 189; 219/492, 494, 442; 99/327, 332

[56] References Cited

U.S. PATENT DOCUMENTS

| | | | |
|---|---|---|---|
| 3,979,056 | 9/1976 | Barnes | 235/92 |
| 4,197,581 | 4/1980 | Watrous et al. | 364/400 |
| 4,278,872 | 7/1981 | Koether et al. | 219/497 |
| 4,362,094 | 12/1982 | Polster | 99/342 |
| 4,377,733 | 3/1983 | Yamaguchi | 219/10.55 B |
| 4,437,159 | 3/1984 | Waugh | 364/400 |
| 4,601,004 | 7/1986 | Holt et al. | 364/557 |
| 4,636,949 | 1/1987 | Longabaugh | 364/400 |
| 4,663,710 | 5/1987 | Waugh et al. | 364/400 |
| 4,672,540 | 6/1987 | Waugh et al. | 364/400 |
| 4,740,888 | 4/1988 | Ceste, Sr. et al. | 364/557 X |

Primary Examiner—Jerry Smith
Assistant Examiner—Charles B. Meyer
Attorney, Agent, or Firm—Hubbard, Thurman, Turner & Tucker

[57] ABSTRACT

A cooking appliance includes a heating source to provide heat to a cooking medium for cooking food, temperature sensing circuitry for detecting the cooking medium temperature and control circuitry connected to the temperature sensing circuitry for cooking the food according to data stored in the control circuitry by controlling the heating source and removing the food from the cooking medium in accordance with the data. A temperature sensing apparatus is also disclosed that includes a temperature probe for measuring temperature and a reference circuit indicating a referenced temperature. Circuitry is alternately connected to the temperature probe and the reference circuit for alternately providing a first and second output signal indicative of the measured temperature and the referenced temperature respectively. Data processing circuitry is also provided that receives the output signals and computes the measured temperature from the first and second output signals.

37 Claims, 60 Drawing Sheets

FIG. 6d
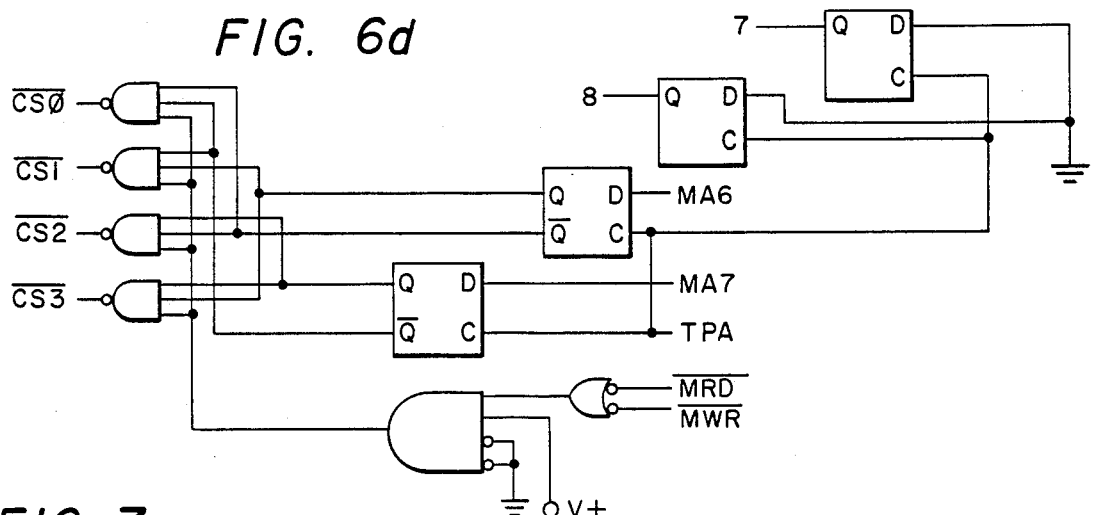
FIG. 7
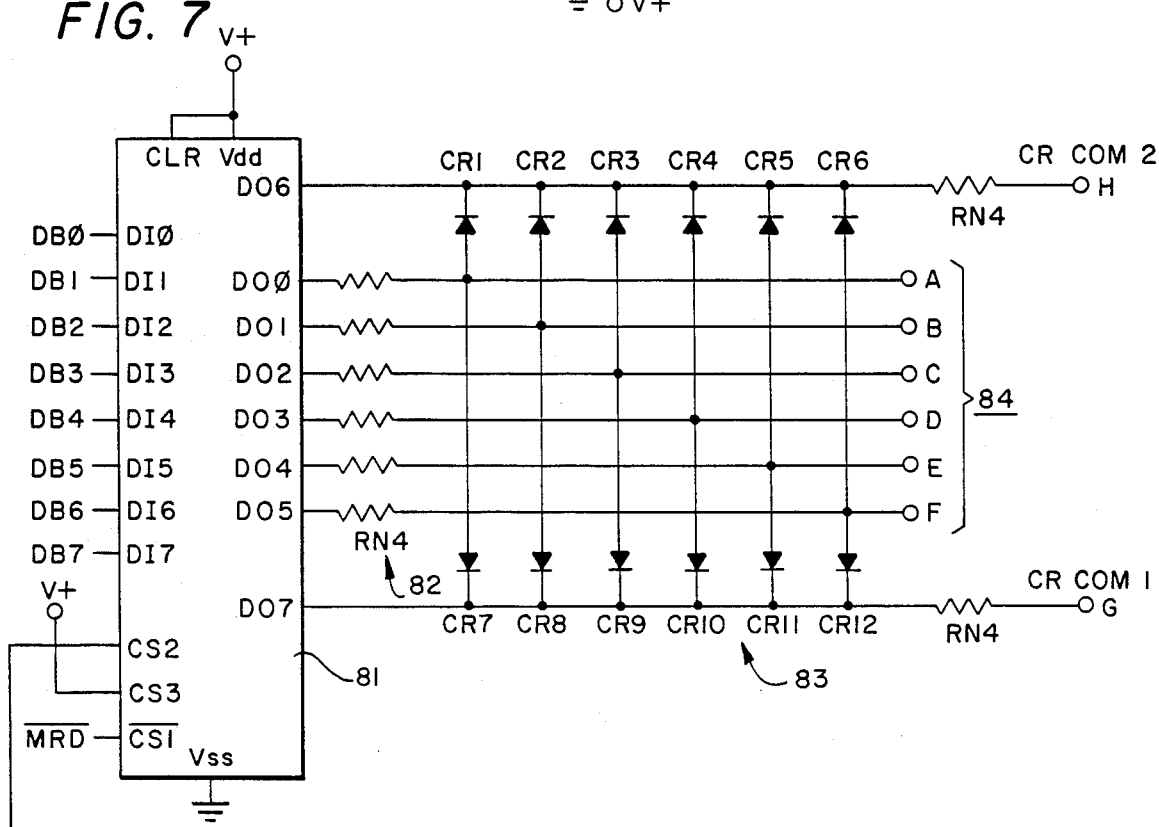
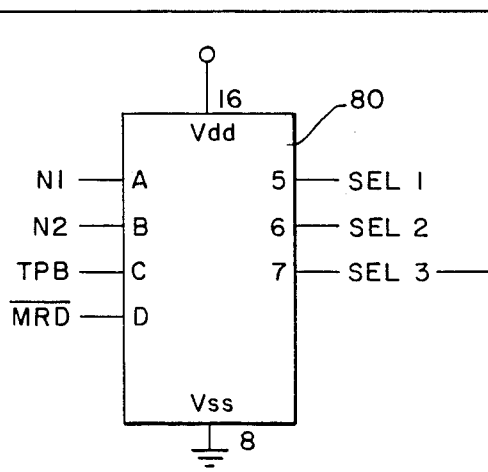

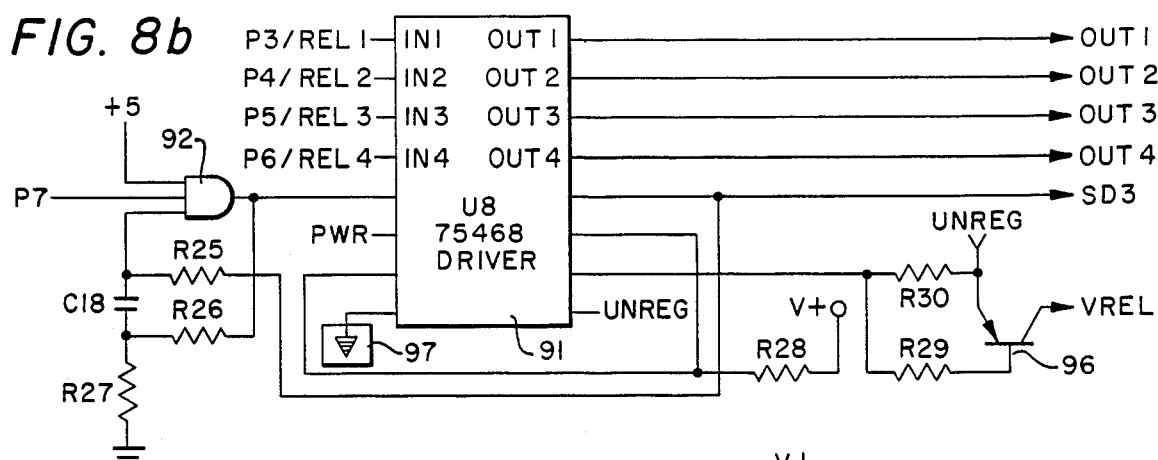
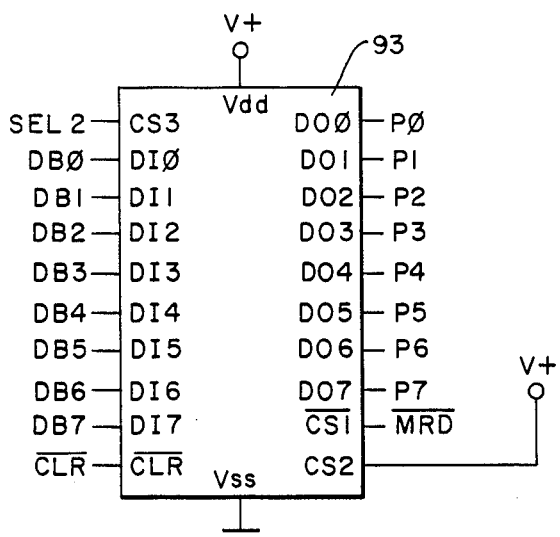
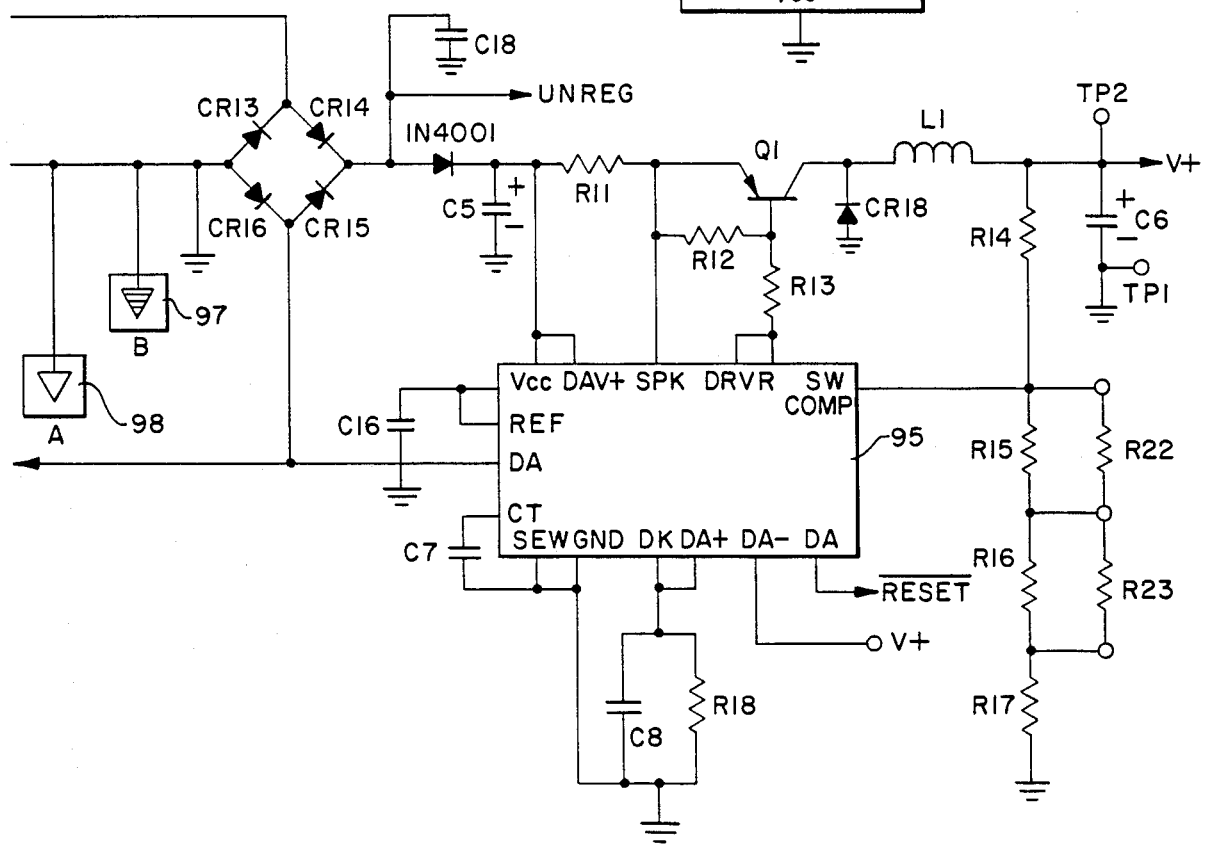

1-12 VAC (IN)
2-PROBE COMM
3-12 VAC (IN)
4-HI-LIMIT 1
5-HI-LIMIT 2
6-PROBE
7-BASKET NO.
8-24 VAC
9-VALVE
10-BASKET-NC
11-116 VAC COMM
12-BLOWER 1-12 VAC (OUT)
2-COMM
3-12 VAC (OUT)
4-R PWR
5-V RELAY
6-Z FOUR
7-R BASKET
8-SD1
9-L BASKET
10-R ALARM
11-SD2
12-L ALARM
13-R PROBE
14-PROBE COMM
15-L PROBE

2-PROBE COMM
4-HI-LIMIT 1
5-HI-LIMIT 2
6-PROBE
7-BASKET NO
8-24 VAC
9-VALVE
10-BASKET NC

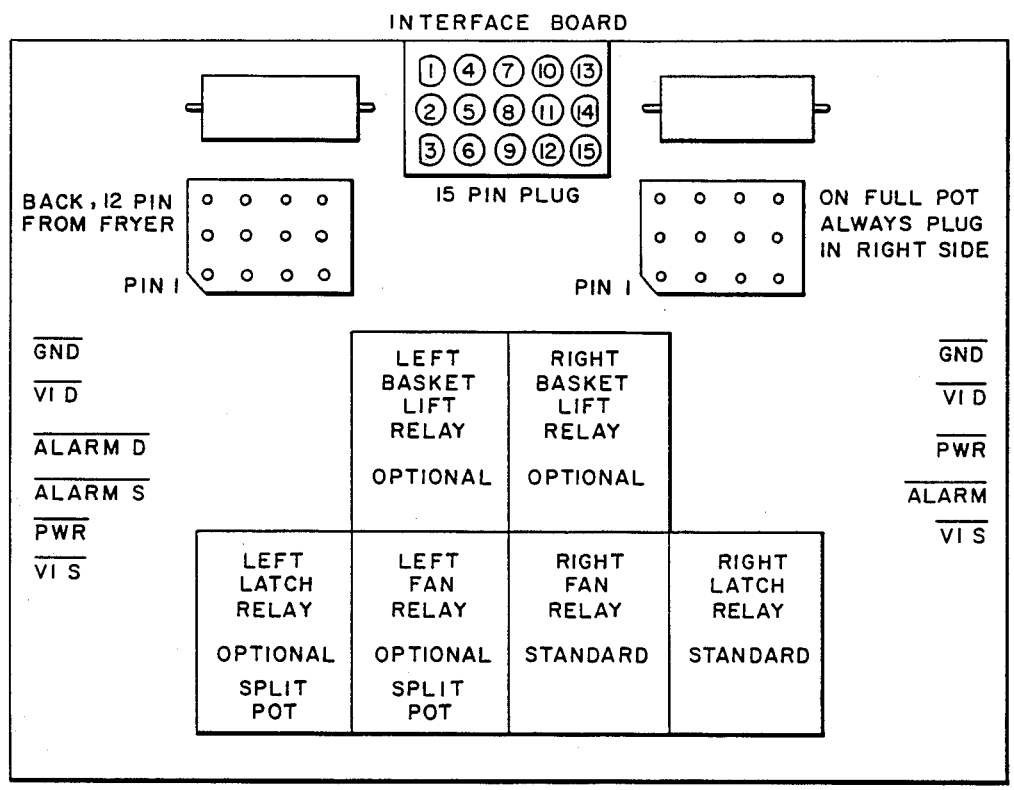

FIG. 14d

FOR FULL POT ONLY (1) CONNECT WIRE 12C TO PIN 9 ON RIGHT 12 PIN CONNECTOR (2) OMIT RIGHT GAS VALVE, WIRE 13C AND WIRE 22C (3) ON LEFT IGNITION MODULE
    (A) CONNECT WIRE 3C TO VI S INSTEAD OF VI D
    (B) CONNECT WIRE 4C TO ALARM S INSTEAD OF ALARM D (4) ON RIGHT IGNITION MODULE
    (A) CONNECT WIRE 8C TO VI S INSTEAD OF VI D (5) OMIT LEFT OPERATING PROBE AND HI LIMIT TSTAT

\* NOTE

FOR NON BASKET LIFT APPLICATIONS (1) CONNECT WIRE 26C FROM PIN 8 (8 PIN TERMINAL BLOCK) DIRECT TO CORD SET (2) CONNECT WIRE 27C FROM PIN 4 (8 PIN TERMINAL BLOCK) DIRECT TO CORD SET

4,858,119

INTELLIGENT COOKING APPLIANCE

RELATED CASE

This is a continuation of application Ser. No. 512,204, filed July 8, 1983, now U.S. Pat. No. 4,663,710 which is a continuation-in-part of U.S. Patent Application Ser. No. 264,173, now U.S. Pat. No. 4,437,159.

BACKGROUND OF THE INVENTION

1. Field of the Invention

This invention relates to cooking devices and more specifically to programmable cooking devices.

2. Description of the Prior Art

There has been for a long time a need for a device to control precisely cooking of foods in deep fat fryers precisely and easily. A number of approaches have been developed in the prior art.

U.S. Pat. No. 3,979,056 to Barnes for a multi-Product Cooking Computer discloses an electronic circuit having a timer controlled in part by a temperature probe submerged within heated oil or shortening in a deep fat fryer well. The temperature probe controls the rate of oscillation of an oscillator 22. Oscillator 22 drives a counter 24. When counter 24 counts a predetermined number of oscillations of oscillator 22, an output signal is provided indicating that cooking has been completed. In other words Barnes employs a temperature adjusted oscillator to perform a type of time-temperature cooking integration. Barnes also provides a plurality of product selected switches which connect different resistences in series with a capacitor 68 to control the period of the oscillator. However, should it become necessary to adjust the time for which a particular product selection is cooked, internal adjustments of a mechanical or electronic nature would have to be made to the circuit.

Another approach was taken in U.S. Pat. No. 4,197,581 to Watrous et al, for a control system for a method of controlling a cooking appliance. Watrous teaches the use of a combination micro-computer controller having associated circuitry for controlling a deep fat fryer. Watrous, preloads timing counters from a diode matrices. Watrous like Barnes, employs a temperature variable frequency oscillator but uses it to actuate computer counters. The variable frequency oscillator of Watrous is controlled by a cooking control probe R801 so that as the probe, which is submerged in heating oil, becomes warmer, the oscillator runs faster. There is no provision in Watrous for altering the pre-load cooking counter without rewiring a circuit board.

SUMMARY OF THE INVENTION

In accordance with the present invention a cooking appliance is provided that includes a heating source to provide heat to a cooking medium for cooking food. A temperature sensing circuit is further provided for detecting the cooking medium temperature. Control circuitry is provided that is connected to the temperature sensing circuit for cooking the food according to data stored in the control circuitry and by controlling the heating source and removing the food from the cooking medium in accordance with the data.

In an embodiment of the present invention a cooking appliance is provided that includes the heat source to provide heat to a cooking medium of cooking oil or shortening. A temperature sensing circuit is provided for detecting the temperature of the cooking oil. Control circuitry is further provided that is connected to the temperature sensing circuit for cooking the food according to data stored in the control circuitry. The control circuitry further includes input storage circuitry that allows the user to input the cooking data. The control circuitry further includes data processing circuitry to compute the cooking time and the cooking temperature in accordance with an algorithm stored in the control circuitry and with the user entered and stored cooking data. In this preferred embodiment the input storage circuitry includes a non-volatile random access memory for storing the user input cookig data. The control circuitry further includes an output display to the user that includes both a visible indicia and an audio indicia. The control circuit further includes a cooking sensitivity input that allows the user to alter the computation of the cooking temperature by the algorithm stored in the control circuitry. This control circuitry further includes a protective circuit to protect the cooking data from being accessed by unauthorized persons.

Also in accordance with the present invention a temperature sensing apparatus is provided that includes a temperature probe for measuring temperature, a reference circuit indicating a reference temperature, and a circuit that is alternately connected to the temperature probe and to the reference circuit for alternately providing first and second output signals indicative of the measured temperature and the reference temperature respectively. Further provided is data processing circuitry for receiving the output signals and computing the measured temperature from the first and second output signals.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 6D is a schematic diagram of the address select logic.

FIG. 7 is a schematic diagram of the product display circuitry.

FIG. 8B is a schematic diagram of the driving circuit for the discreet light emitting diodes.

FIG. 8C is a schematic diagram of the driving circuits for the discreet outputs.

FIG. 9 is a schematic diagram of the power supply.

DESCRIPTION OF THE PREFERRED EMBODIMENT

Figure 1:
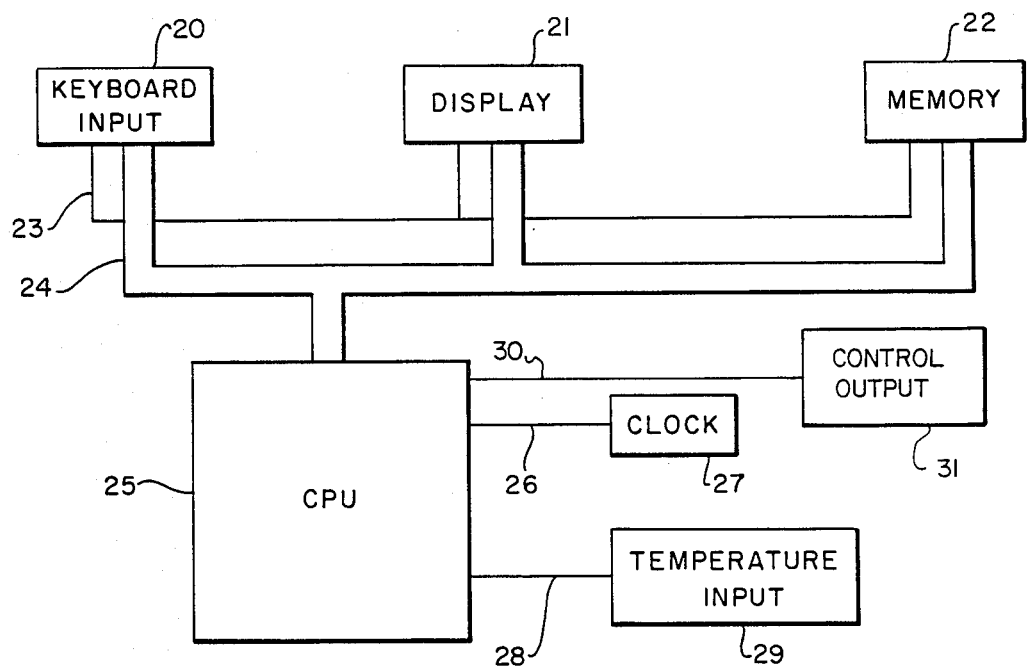
FIG. 1 is a block diagram of the cooking appliance controlling circuits.

FIG. 1 illustrates a controller for an automatic cooking appliance. The central processing unit (CPU) 25 is the intelligence of the controller. CPU 25 is connected to clock 27 by lines 26 which provide the timing signals for the internal operations of the CPU 25. CPU 25 is also connected to the temperature input 29 by a line 28. Temperature input 29 provides the temperature of the cooking medium to the CPU 25. CPU 25 is also connected to the keyboard input 20 via lines 23 and 24. Lines 23 represent control and discreet lines that connect the CPU 25 to the different peripheral devices. Lines 24 are address and data lines for the transfer of address and data information to and from the CPU 25. The keyboard input 20 provides the user input to the CPU 25. CPU 25 is also connected to the display 21 to display an output to the user. CPU 25 is further connected to memory 22. Memory 22 stores permanent program data in addition with user entered cooking data and provides temporary storage. CPU 25 is further connected to control output circuitry 31 via lines 30. The control output circuitry 31 provides the external control functions to control the cooking of the food in accordance with the data stored in memory 22.

Figure 2:
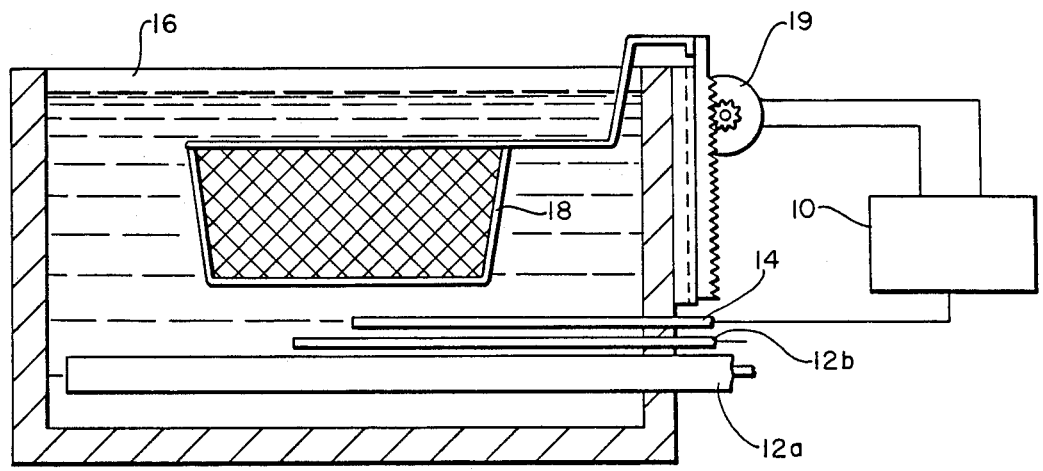
FIG. 2 is a side sectional view of the cooking appliance.

FIG. 2 illustrates the one embodiment of the present invention. Vat 16 contains a cooking oil or cooking shortening provided to cook food that is placed inside basket 18. This deep fat frying mechanism is used to fry foods. Controller 10 controls not only the cooking temperature of the oil in vat 16 but also the time of the food that is cooked in basket 18 by raising and lowering basket 18 via motor and gear mechanism 19. Controller 10 is further connected to a temperature sensing device 14. Device 12A is a heating element that in the preferred embodiment of the invention is a gas fired element to provide heat to the oil in vat 16. Device 12B is a thermostat control for the heating element 12A.

Figure 3:
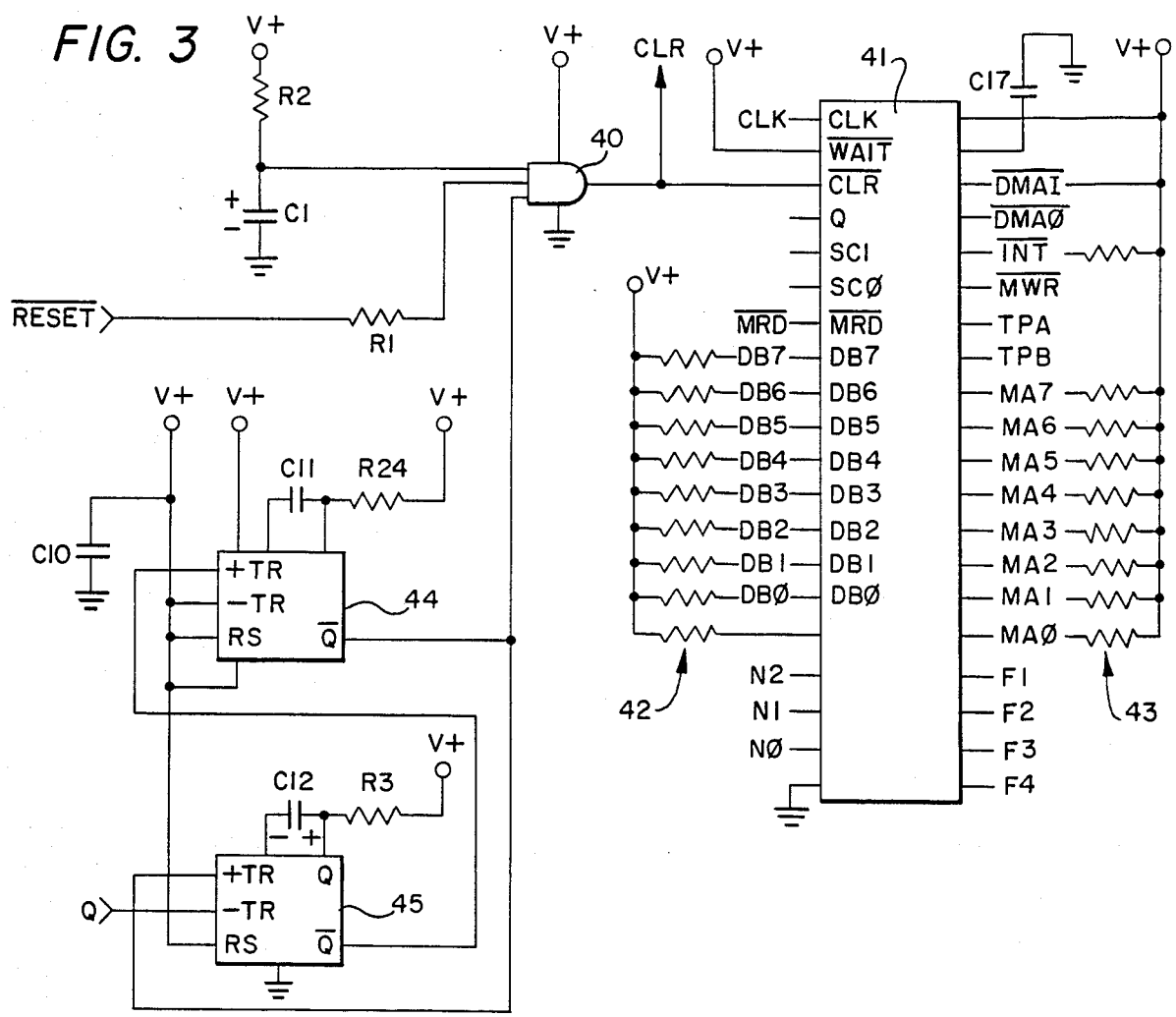
FIG. 3 is a schematic diagram of the central processing unit.

The CPU 25 of FIG. 1 is illustrated in FIG. 3. FIG. 3 illustrates the microprocessor semiconductor device 41 connected to a watchdog timer circuit consisting of flip-flops 44 and 45. In the preferred embodiment the microprocessor is an RCA 1802 CMOS microprocessor. The CMOS microprocessor is provided to reduce the heat dissipated by the controlling device. Microprocessor 41 is connected to a network of resistors for the data input on the lines as indicated. A reset signal provided by the user is connected to an AND gate 40 that provides the reset or clear function to the microprocessor 41. The R2 and C2 network insure that power has been applied for a specific time before AND gate 40 resets CPU 41. Microprocessor 41 provides data via the data lines DB0 to DB7 and addresses via address lines MA0 to MA7. It should be noted that the address lines are multiplexed in the 1802 (i.e. line MA0 to MA7 contain a 16 bit address). Resistor networks 42 and 43 are provided as pull-up resistors for the data and address lines. Flag F1 through F4 are inputs from the keyboard. N0 to N2 are programmed inputs input/output (I/O) lines. MRD- and MWR- provide the memory read memory and memory write signals, respectively. INT- is the timer interrupt. DMA0- is the input from the temperature sensing circuitry. Q is provided by the microprocessor 41 to the temperature sensor to initiate the temperature input sequence. Q is also used by the watchdog timer for initialization. SC0 through SC1 (synchronous codes) are provided to peripheral devices to indicate the state of microprocessor 41. The watchdog timer circuit consisting of flip-flops 44 and 45 is a two flip-flop timing circuit provided to reset the microprocessor 41 via AND gate 40 if the Q signal is not received within a specified time. This specific time is provided by the time constant of C11. Many of the devices used in this embodiment are from the RCA CMOS microprocessor family. Specification information of the CDP 1802, CDP 1866 and CDP 1875 is incorporated by reference.

Figure 4:
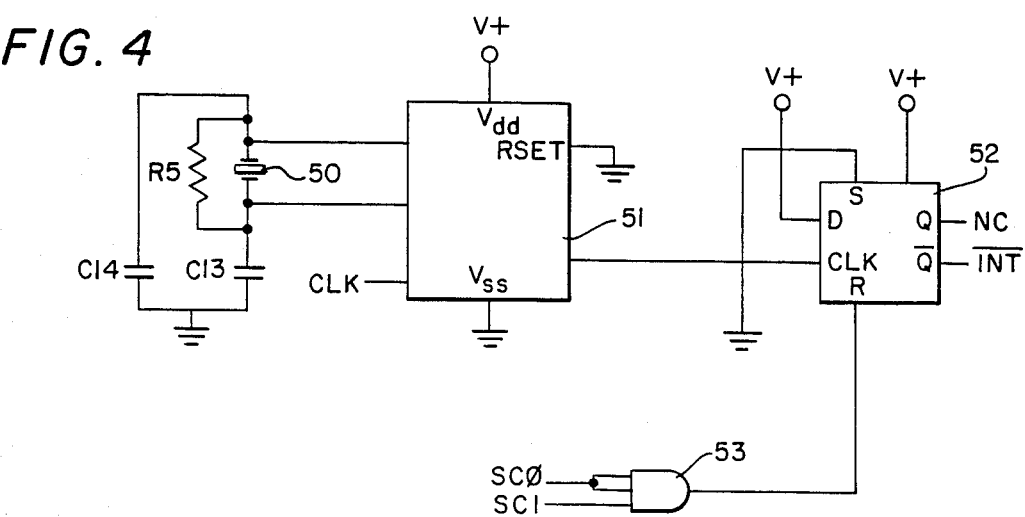
FIG. 4 is a schematic diagram of the clock.

FIG. 4 illustrates in schematic form the clock circuitry for the controller. A crystal 50 is connected to a capacitor resistor network including capacitor C13 and C14 and resistor R5 to provide an output frequency to a frequency dividing circuit 51. In the preferred embodiment, the crystal 50 provides a frequency of approximately 2.5 MHZ and device 51 is a 14-bit binary counter (4060). The frequency signal from the crystal 50 is output on the line CLK provided to the microprocessor 41 of FIG. 3. The output of frequency of crystal 50 is divided down by the counter 51 to provide a slower pulse to the flip-flop 52 to furnish a timer interrupt. The interrupt is acknowledged from the microprocessor 41 via signals SC0 and SC1 input into AND gate 53. The output of flip-flop 52 is the INT- or timer interrupt provided to microprocessor 41 as an indication of the passage of a timed period.

Figure 5:
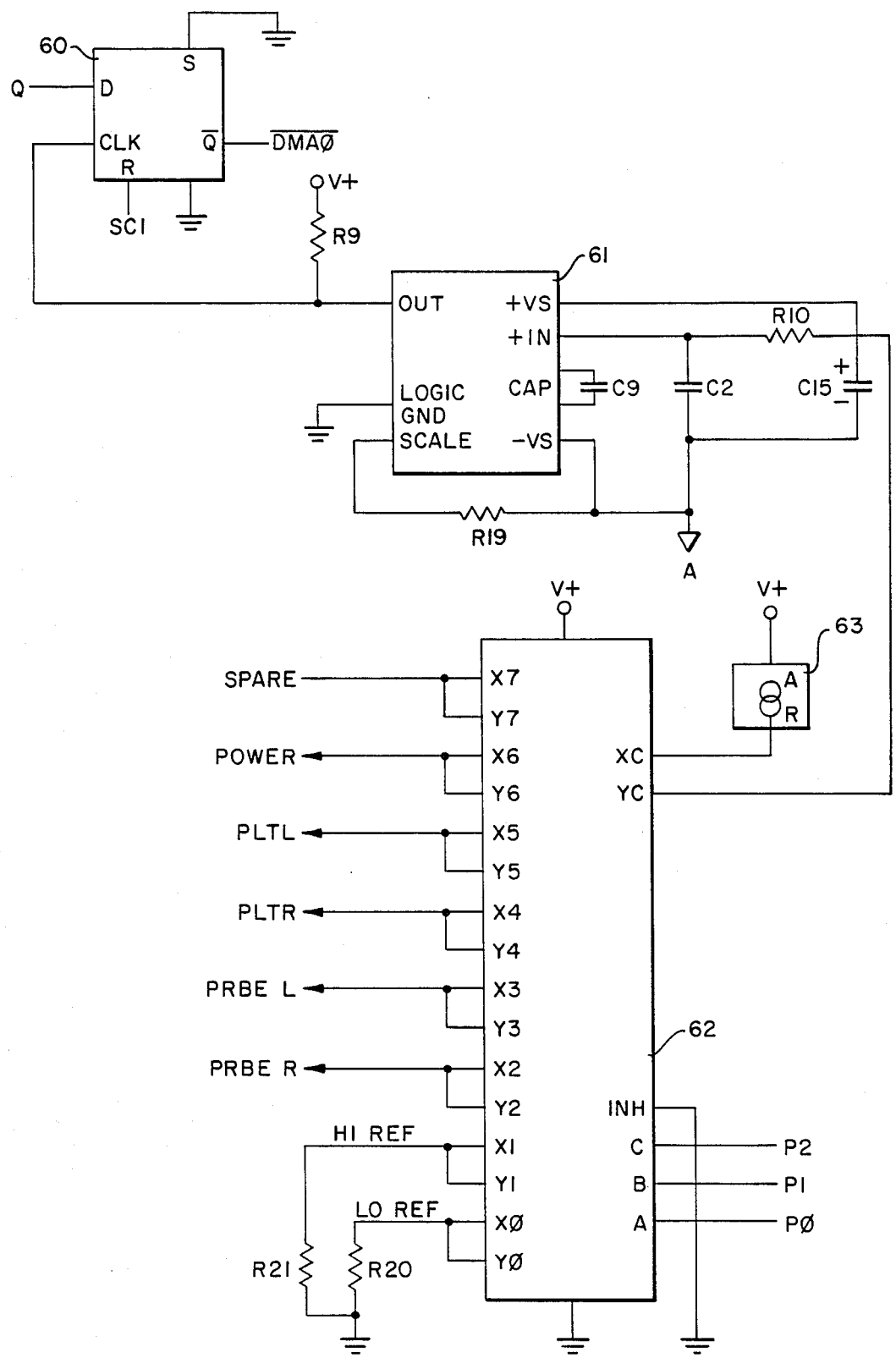
FIG. 5 is a schematic diagram of the temperature input circuit.

The temperature sensing circuit is illustrated in FIG. 5 and consists of a multiplexing semiconductor device (MUX) 62 connected to several resistance temperature devices not shown. In the preferred embodiment, the resistive temperature device is fabricated with platinum film. In this preferred embodiment applied to a two vat deep fat fryer, two of the temperature sensing devices are connected to the pilot light for a left vat (PLTL) and a pilot light for a right vat (PLTR) in the two cooking vat configuration where the vats are heated by gas and thus requiring pilot flames. In an embodiment including an igntor sub-system, this sub-system will provide a signal indicating the condition of the pilot flame. This signal is input into MUX 62. Further provided are PRBE L and PRBE R which are the temperatures of the cooking oil in the respective left and right vats. MUX 62 is further connected to a high reference resistor R21 and a low reference resistor R20 which represent the maximum and minimum temperatures measured by the temperature probes on lines PLTL, PLTR, PRBE L and PRBE R. R21 is set for 440 degrees Fahrenheit and R20 is set for 32 degrees Fahrenheit. A constant current source 63 provides a constant current to the multiplexer 62 which then connects this constant current to either the pilot probes via lines PLTL or PLTR, the vat probes via lines PRBE L or PRBE R or the reference resistors R20 or R21 in accordance with the MUX select lines P0, P1 and P2 from the CPU 41 and the output buffer in FIG. 8C. These lines P0 through P2 determine which of the temperature probes or reference lines are connected to the constant current source 63. The output voltage is connected to a voltage to frequency converter 61. Upon receiving the voltage from the MUX 62, the voltage to frequency converter converts the resulting voltage to a corresponding frequency which then is input as a clock signal into the flip-flop 60. The output of flip-flop 60 is connected to DMA0- and provided to the microprocessor 41 DMA (direct memory access) input. In the preferred embodiment, using the RCA 1802, the DMA0- input frequency count is accumulated in register 0 of the RCA 1802 to indicate the temperature of whichever probe was selected at the MUX 62. The count is initialized by an interrupt (INT-) from flip-flop 52 and stopped by the next interrupt which generates the signal Q input to flip-flop 60. An algorithm contained in microprocessor 41 computes a comparison between the probe count and the high and low reference counts to determine the exact temperature of the pilot lights or the cooking oil in the left and right vats. The algorithm computes the measured temperature by computing the frequency count difference of R21 and R20 and multiplying by 372 to compute the slope constant which is the frequency count per degree conversion factor. The probe temperature is then computed by multiplying the difference between the temperature probe count and the low reference count by the above conversion factor and then adding 32 which represents the offset. In this manner, the temperatures may be measured without extensive analog to digital conversions and other expensive peripheral devices. Using this arrangement, the temperature is input as a frequency directly into the microprocessor 41 register where it can be easily accessed by the algorithm being executed in the microprocessor 41.

Figure 6A:
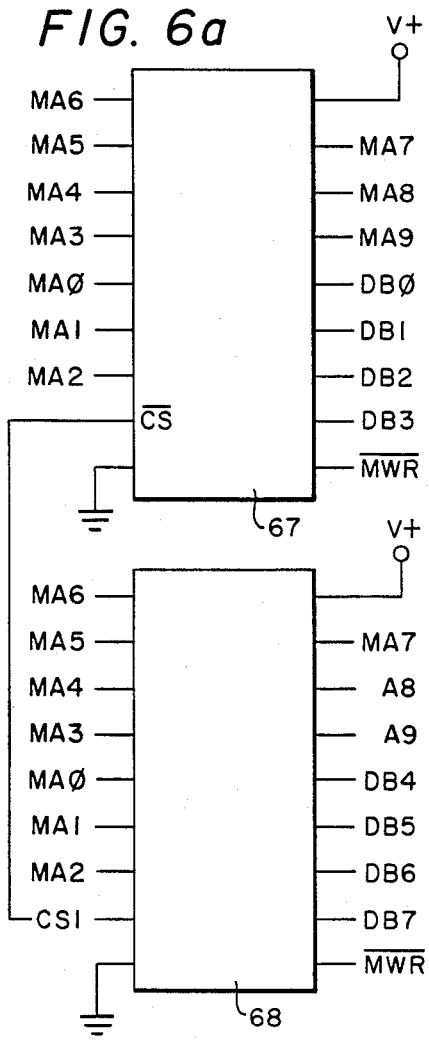
FIG. 6A is a schematic diagram of the random access memory.
Figure 6C:
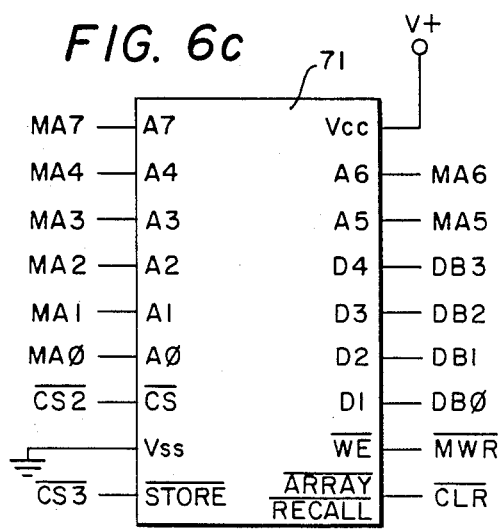
FIG. 6C is a schematic diagram of the non-volatile memory.
Figure 6B:
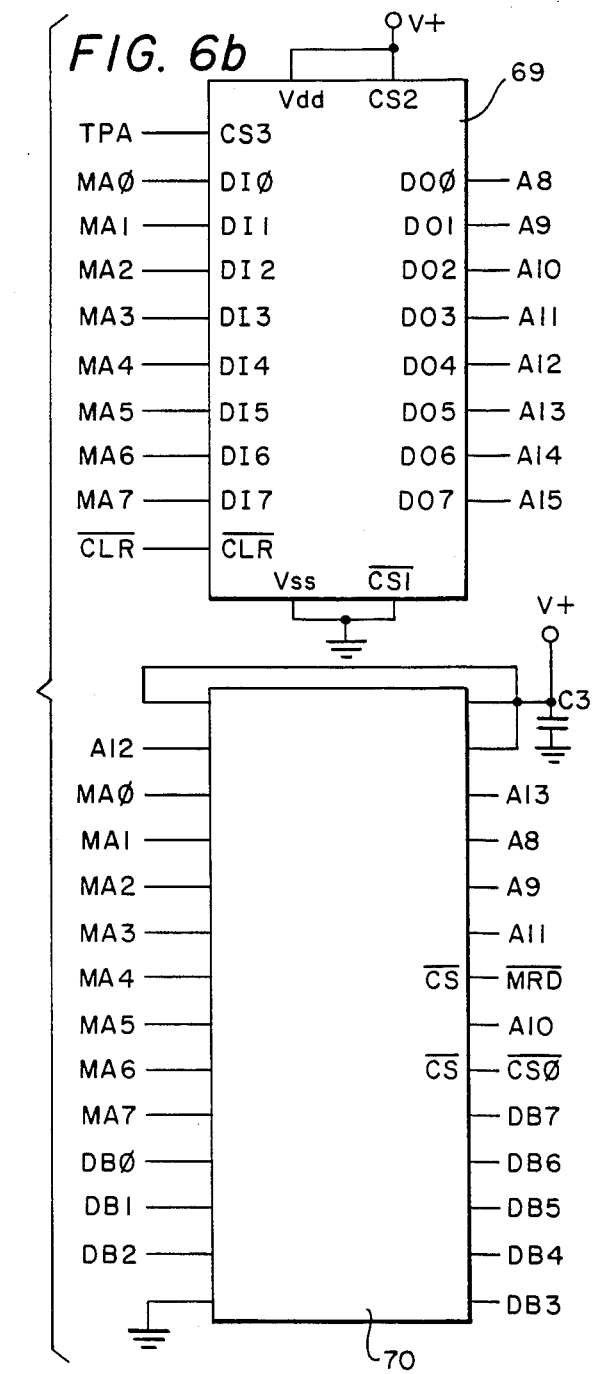
FIG. 6B is the schematic diagram of an address multiplexer and the read only memory.

FIG. 6A is a portion of the memory for the controller 10. Devices 67 and 68 are random access memory semiconductor devices that are connected to the multiplexed address lines MA0 through MA7 and the data bus lines DB0 through DB7 respectively. FIG. 6B illustrates the ROM 70 that is likewise connected to the multiplexed address lines MA0 through MA7 and the data lines DB0 through DB7. Semiconductor device 69 of FIG. 6B is the demultiplexer for the multiplex address from the RCA 1802 microprocessor 41 of FIG. 3. The TPA line is used to perform the demultiplexing operation. FIG. 6C illustrates a nonvilatile RAM which is likewise connected to the multiplexed address lines MA0 through MA7 and the data lines DB0 through DB7. FIG. 6D illustrates a selection logic semiconductor device that uses multiplex address bits 6 and 7 and the microprocessor 41 timing signal TPA together with the memory read MRD- and memory write MWR- lines to select the RAM 67 and 68, ROM 70, or nonvolatile RAM 71 semiconductor devices via signals CS0- through CS3-. In the preferred embodiment this selection logic is provided by the RCA devices CDP 1866.

FIG. 7 illustrates the discrete light emitting diode (LED) display circuitry consisting of a BCD to decimal converter 80 connected to the input semiconductor device 81 which is further connected to a resistor network 82 and the LED matrix 83. The LED matrix 83, which displays which product is being cooked, is activated by line SEL3 which is decoded from the CPU 41 outputs N1 and N2 and the data latch signal TPB. The terminals 84 mark A through F are connected to the keyboard (FIG. 10) to provide keyboard scan signals.

Figure 8A:
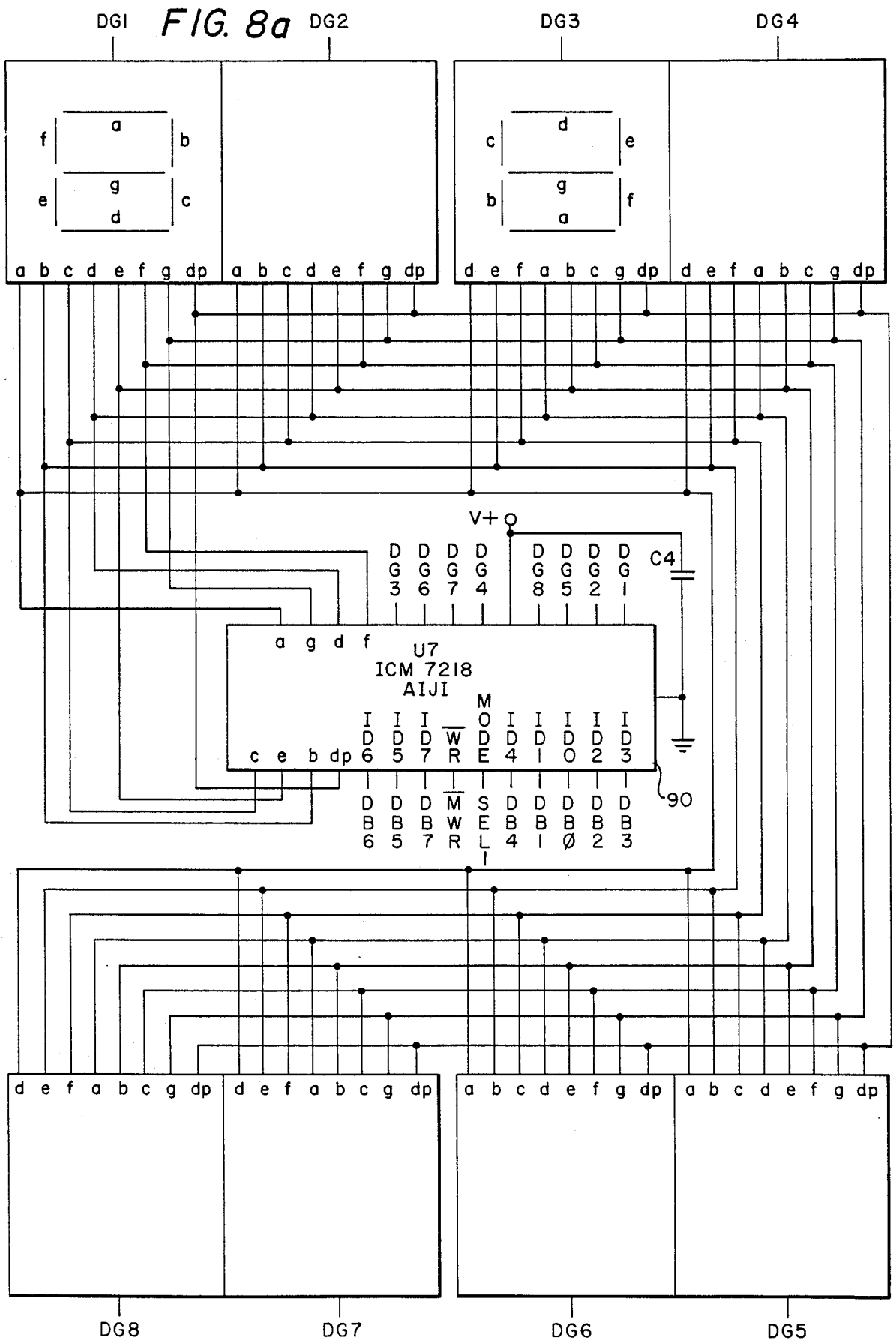
FIG. 8A is a schematic diagram of the eight 7-segment light emitting diode displays.

FIG. 8A illustrates the schematic of the seven segment light emitting diode (LED) display output. The seven segment LED displays are connected to a LED driver 90 which is connected to the data lines DB0 through DB7 from CPU 41 and select line SEL1 from the BCD to decimal converter 80 (FIG. 7). The seven segment LED displays provides alphanumeric information to the user. The UNREG line in the preferred embodiment driver 91 is a 75468 device. In the configuration pin 8 of driver is from the power supply (FIG. 9) and provides the signal to the base of transistor 96 which provides unregulated power to an interface board containing the relays previously discussed. FIG.

8B illustrates the driver 91 that is connected to an AND gate 92. Driver 91 provides the output signals (see FIG. 11) to the relays which control the gas regulator and the motor 19 of FIG. 2. Driver 91 and AND gate 92 receive the programmed input/output signals P3 through P7 from the microprocessor. FIG. 8C illustrates the output buffer 93 that provides the program 10 signals from the data signals DB0 through DB7 controlled by the select line SEL2 and the memory read signal MR0- from BCD to decimal converter 80 (FIG. 7).

FIG. 9 is the schematic diagram of the power supply for the controller and consists of switching regulator 95 connected to a full wave rectifier circuit containing diodes C13 through C16. Note that the unregulated signal from the full wave bridge rectifier is provided to the driver 91 in FIG. 8B as previously discussed. Switching regulator 95 further includes an operational amplifier that provides the RESET signal when the input voltage of the four-way rectifier falls below a certain voltage level. TP2 and TP1 are test points provided on the circuit. The output V+ is regulated through Q1 and filtered through inductor L1 and capacitor C6. The full wave bridge rectifier is connected to both chassis ground 97 and analog ground 98. In the preferred embodiment the switching regulator 95 is a Fairchild 78540. For this regulator the resistor network R15, R16, R17, R22 and R23 are configured to provide an accurate input voltage of 1.3 volts.

Figure 10:
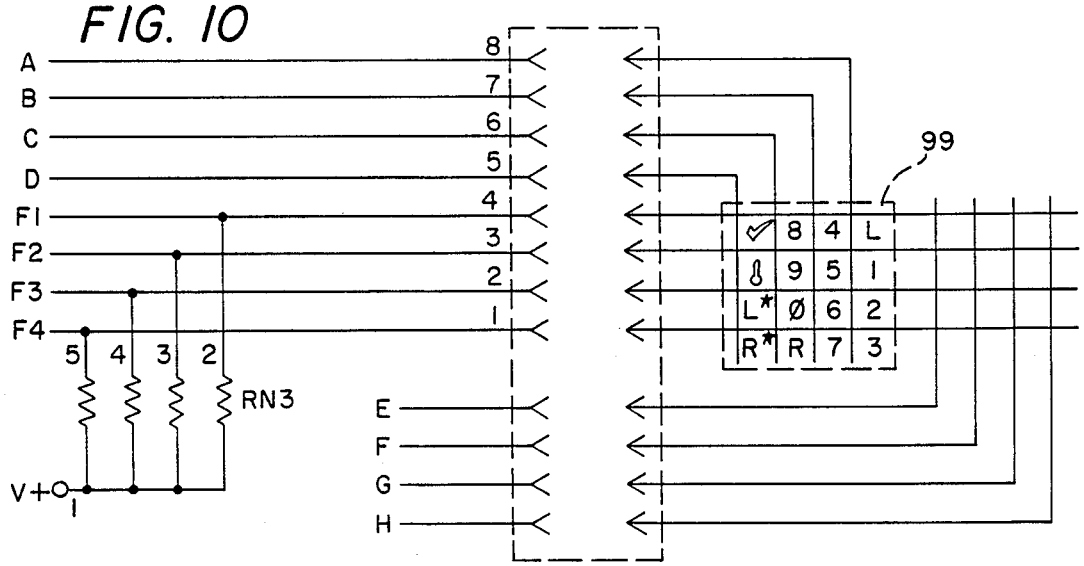
FIG. 10 is a schematic diagram of the keyboard input circuitry.

FIG. 10 illustrates the connection to the user keyboard 99. As previously dicussed, lines A, B, C, D, E, F, G, and H provide scan inputs to keyboard 99. The outputs of keyboard 99 are flag lines F1, F2, F3, F4 which are connected to the pull up resistor network RN3. When the user depresses a key of the keyboard 99, the connecting flag line is grounded. When read by the CPU 41, the low flag line indicates that the key being scanned was depressed.

Figure 11:
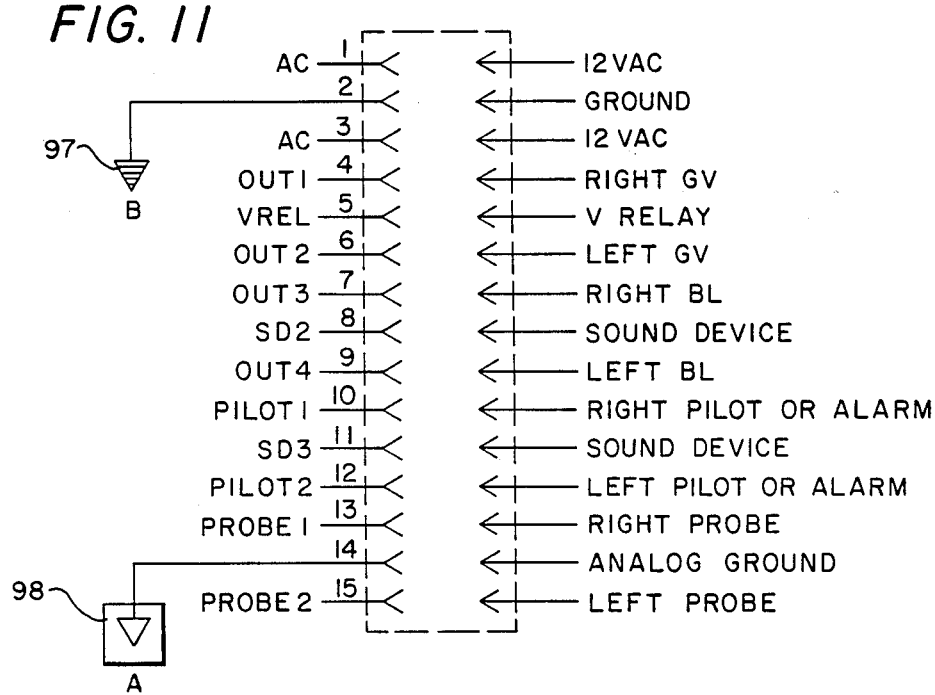
FIG. 11 is a schematic diagram of the external signal connector.

FIG. 11 illustrates the external signal connections to the fryer appliance.

Figure 12:
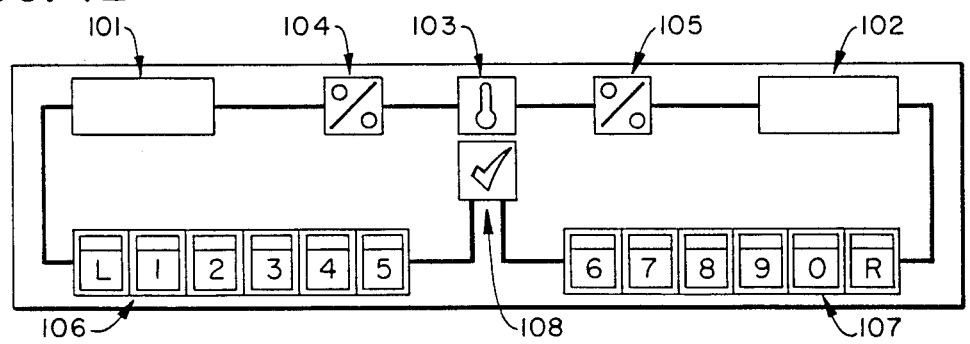
FIG. 12 is a front view of the control panel.

FIG. 12 is a front view of the control panel that provides both display and user inputs to the system. Display 101 contains four of the seven segment light emitting diodes. Display 102 contains the other remaining four seven segment light emitting diode displays. The storage switch 103 is provided to indicate to the system that the program contained in the computer is to be locked in. Switches 104 and 105 are power supply switches for the left and right vats. Switches 106 and 107 are the left, right and ten digit keyboard input switches used for entering the computer and accessing programming functions. Switch 108 is a program step verification switch. Table I contains the user input sequence for using the switches of FIG. 12.

Figure 13A:
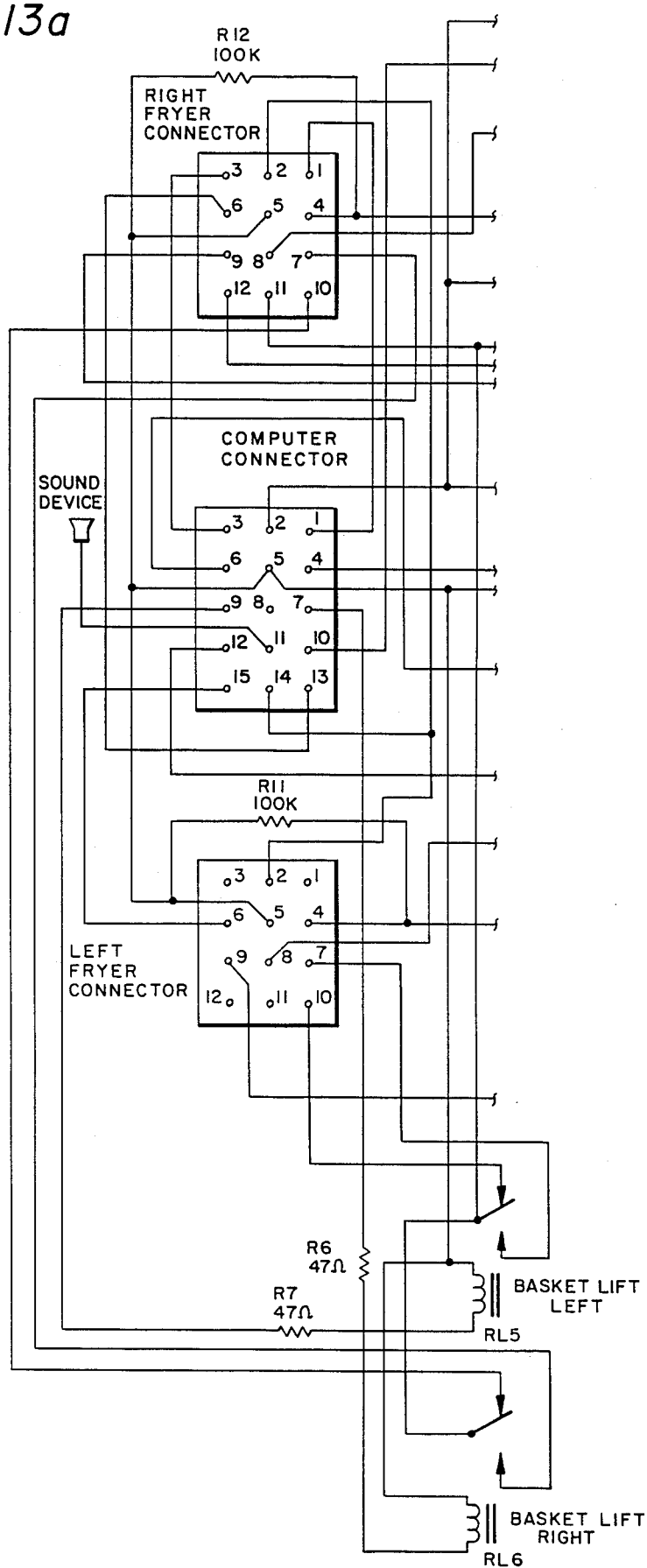
FIG. 13 is a schematic diagram of the relay interconnection.
Figure 13B:
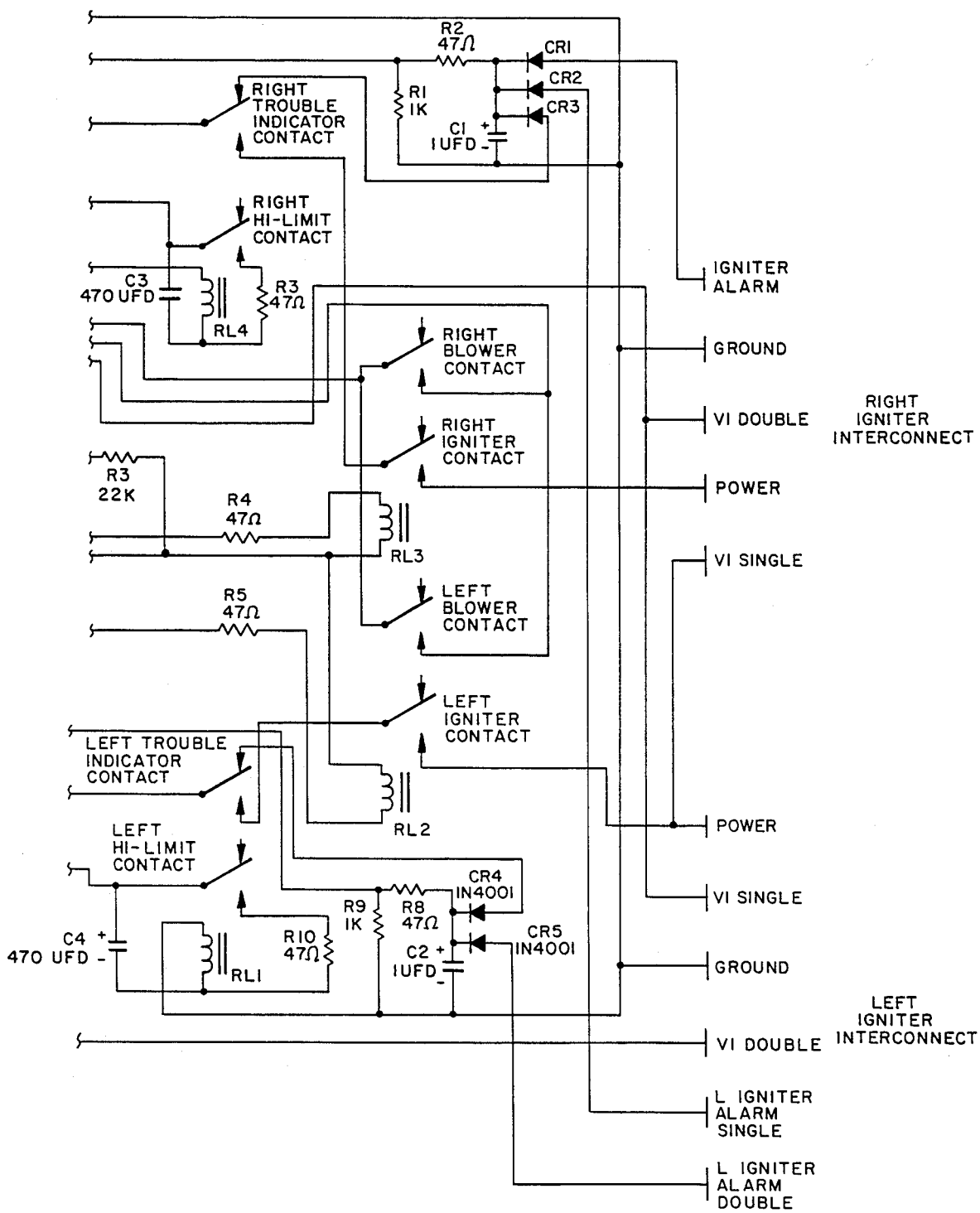
Figure 14A:
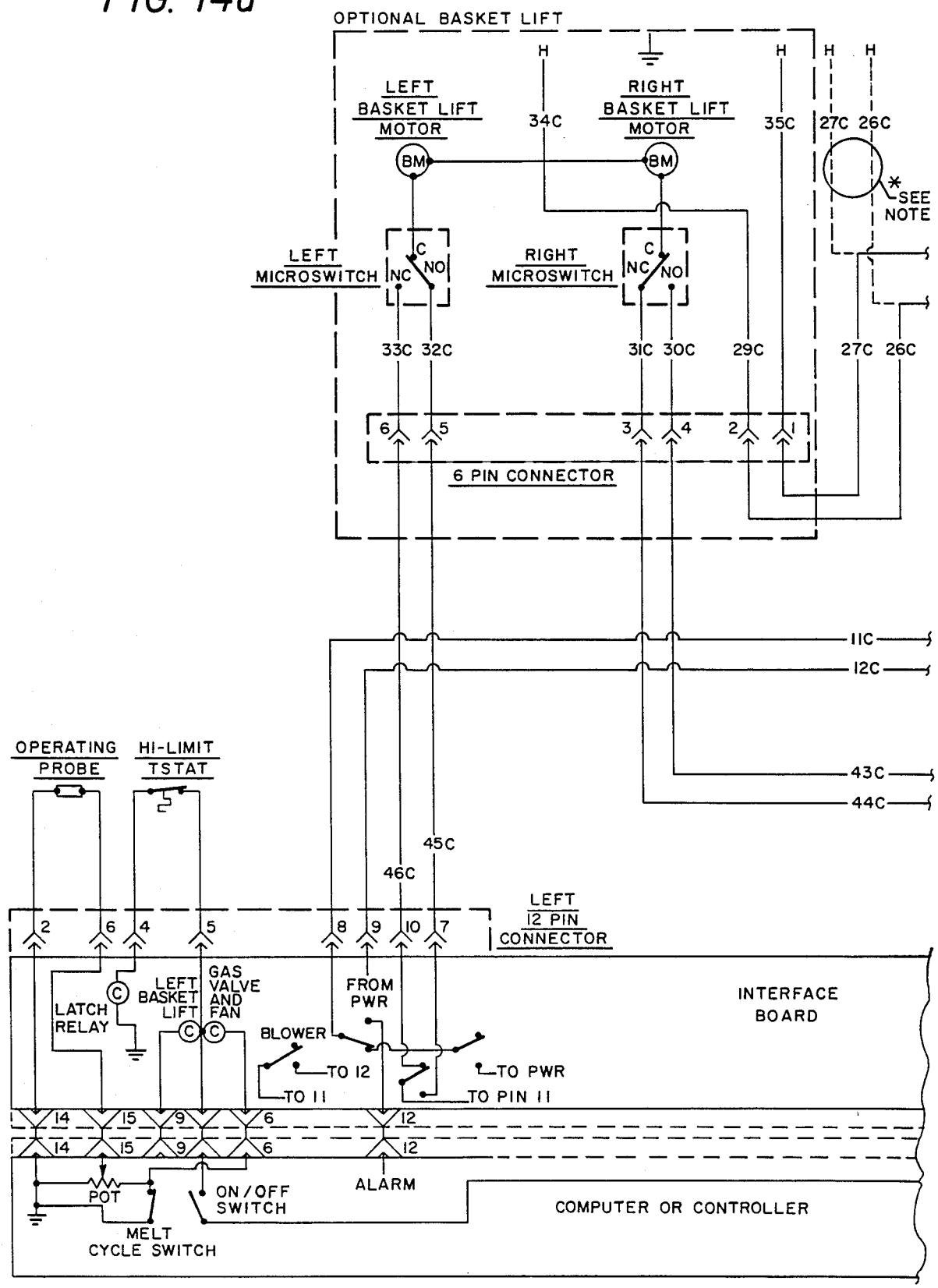
FIG. 14 is a schematic wiring diagram.
Figure 14B:
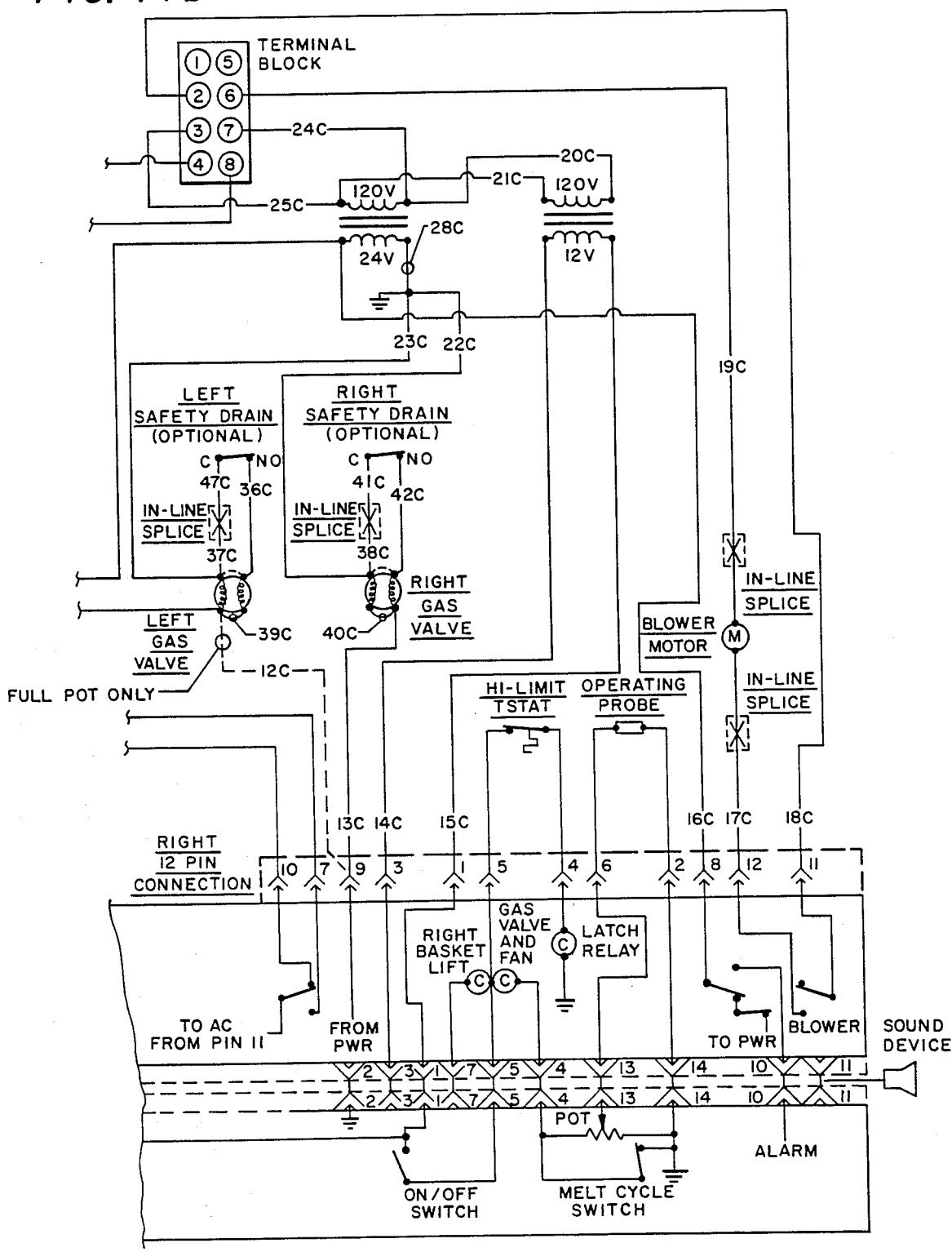
Figure 14C:
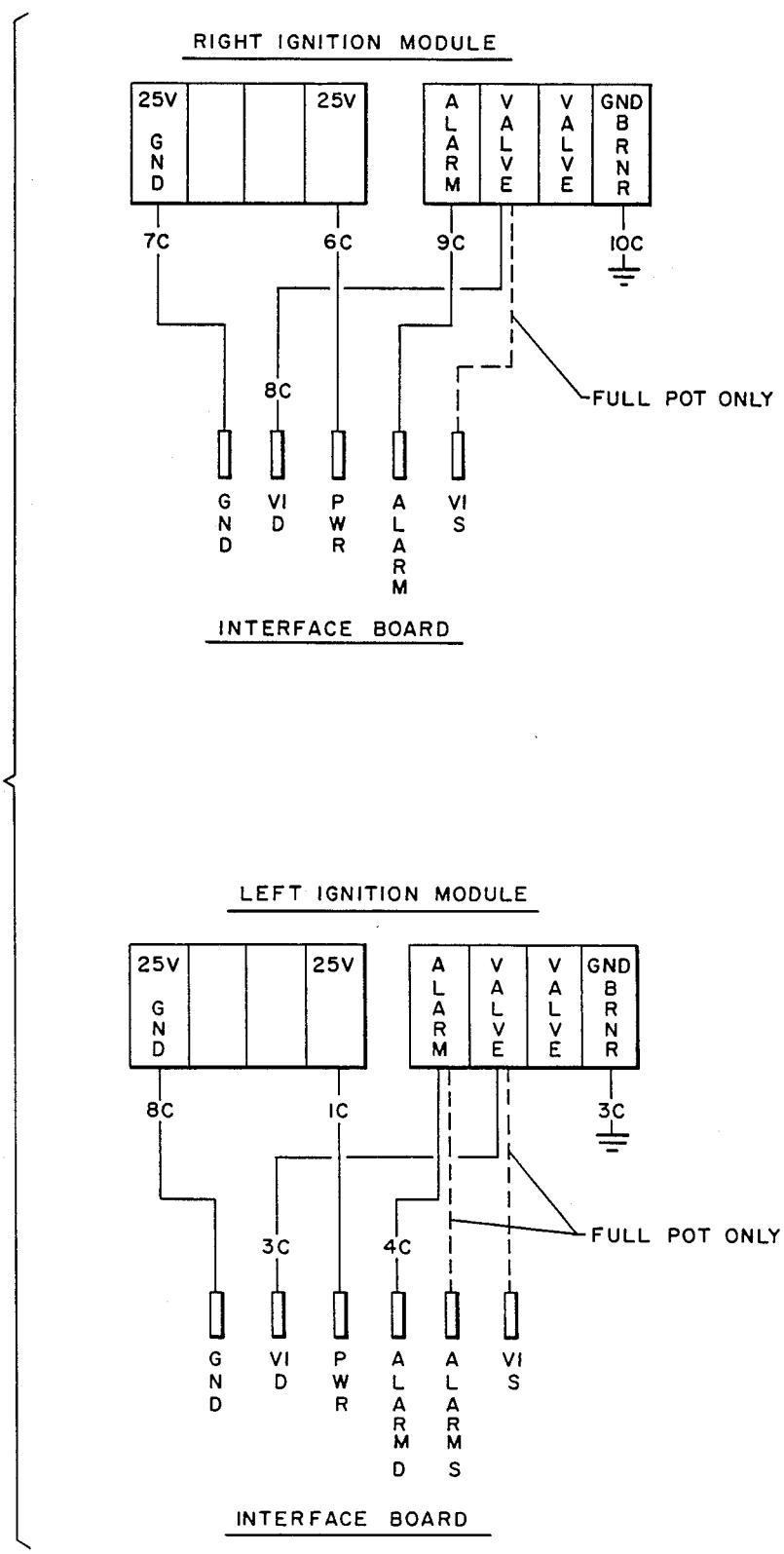

FIG. 13 illustrates the schematic for an interface board that contains several relays controlled by the CPU 41 through the connection illustrated in FIG. 11. FIG. 14 is a schematic diagram for the general power wiring of the cooking device.

Figure 15:
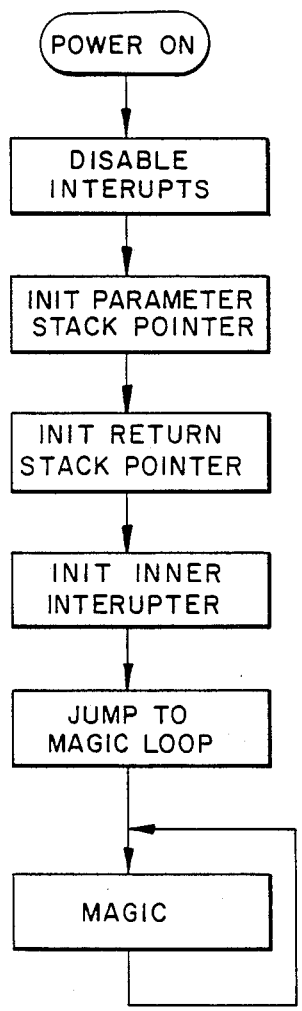
FIG. 15 is a flow chart for the power up and initialization routine.
Figure 16:
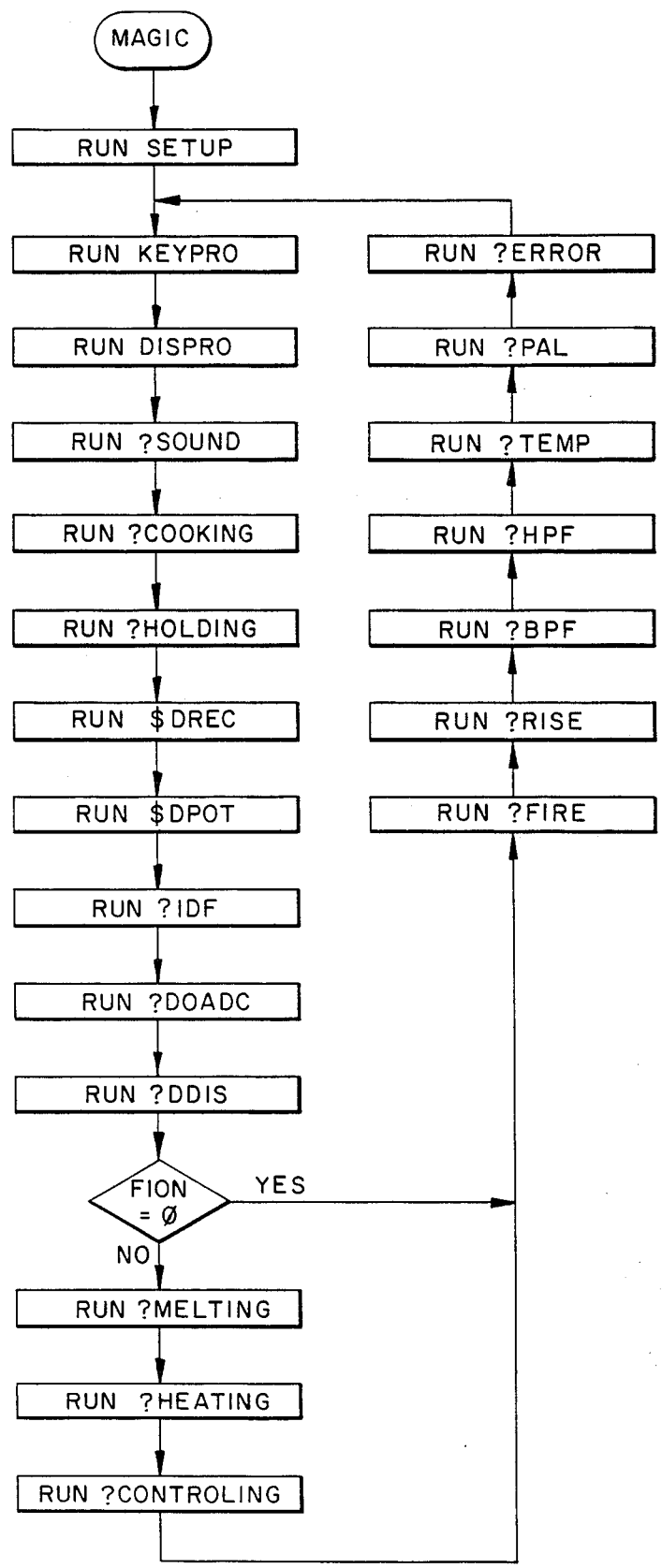
FIG. 16 is a flow chart of the Magic routine that is the principle executive operational routine.
Figure 17:
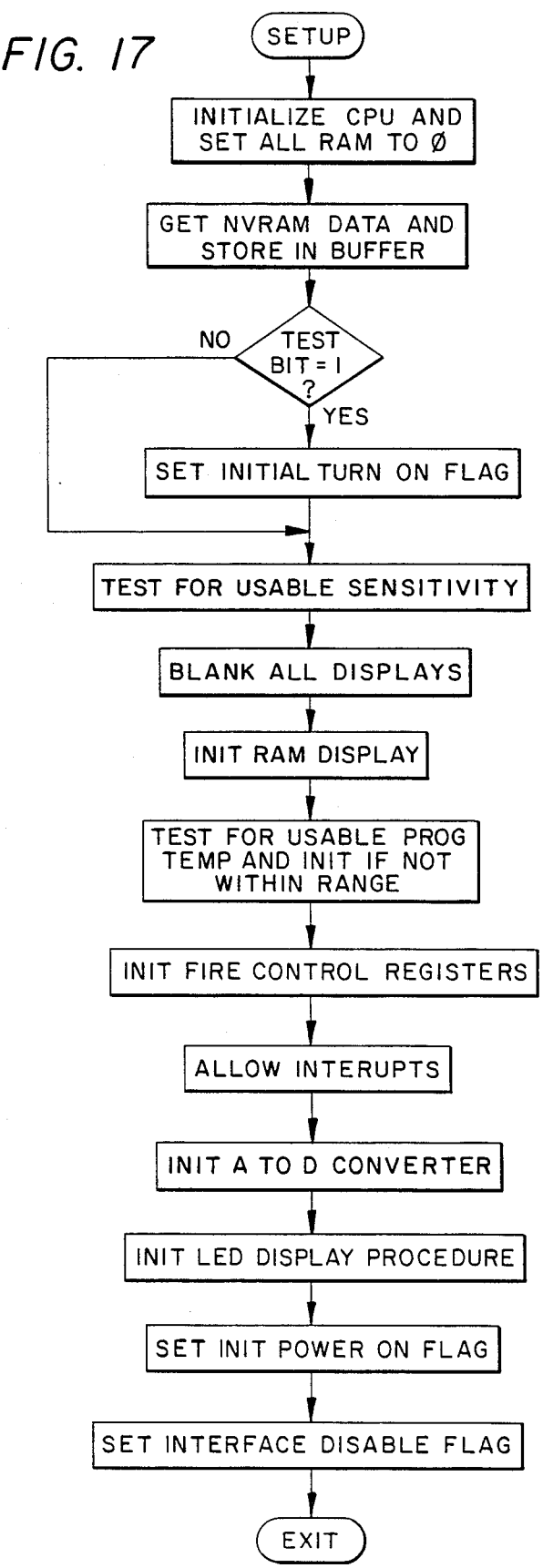
FIG. 17 is an intialization routine for the Magic executive routine.
Figure 18:
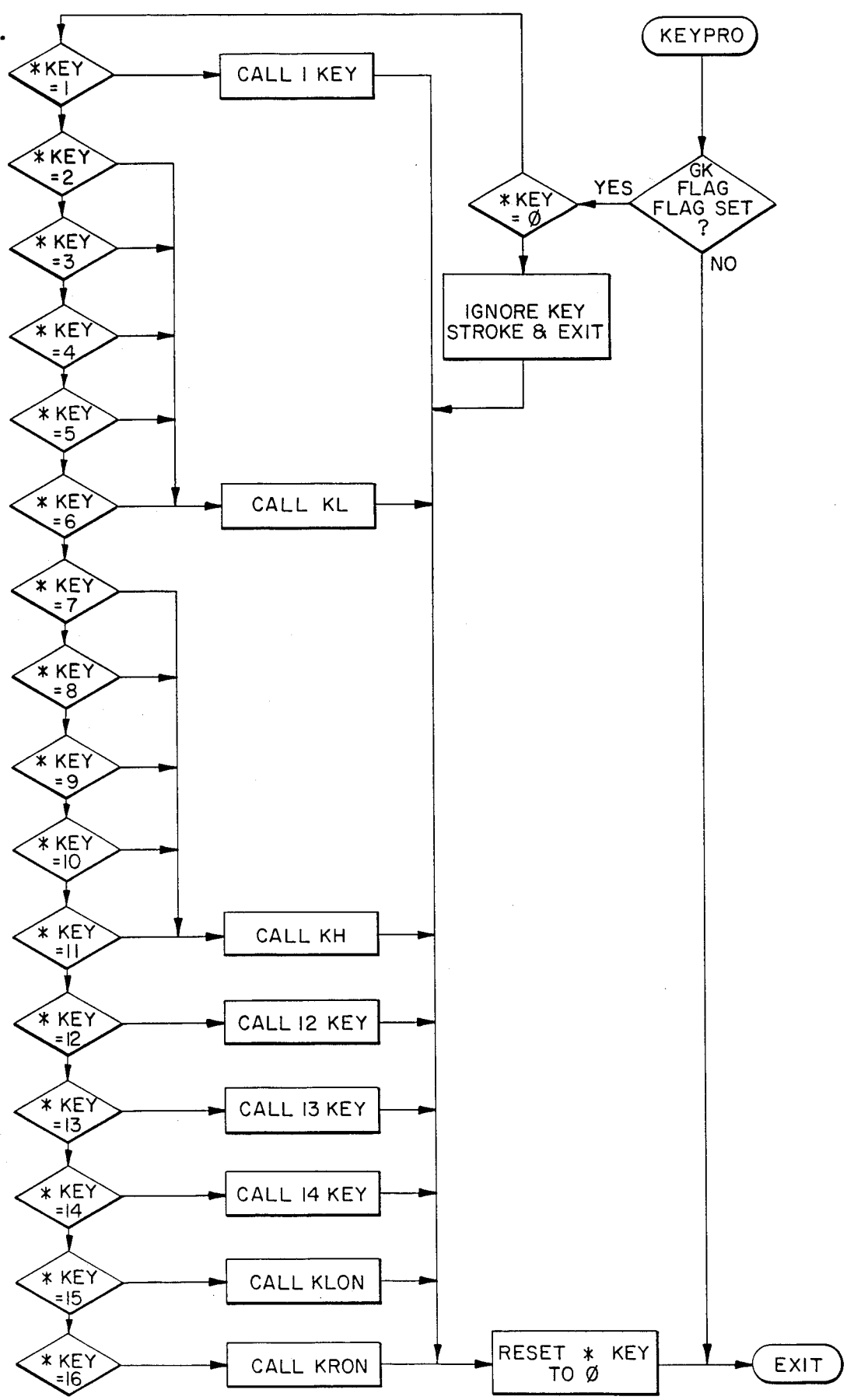
FIGS. 18 through 39 are flow charts for the keyboard processing routines.
Figure 19:
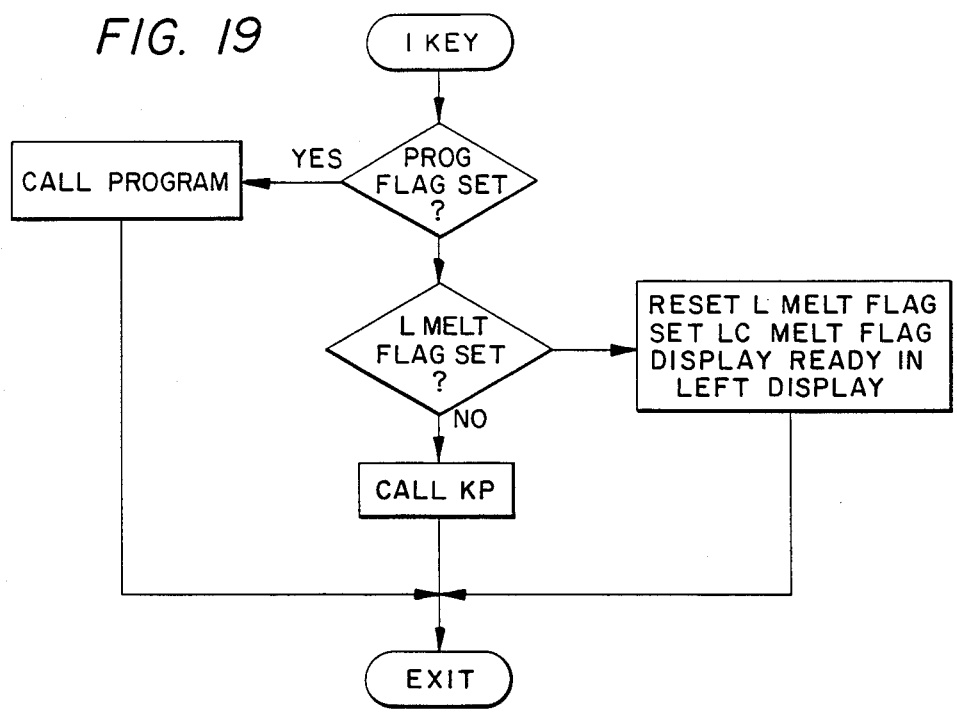
Figure 20:
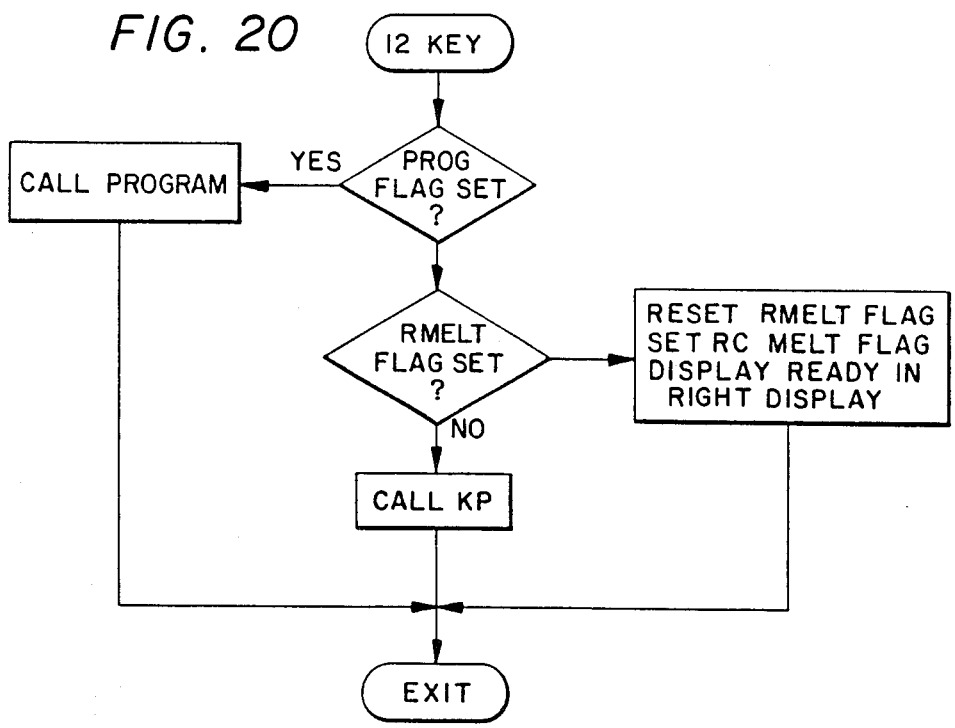
Figure 21:
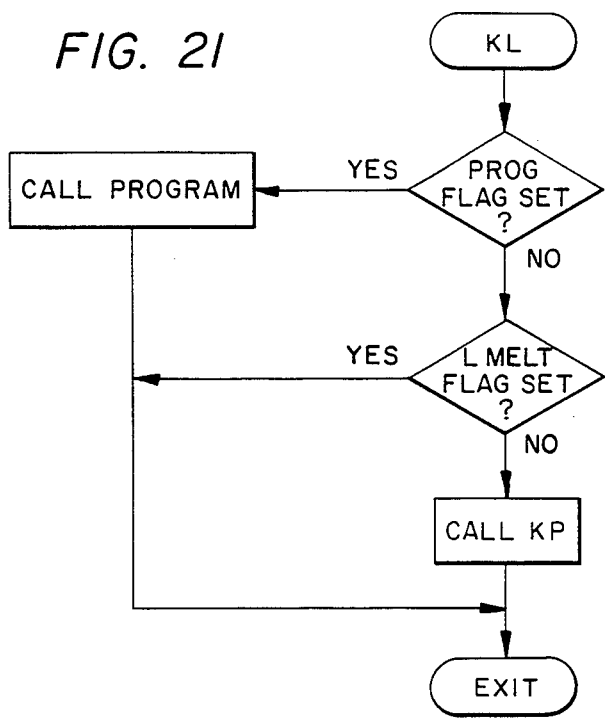
Figure 22:
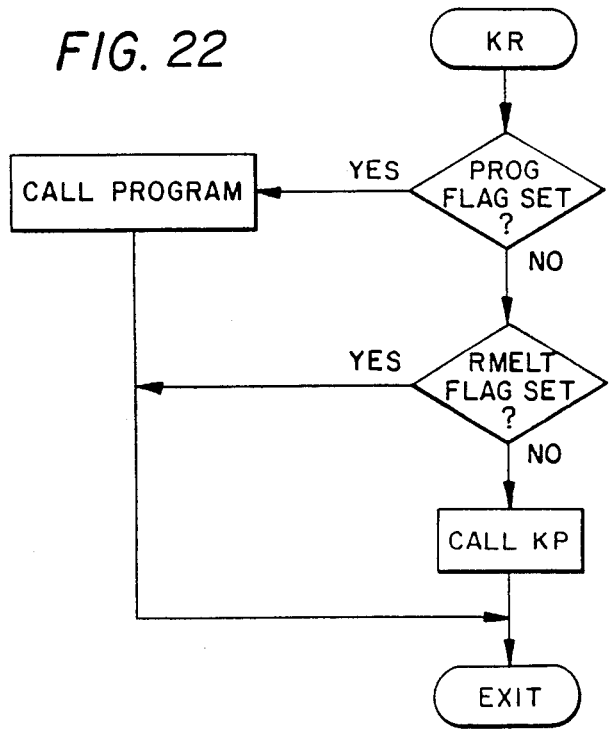
Figure 23:
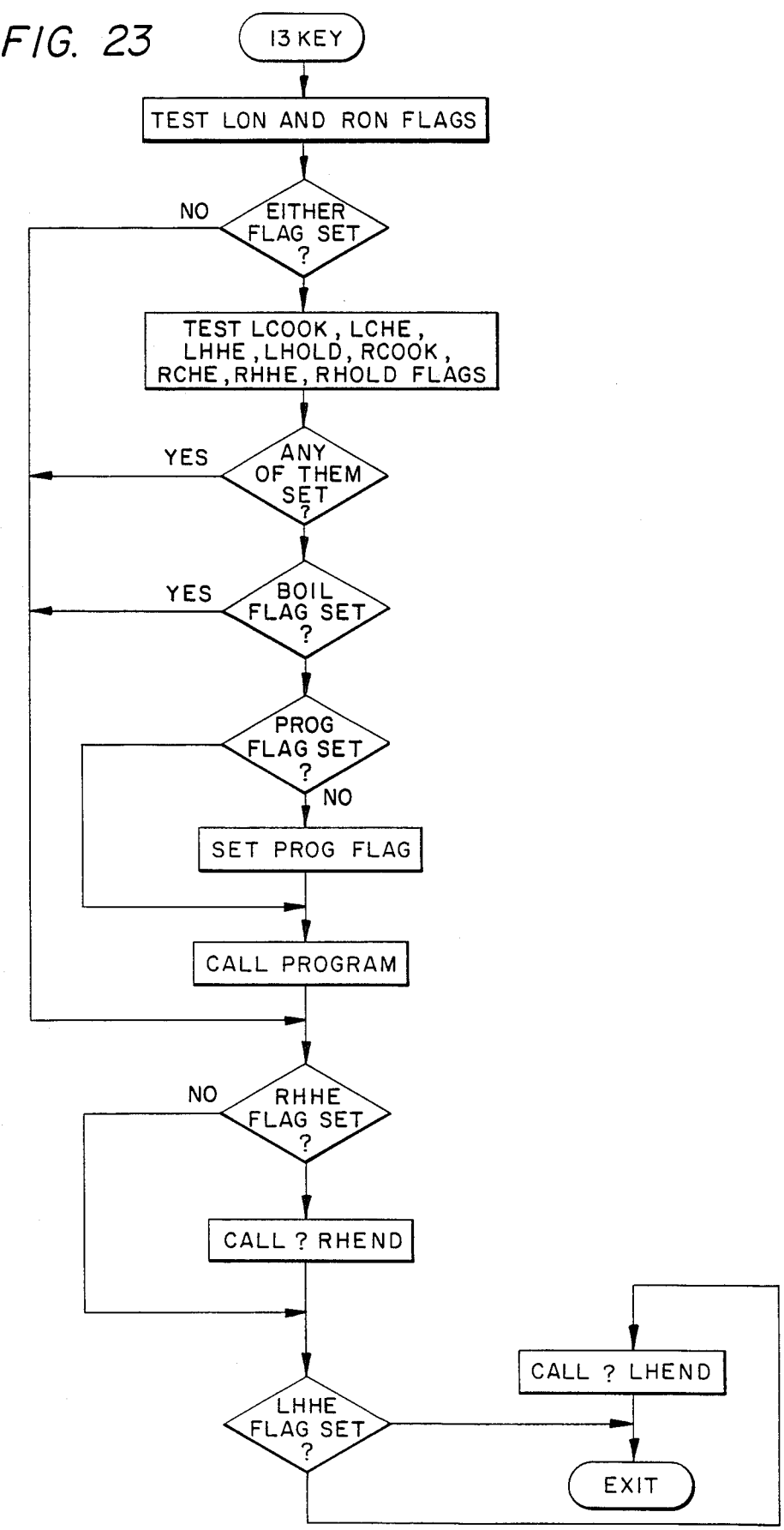
Figure 24:
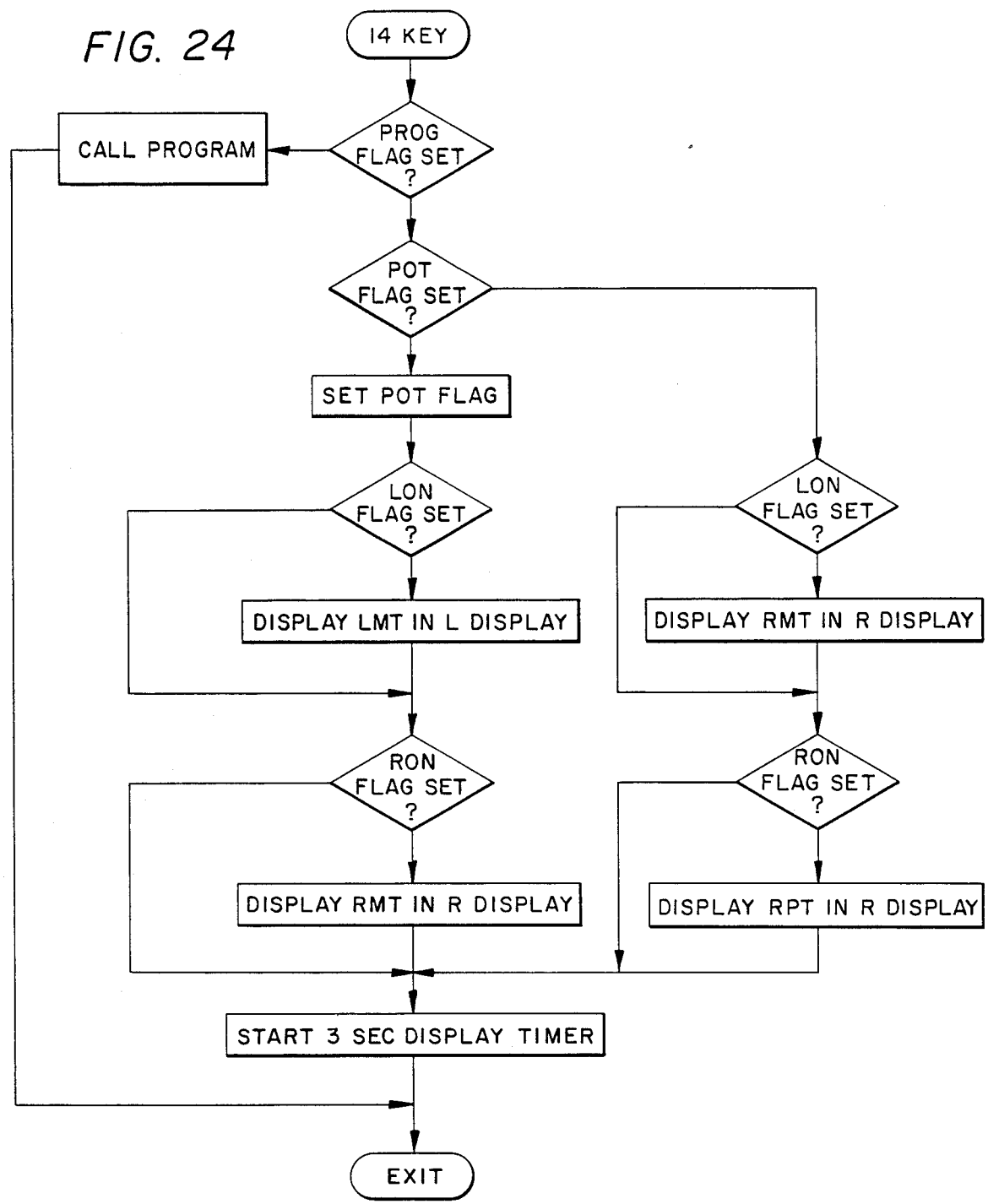
Figure 25:
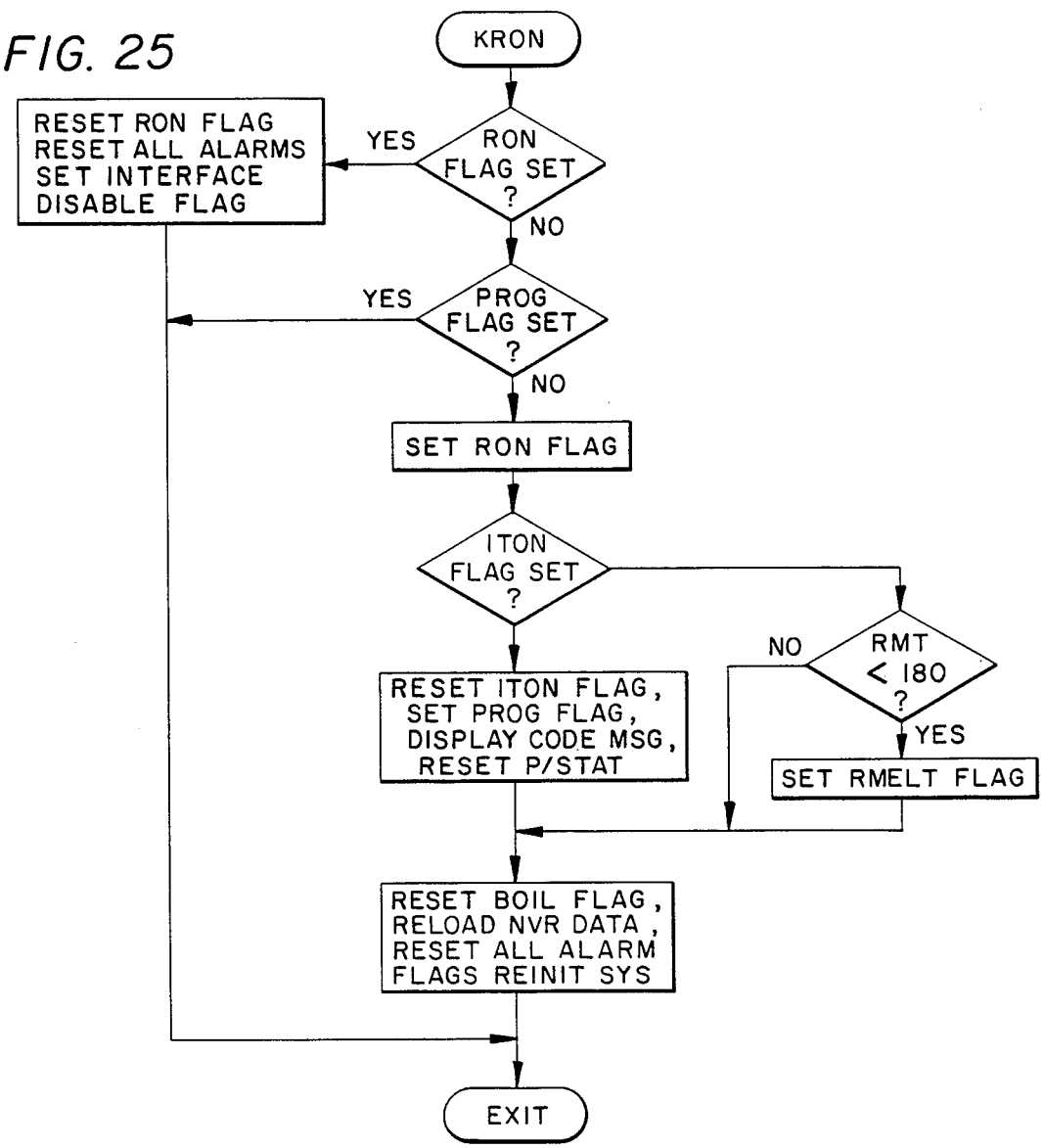
Figure 26:
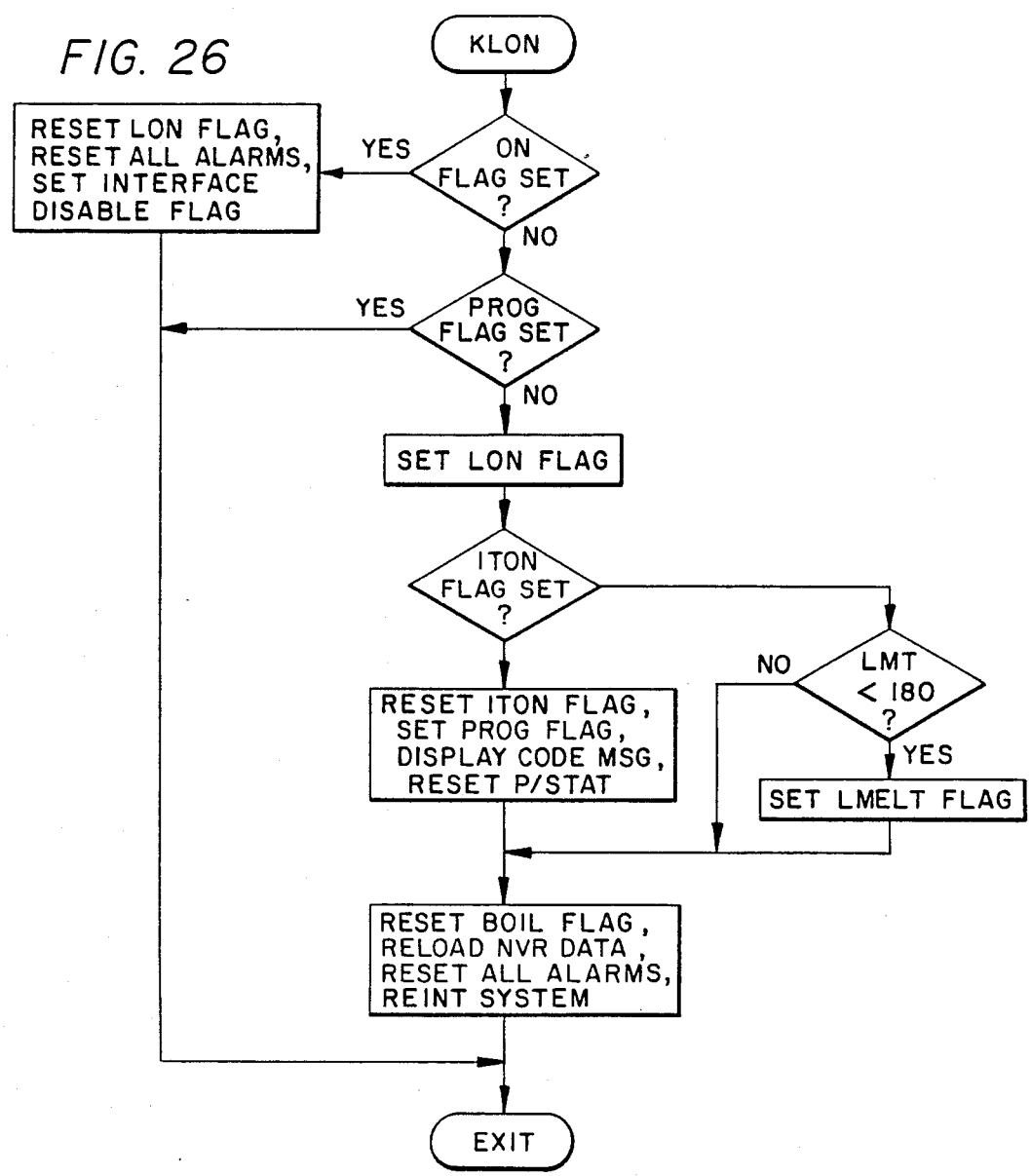
Figure 27:
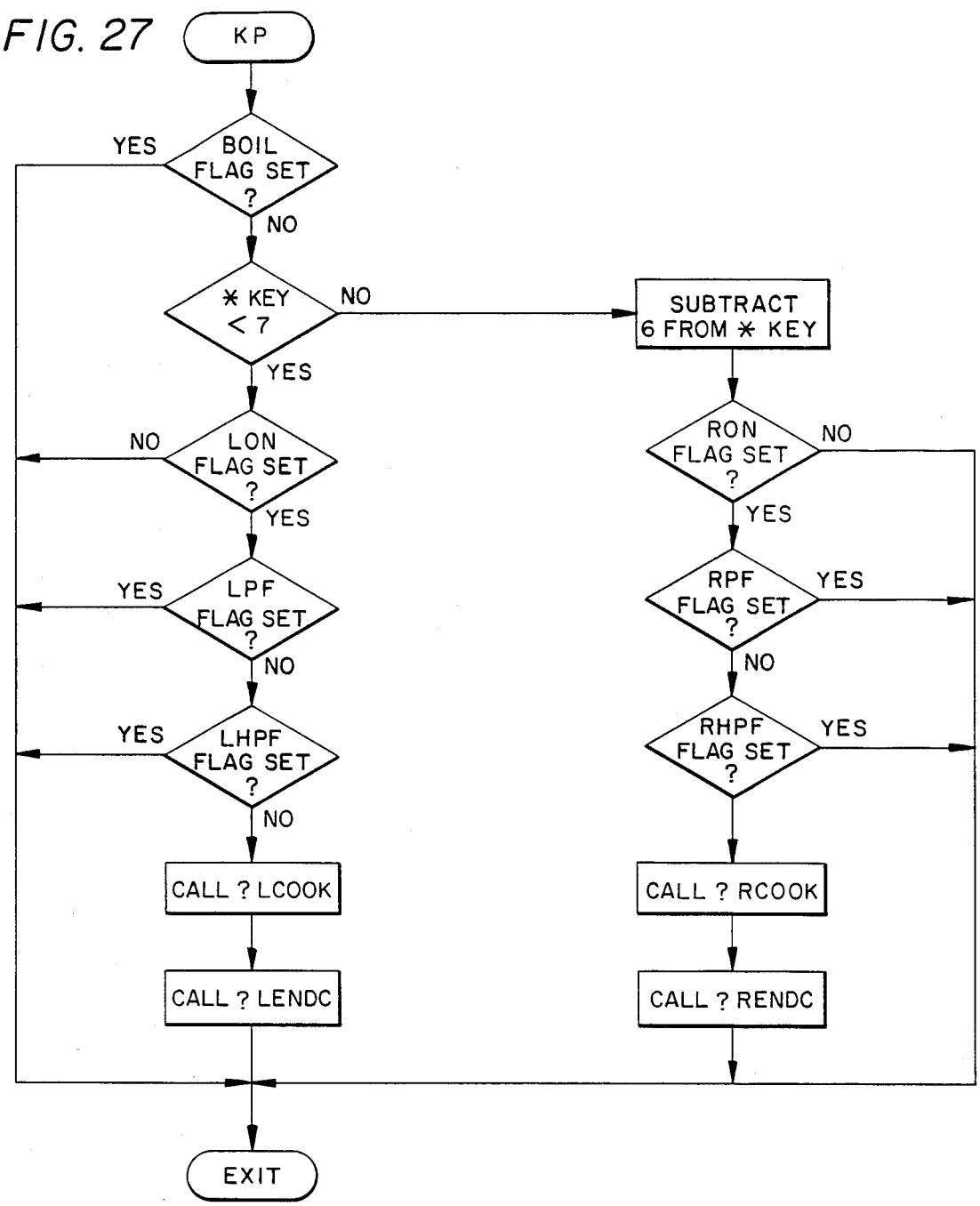
Figure 28:
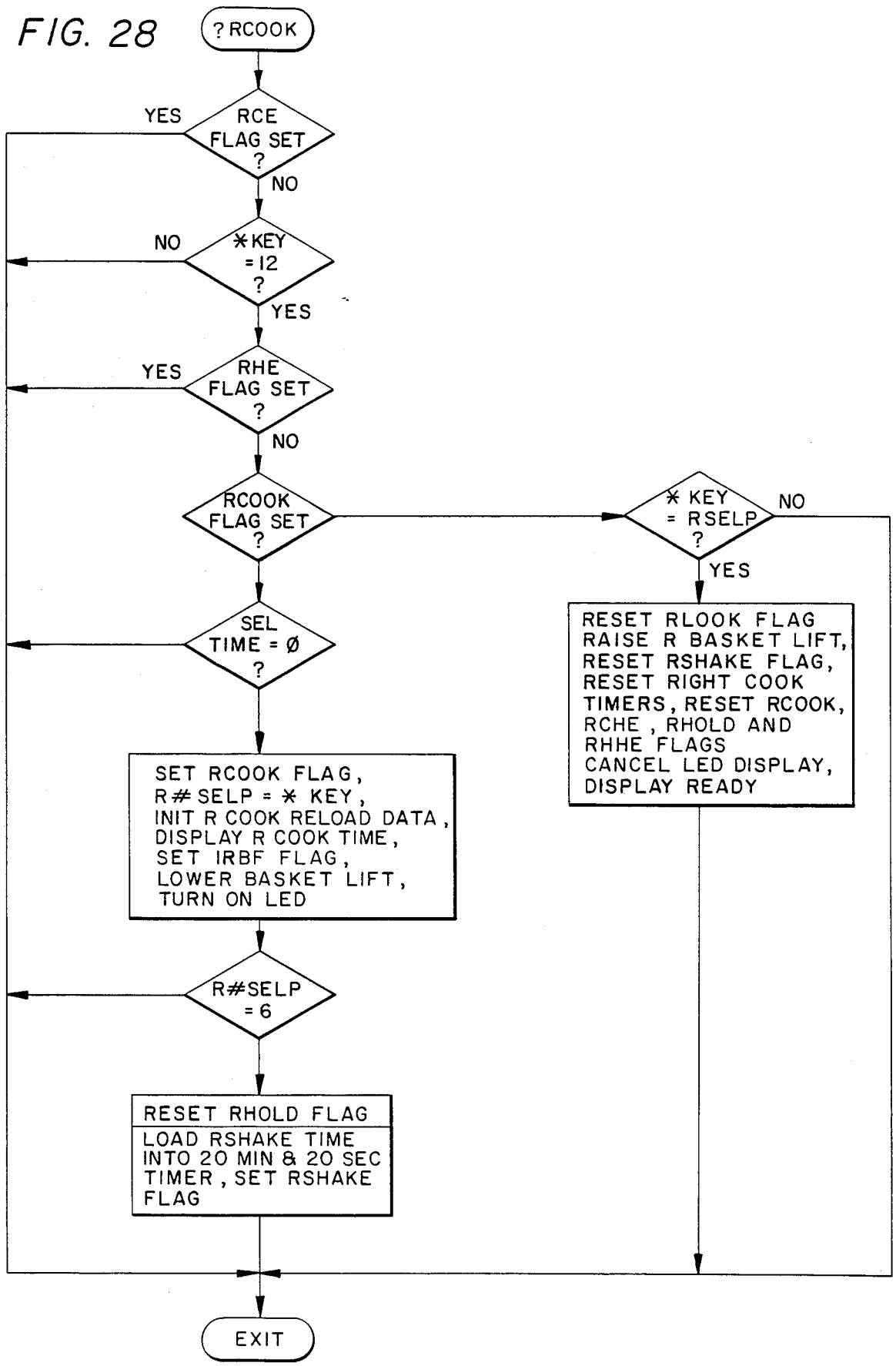
Figure 29:
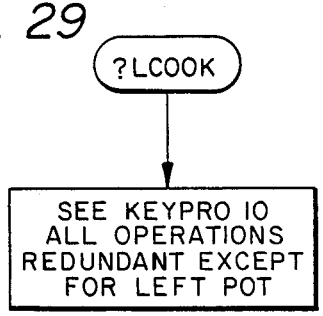
Figure 30:
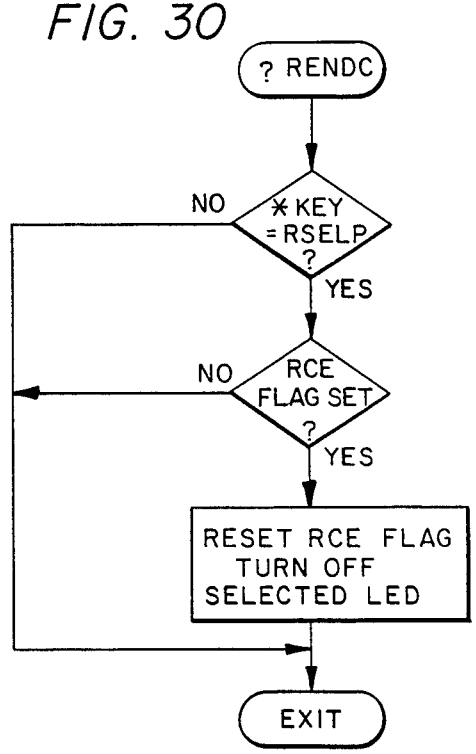
Figure 31:
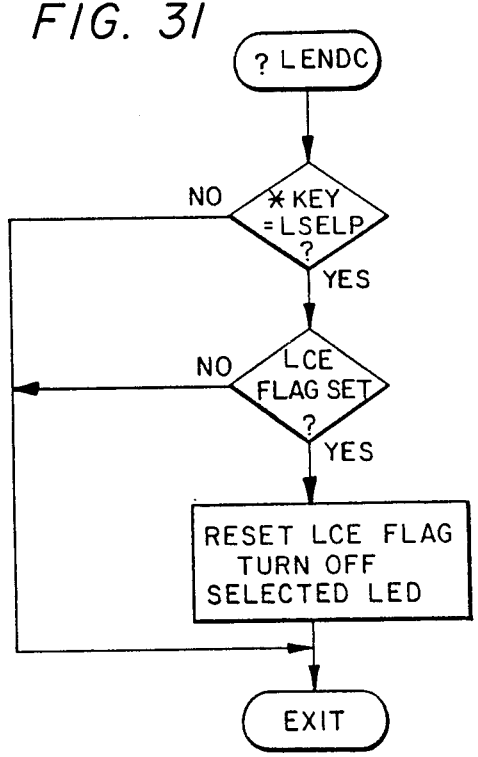
Figure 32:
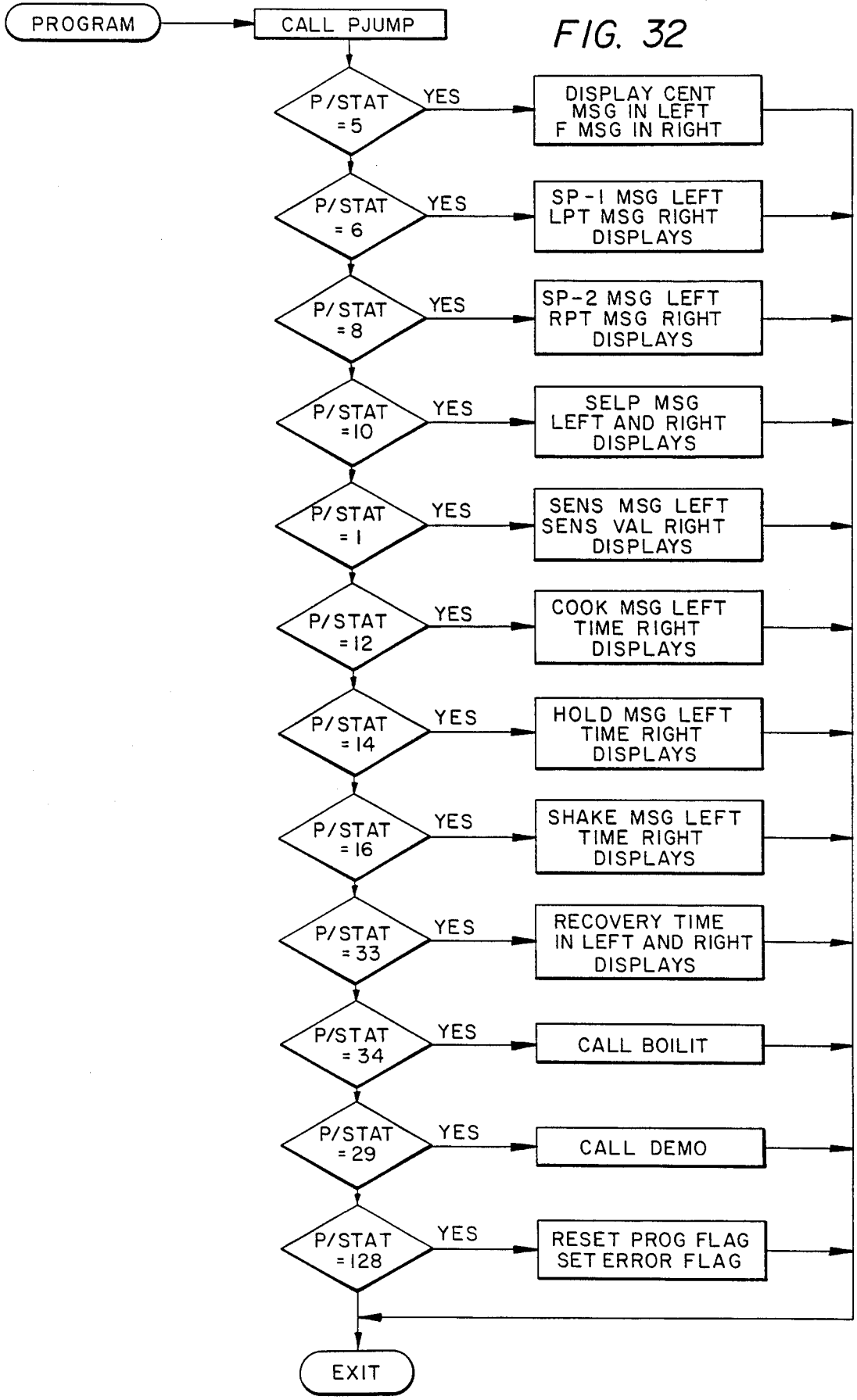
Figure 33:
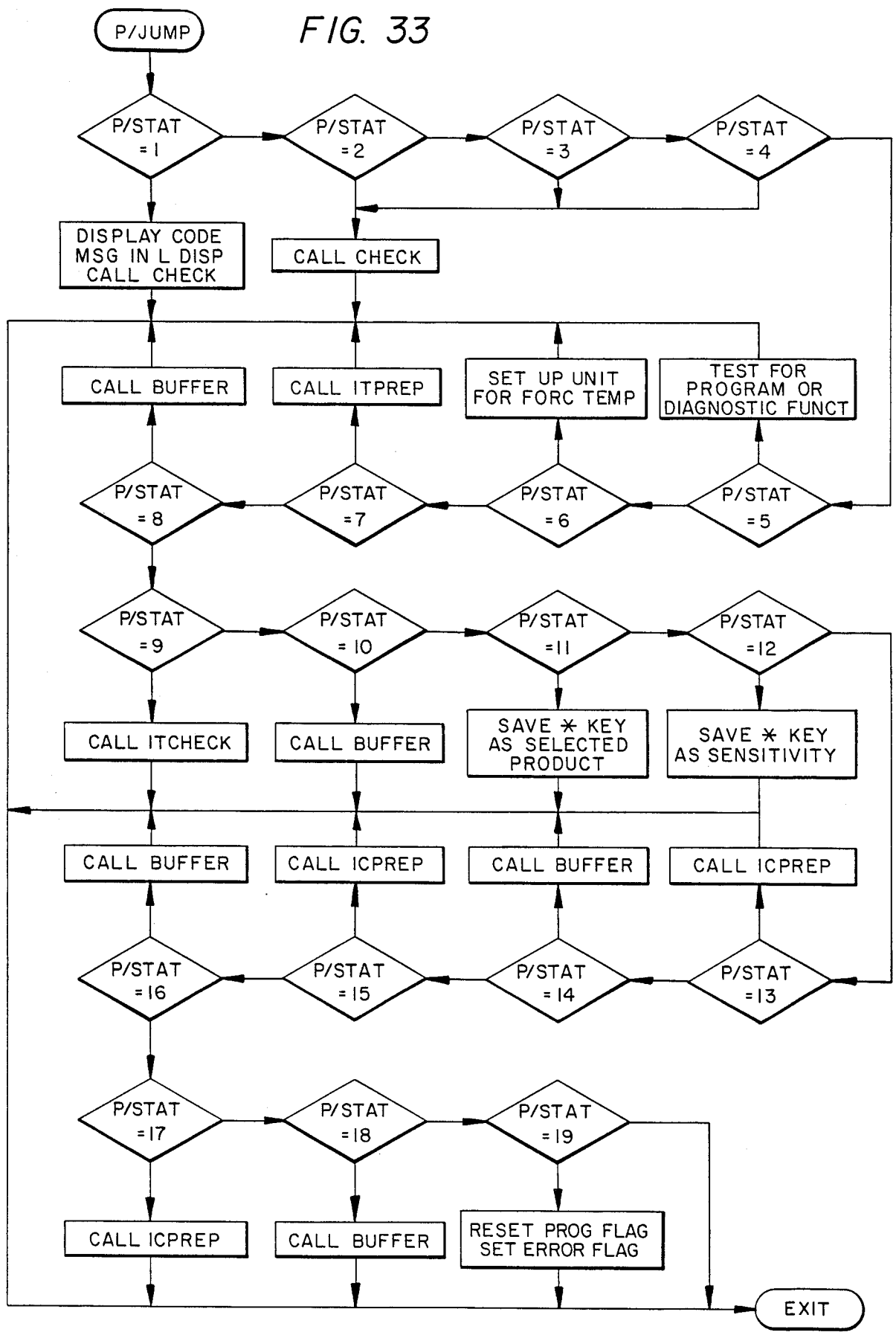
Figure 34:
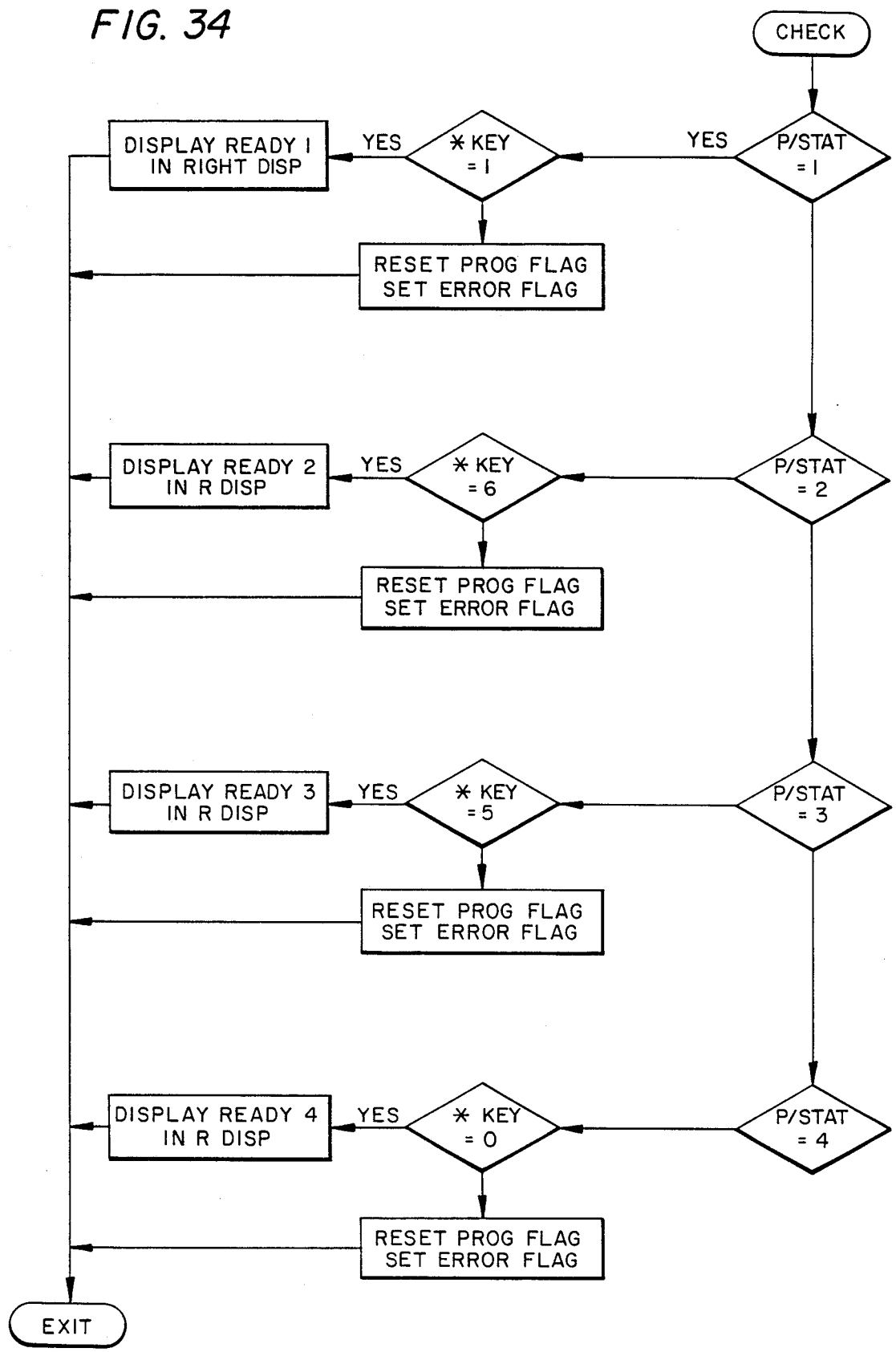
Figure 35:
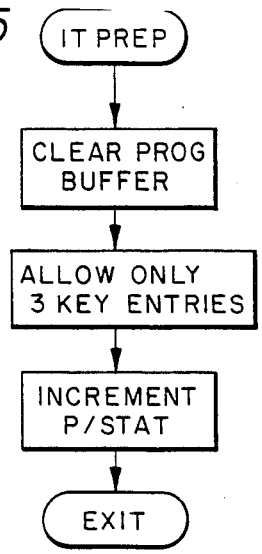
Figure 36:
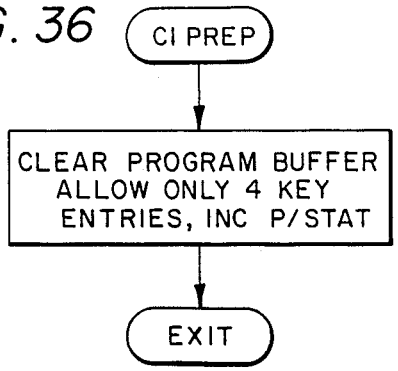
Figure 37:
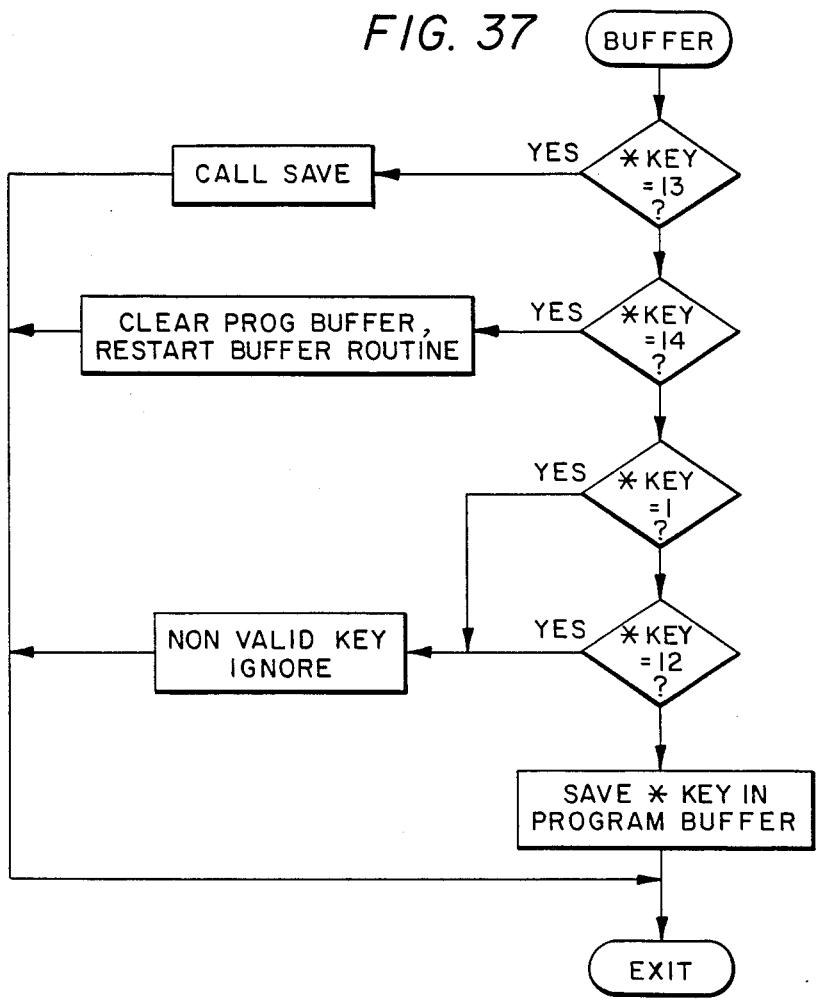
Figure 38:
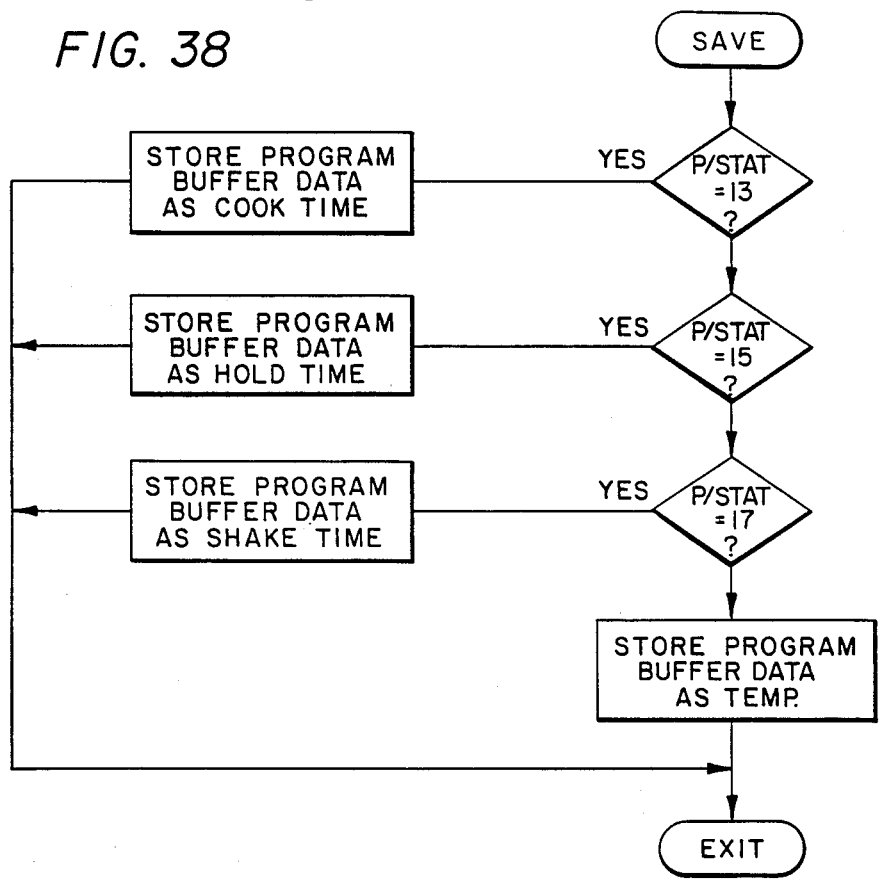
Figure 39:
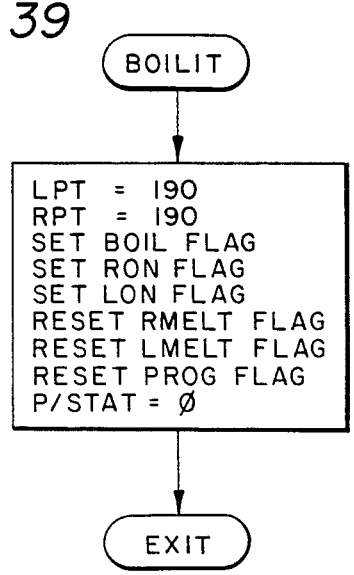
Figure 40:
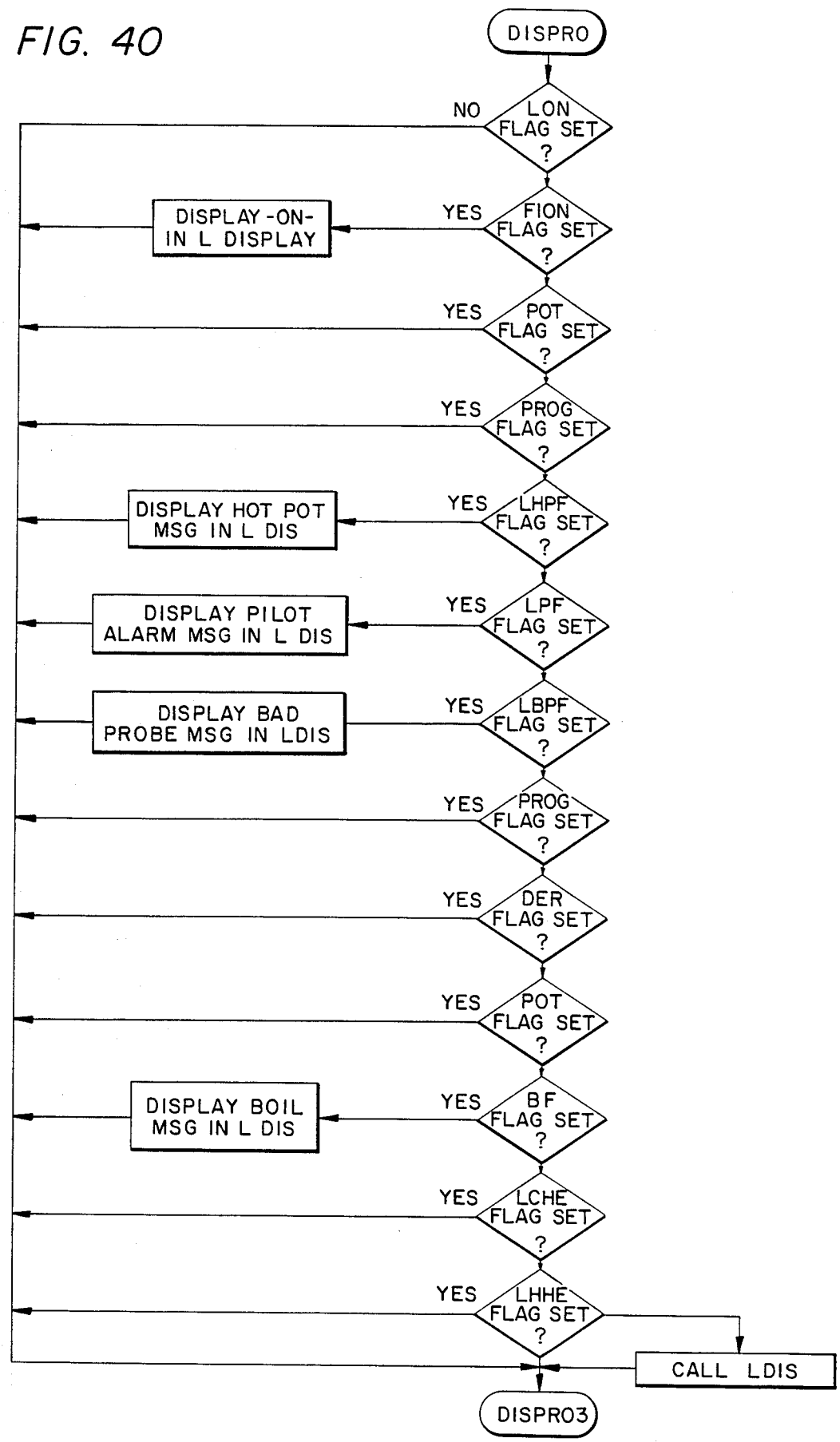
FIGS. 40 through 45 are flow charts for the operator display program.
Figure 41:
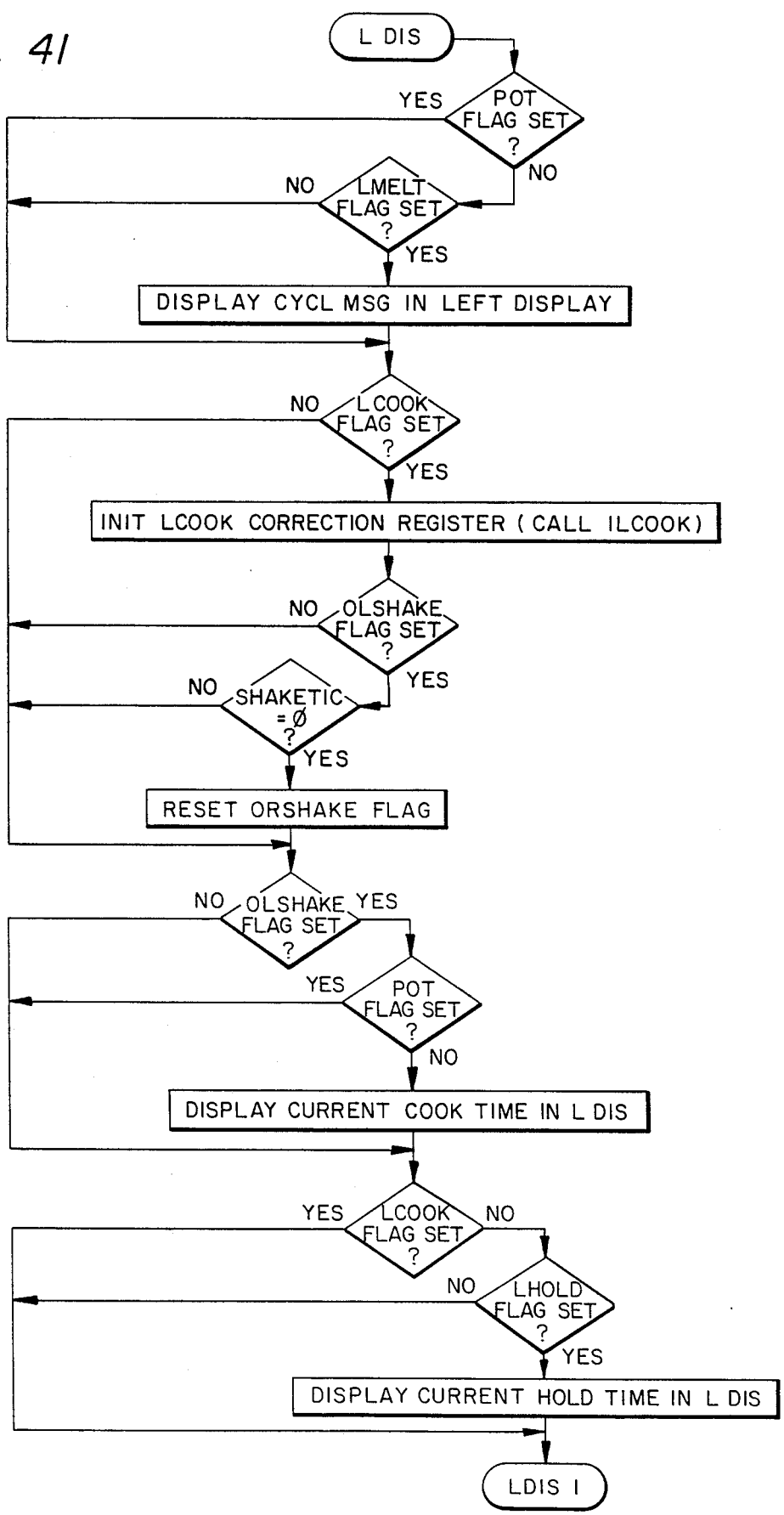
Figure 42:
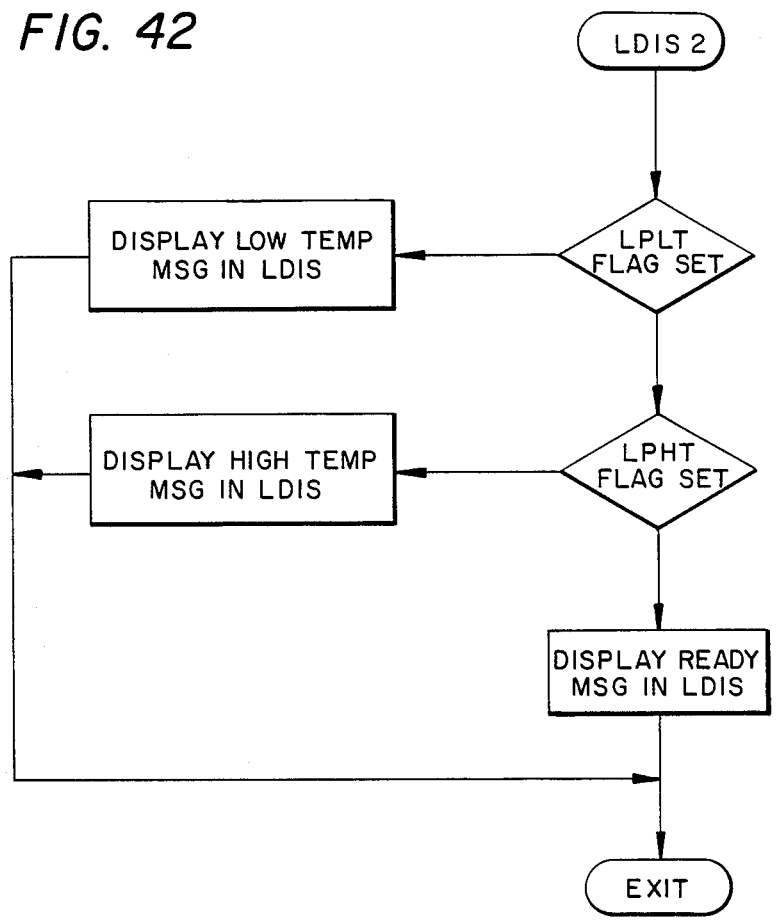
Figure 43:
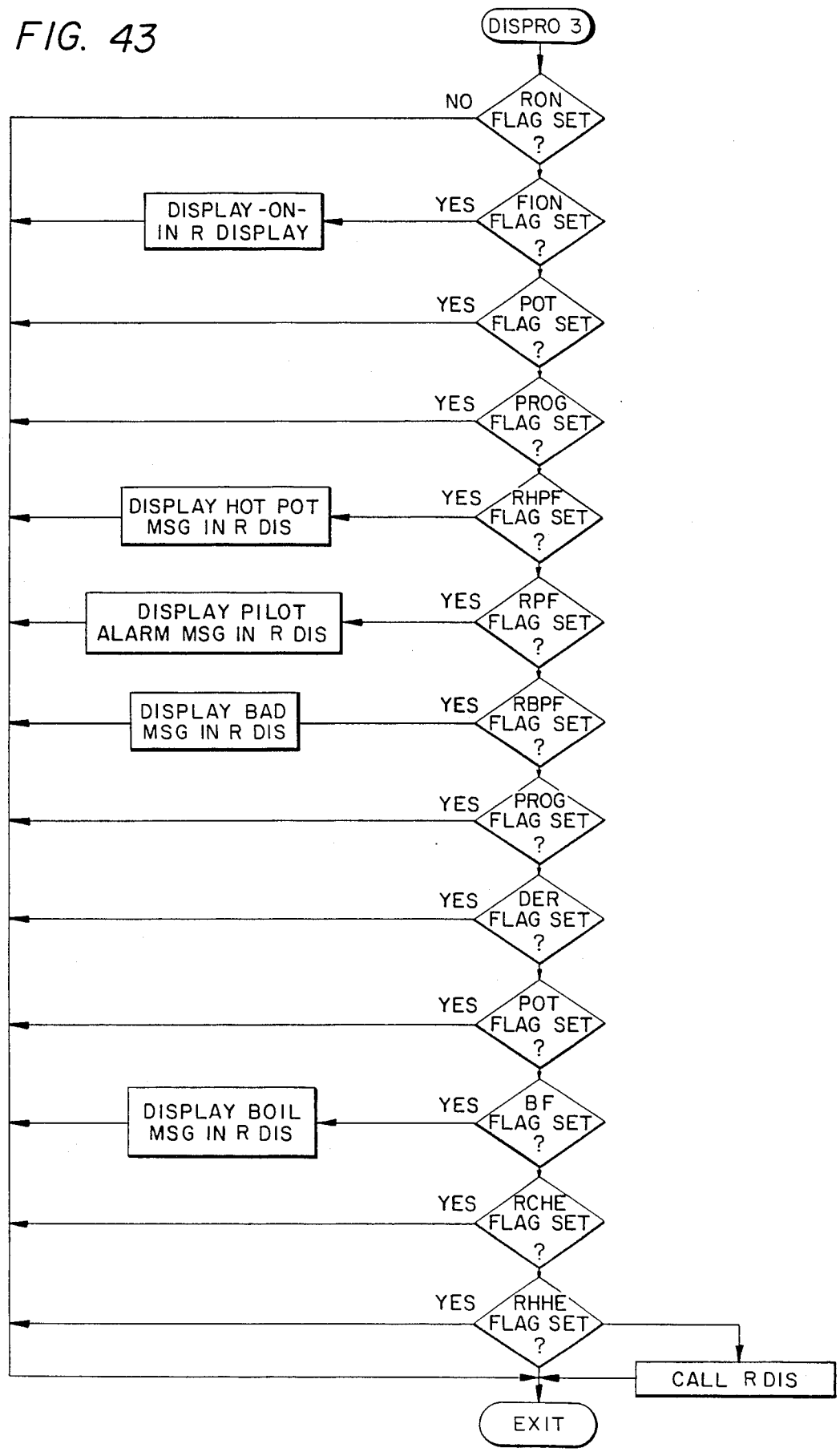
Figure 44:
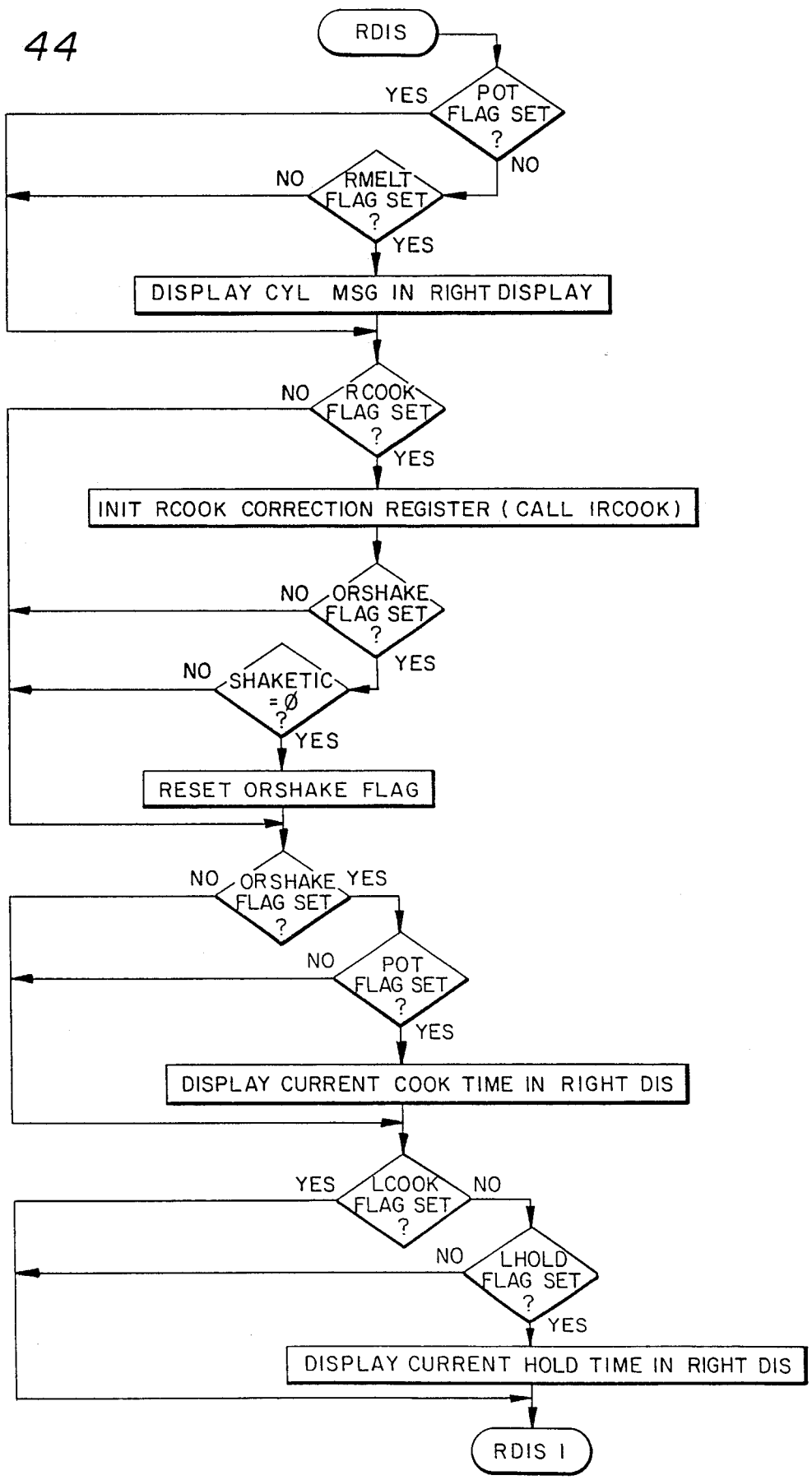
Figure 45:
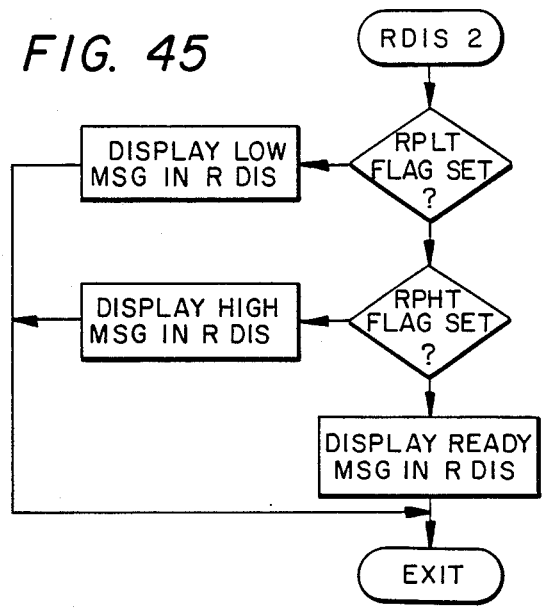
Figure 46:
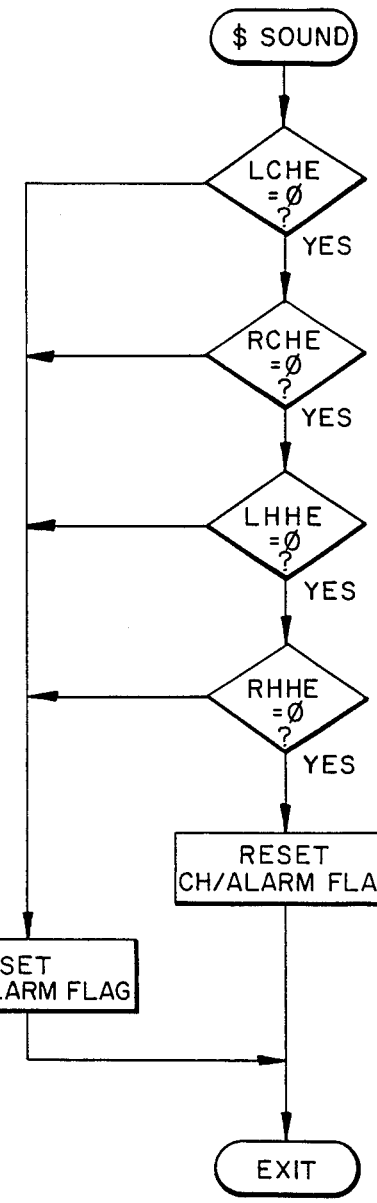
FIG. 46 is a flow chart of the sound generation routine.
Figure 47:
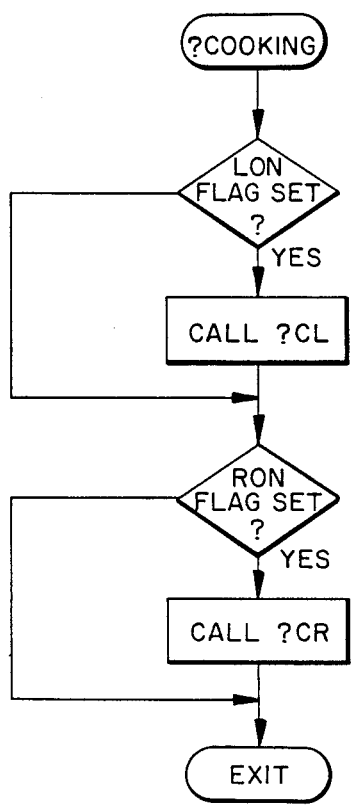
FIGS. 47 through 49 are flow charts for the cooking display routine which includes the display procedures executed during the cooking cycle.
Figure 48:
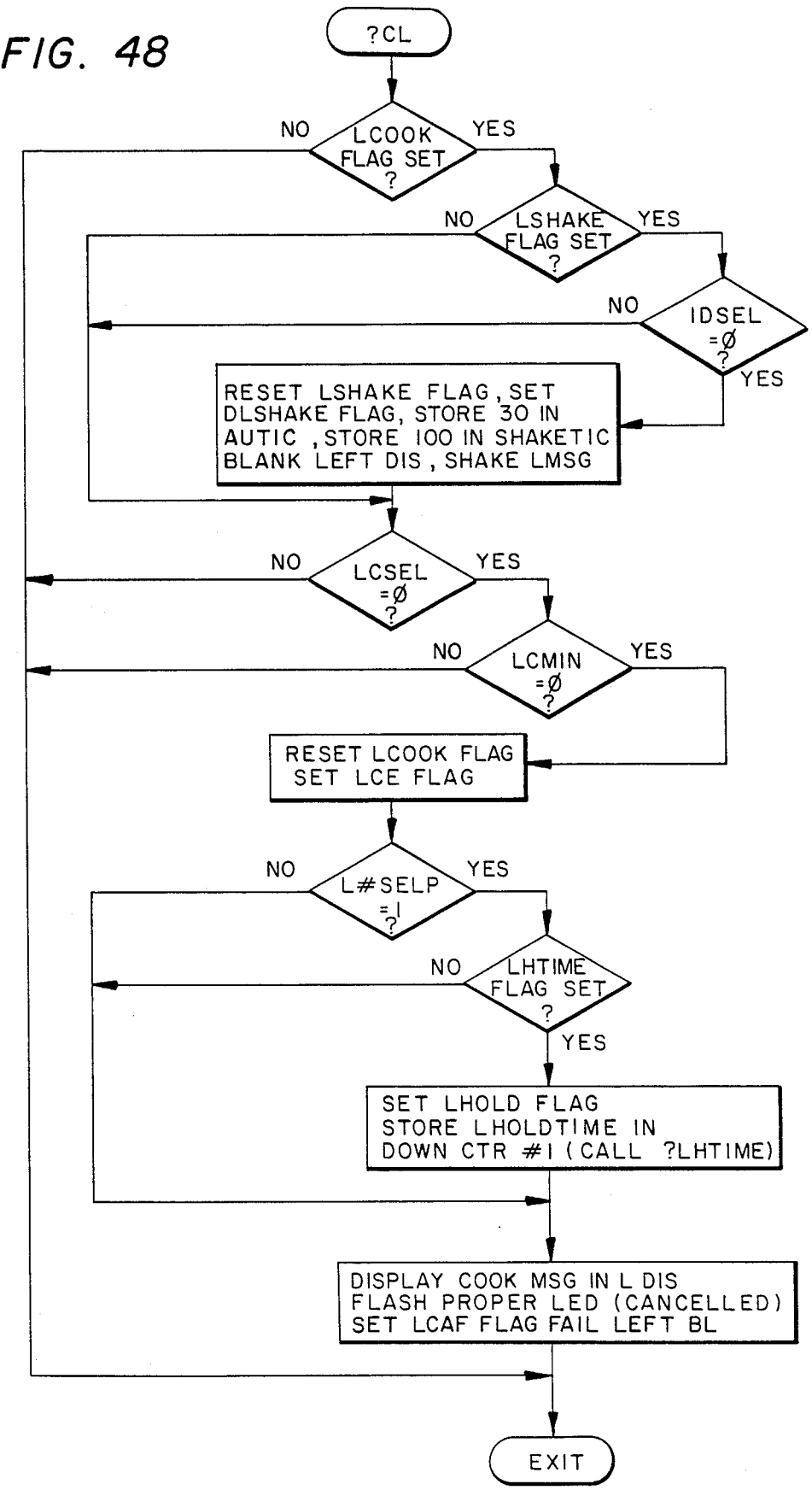
Figure 49:
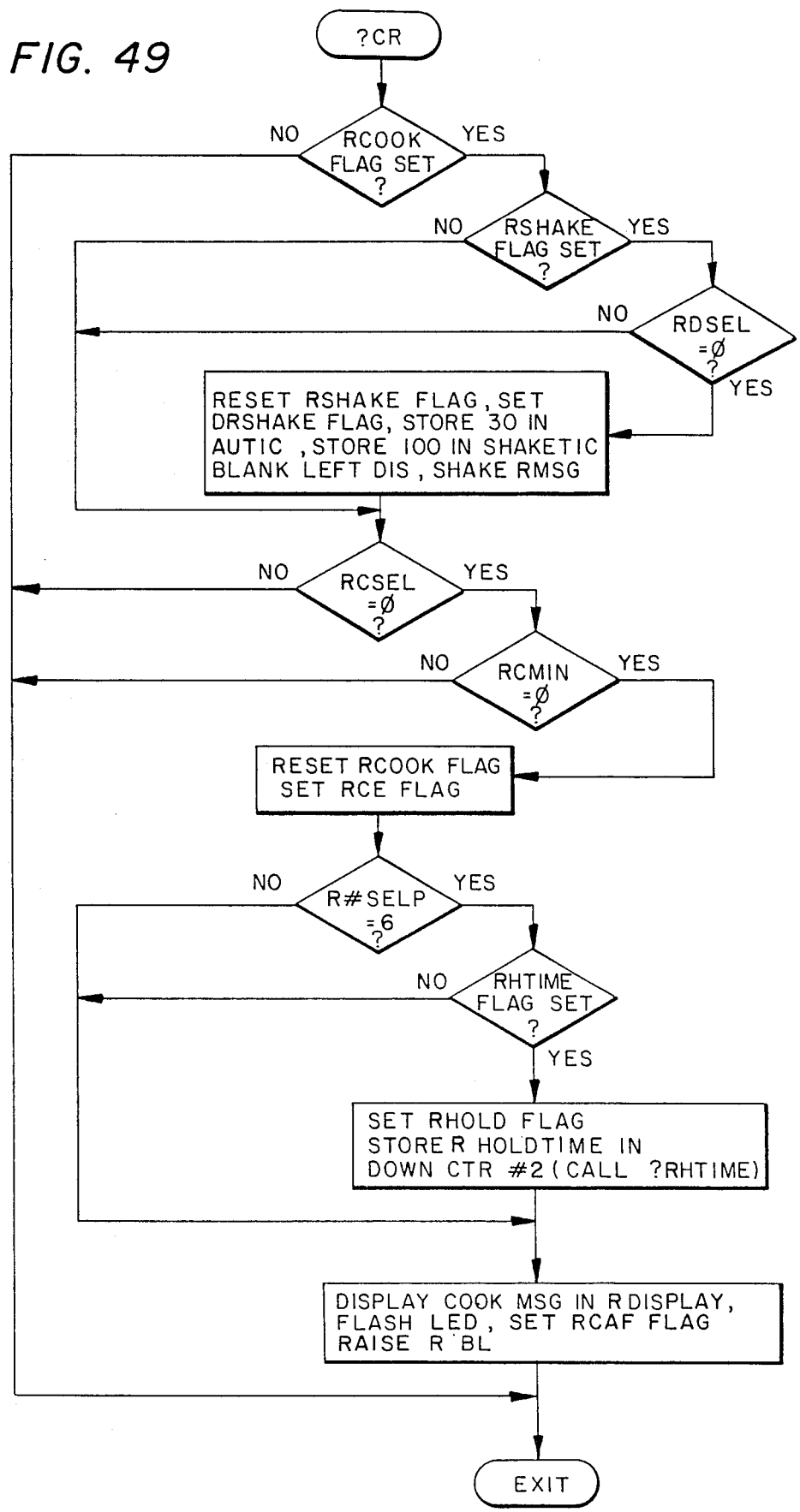
Figure 50:
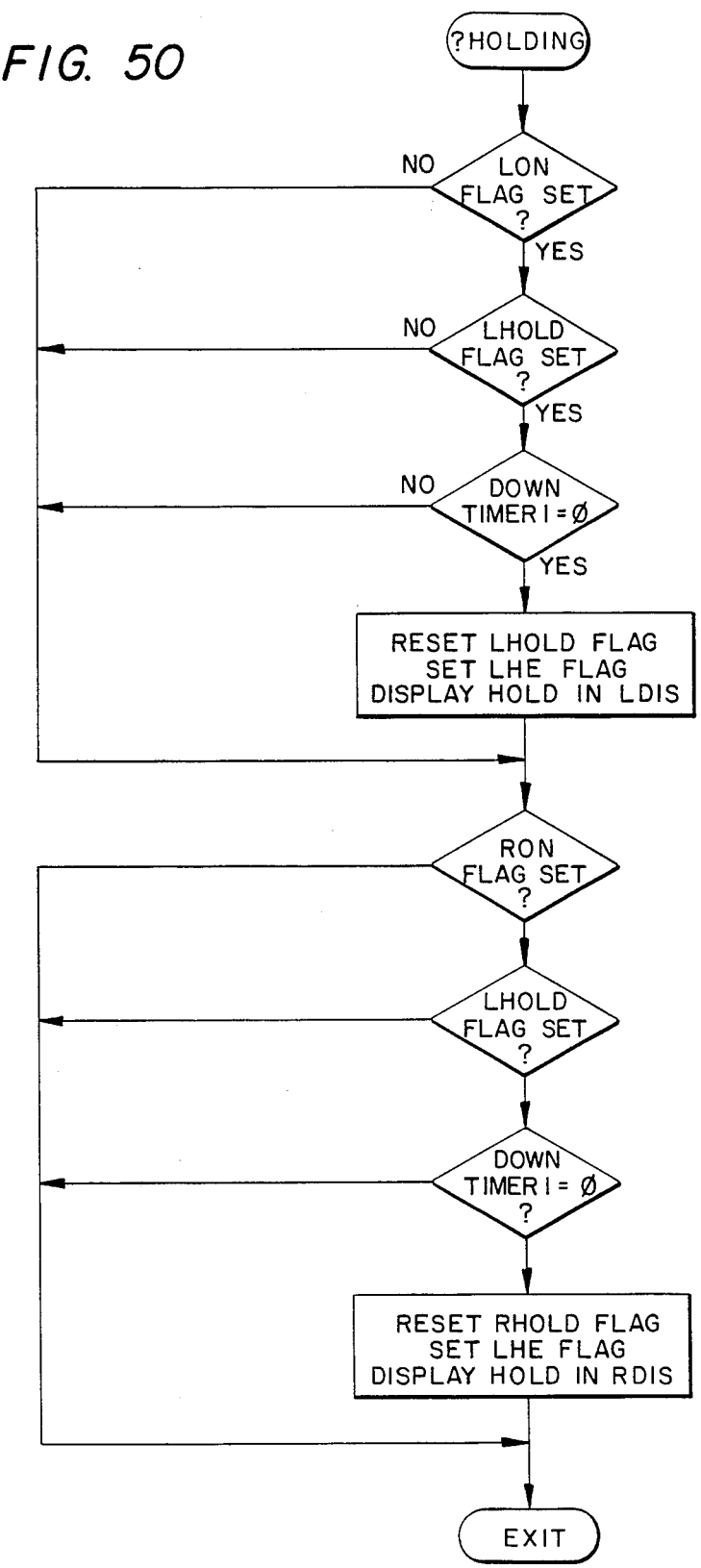
FIG. 50 is a flow chart for the holding routine which includes the display procedures during the holding cycle.
Figure 51:
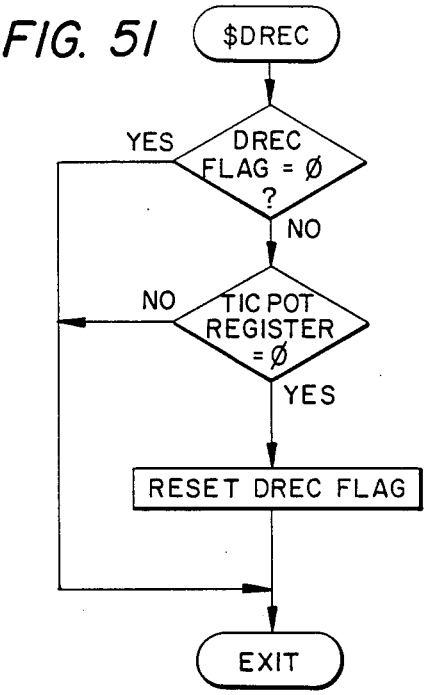
FIG. 51 is a flow chart for the recovery time display procedures routine.
Figure 53:
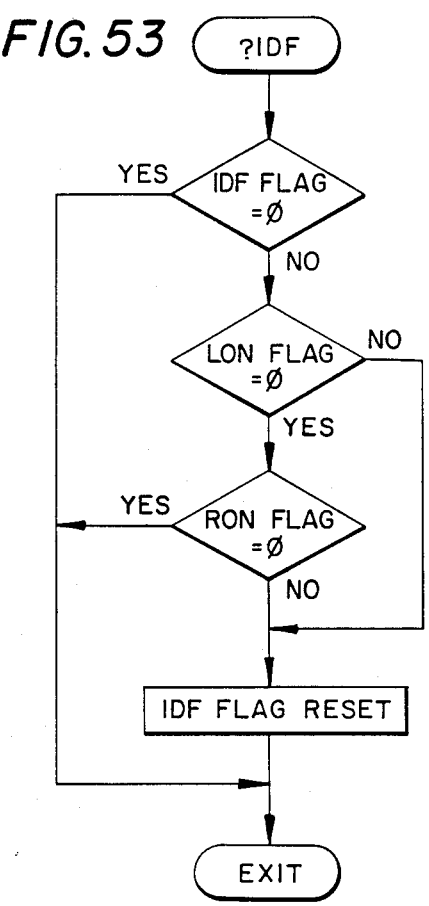
FIG. 53 is a flow chart for the interface board disable procedure routine.
Figure 52:
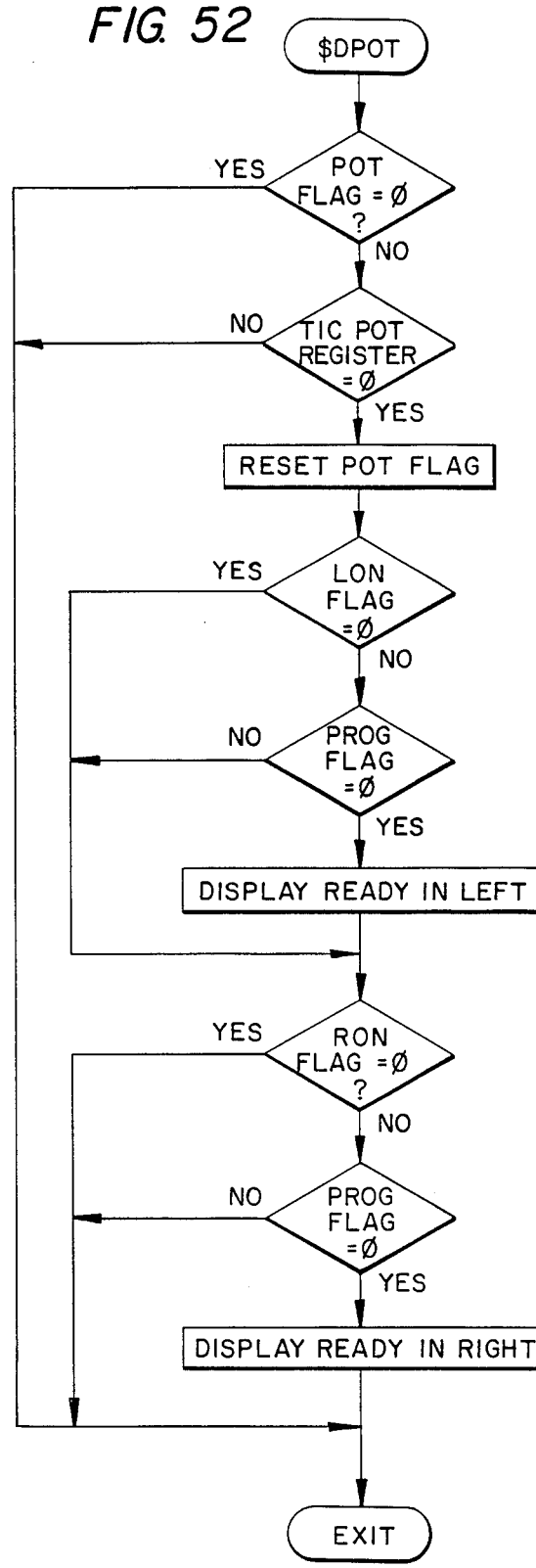
FIG. 52 is a flow chart for a display procedure routine for displaying the program temperature and the measured temperature.
Figure 54:
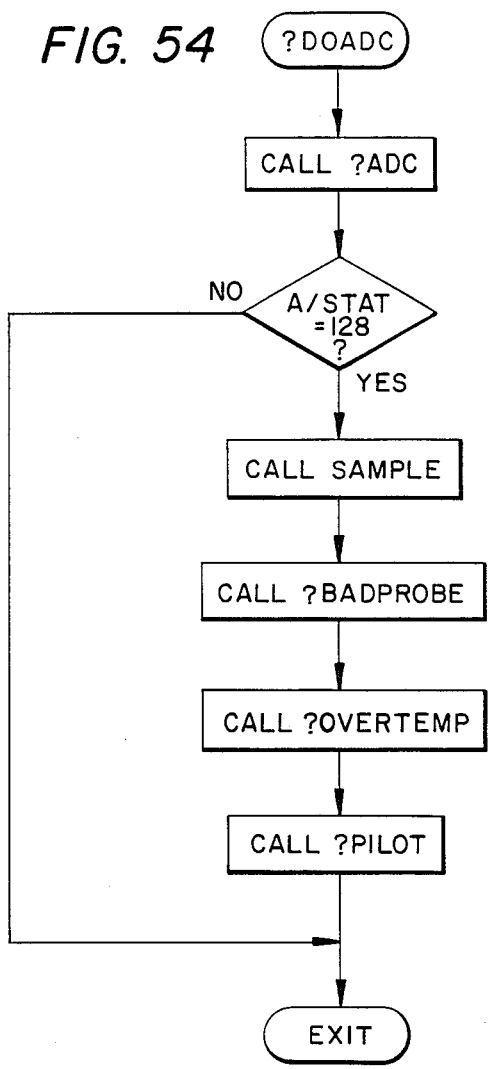
FIGS. 54 through 59 are flow charts for the analog/-digital (A/O) conversion procedures routine that include the task of sampling the A/D converters, testing for a bad probe, testing for over temperature and testing for the existence of the pilot alarm.
Figure 55:
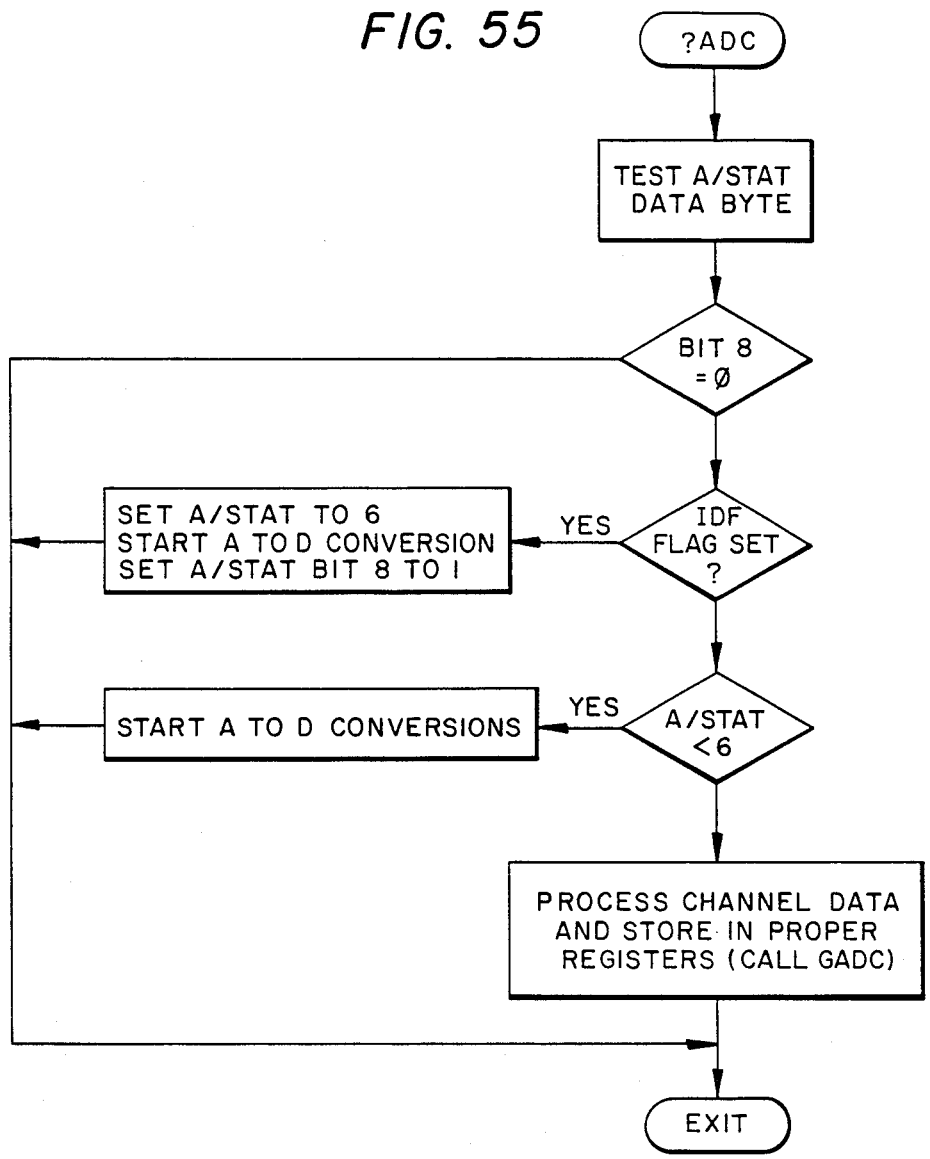
Figure 56:
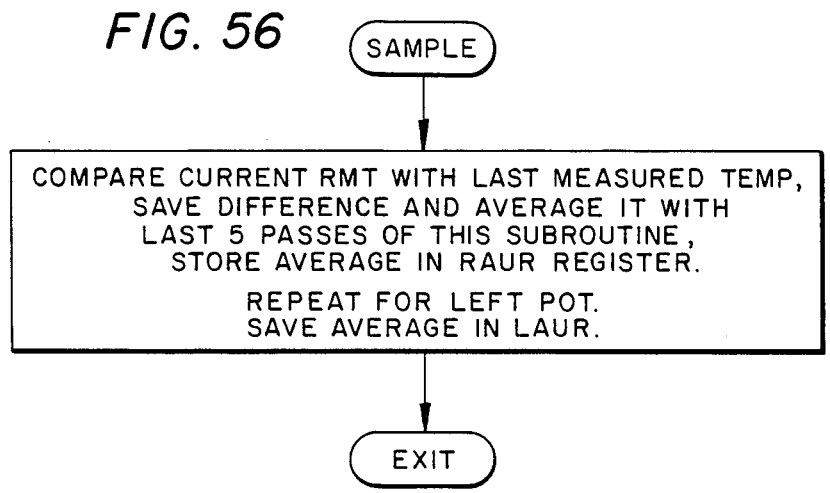
Figure 57:
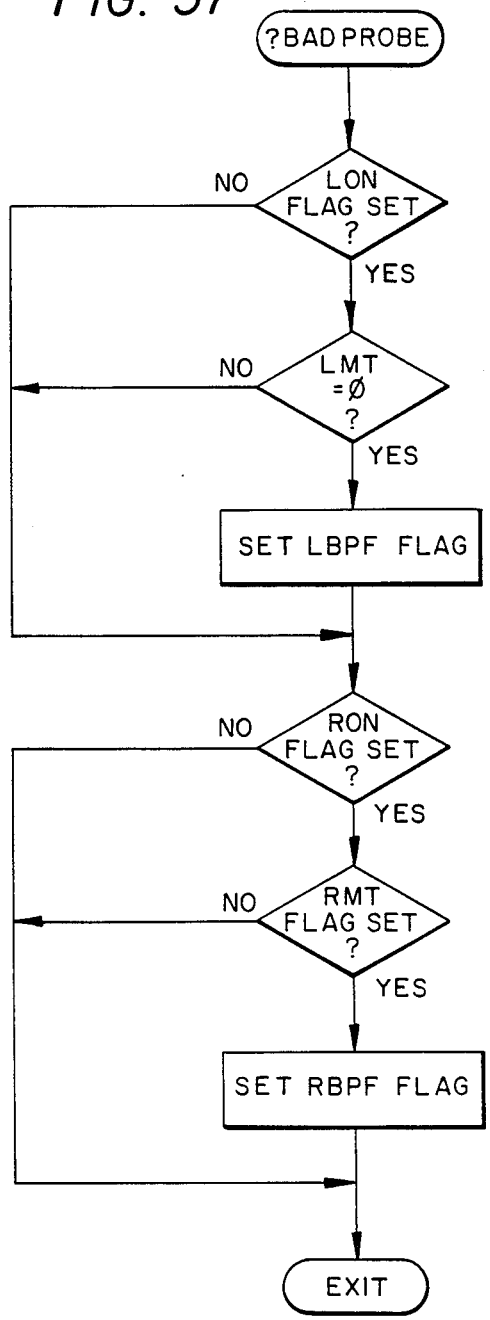
Figure 58:
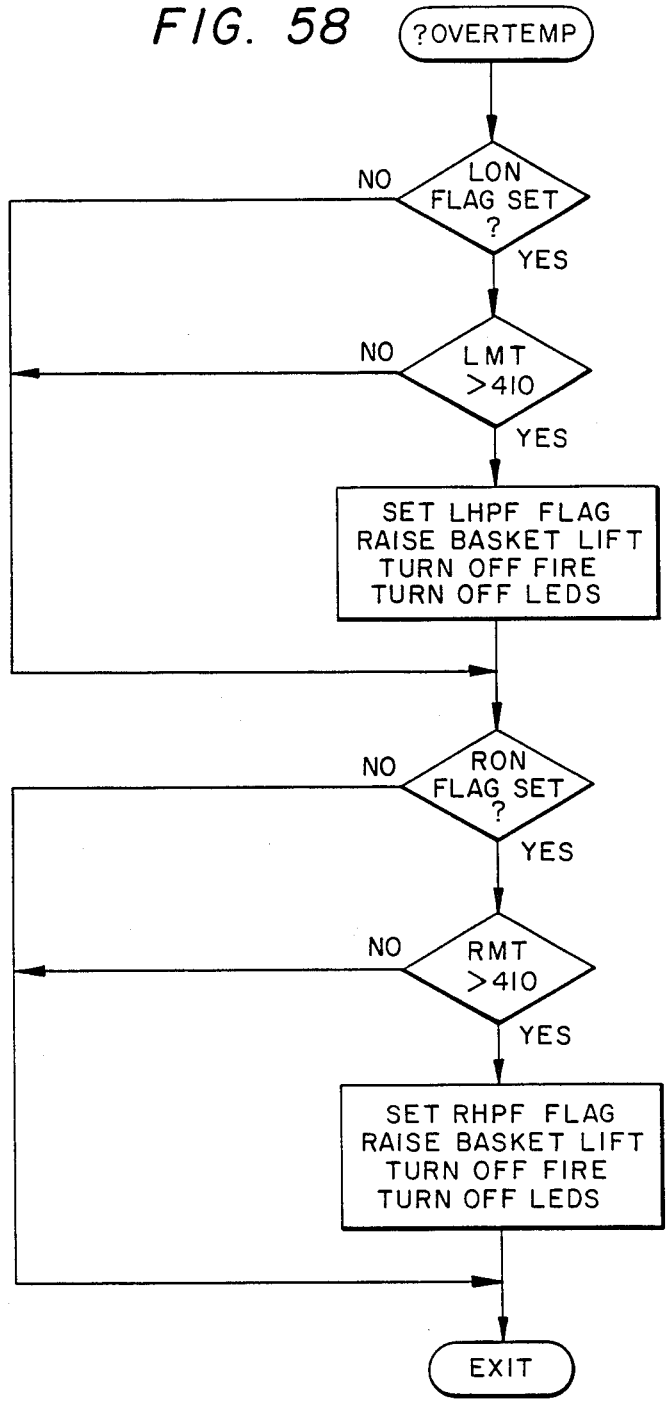
Figure 59:
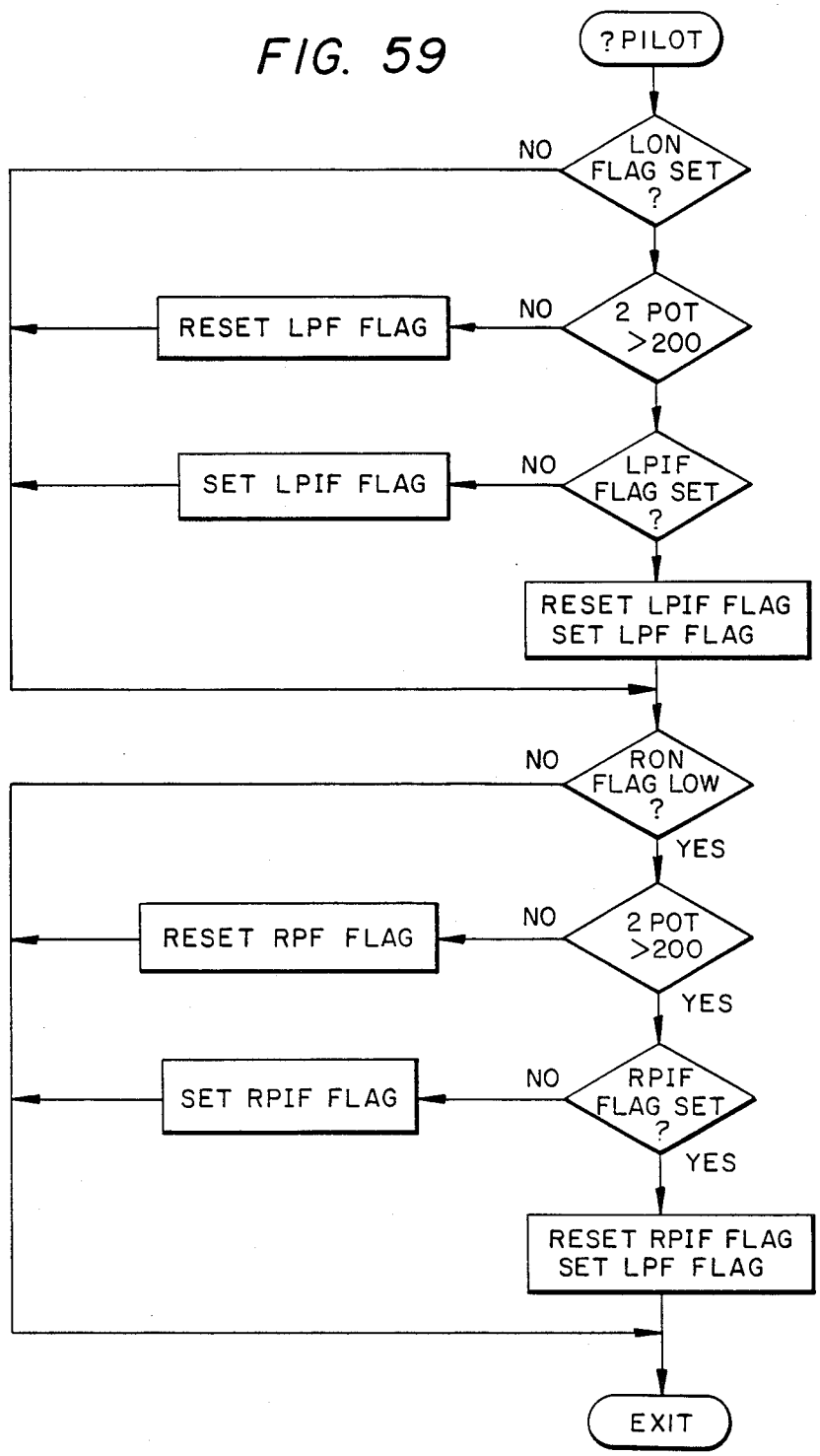
Figure 60:
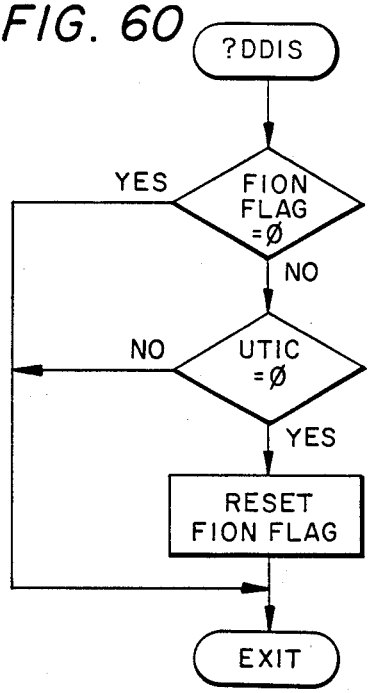
FIG. 60 is a flow chart for a delay routine.
Figure 75:
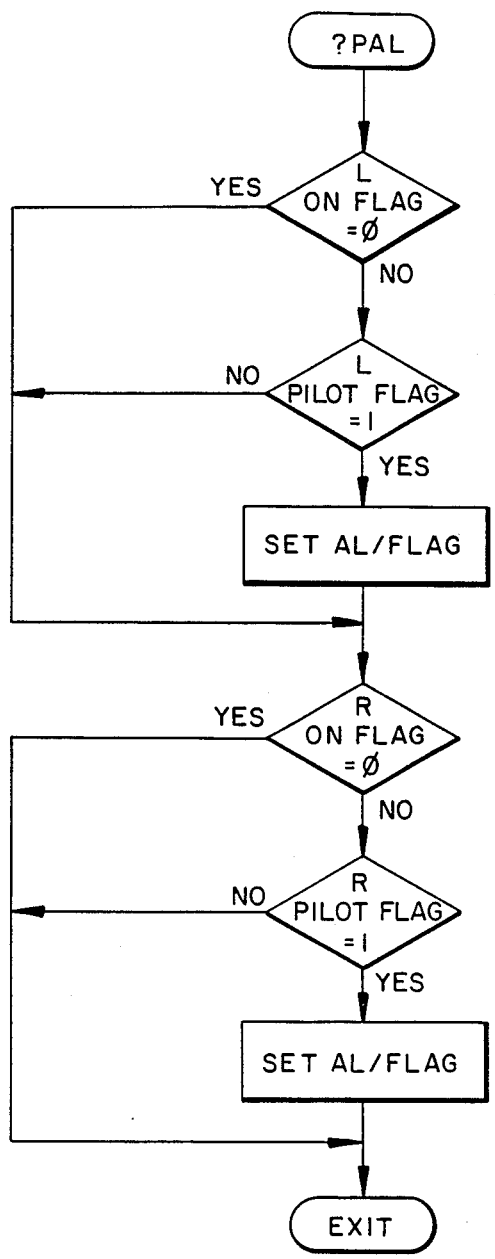
FIG. 75 is a flow chart for a procedure that sounds the alarm when the pilot is not fired.
Figure 76:
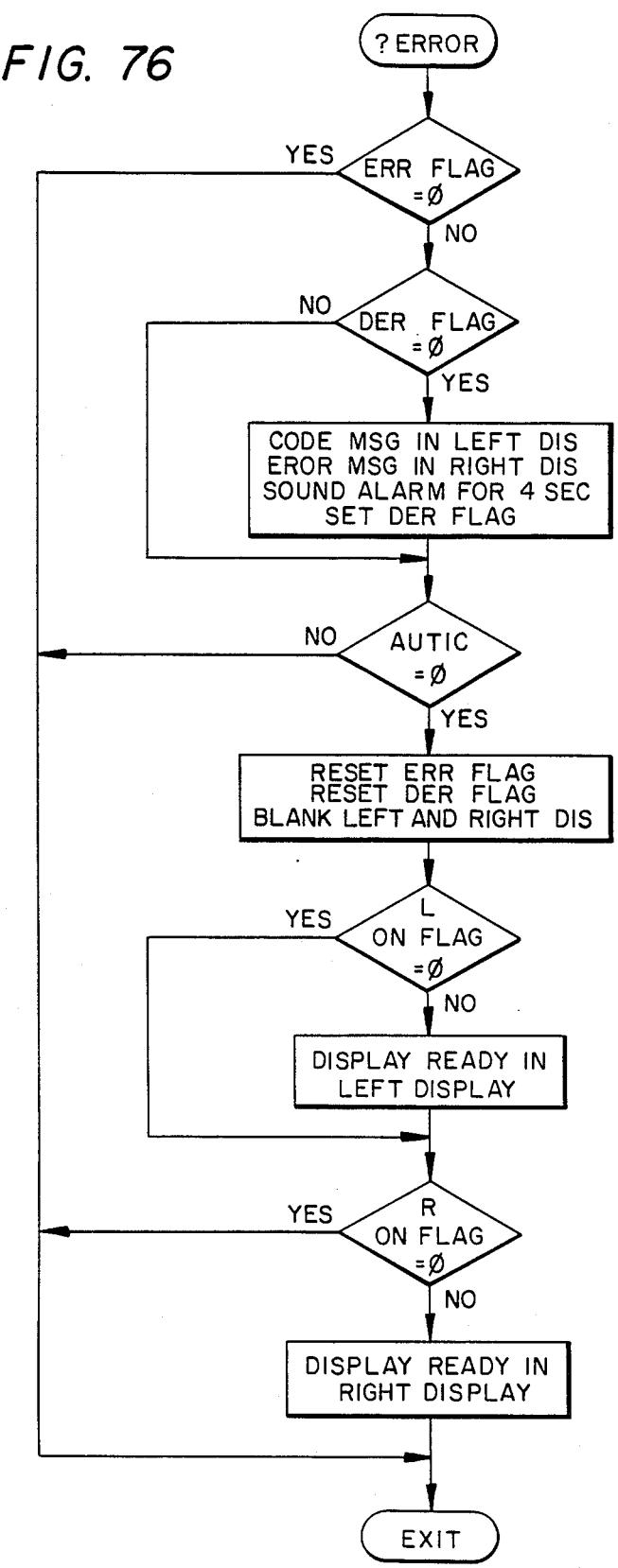
FIG. 76 is a flow chart for a procedure that is activated when there is an input code access error.

FIGS. 15 through 75 are flow charts for the system software that is contained in Appendix A. FIG. 15 is a flow chart for the power up and initialization routine. FIG. 16 is a flow chart of the Magic routine that is the principle executive operational routine. FIG. 17 is an initialization routine for the Magic executive routine. FIGS. 18 through 39 are flow charts for the keyboard processing routines. FIGS. 40 through 45 are flow charts for the operator display program. FIG. 46 is a flow chart of the sound generation routine. FIGS. 47 through 49 are flow charts for the cooking display routine which includes the display procedures executed during the cooking cycle. FIG. 50 is a flow chart for the holding routine which includes the display procedures during the holding cycle. FIG. 51 is a flow chart for the recovery time display procedures routine. FIG. 52 is a flow chart for a display procedure routine for displaying the program temperature and the measured temperature. FIG. 53 is a flow chart for the interface board disable procedure routine. FIGS. 54 through 59 are flow charts for the analog/digital (A/O) conversion procedures routine that include the task of sampling the A/D converters, testing for a bad probe, testing for over temperature and testing for the existence of the pilot alarm. FIG. 60 is a flow chart for a delay routine.

Figure 61:
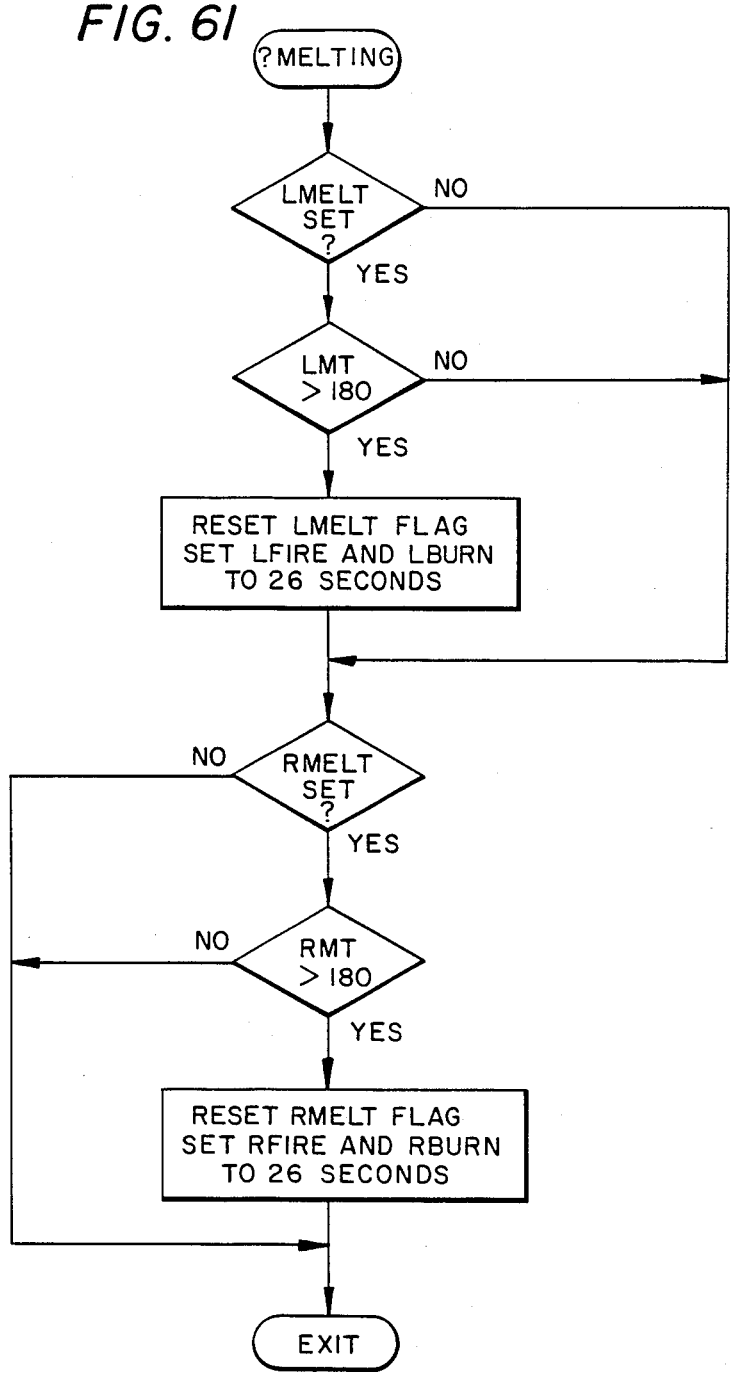
FIG. 61 is a flow chart for the melt cycle procedure routine.
Figure 62:
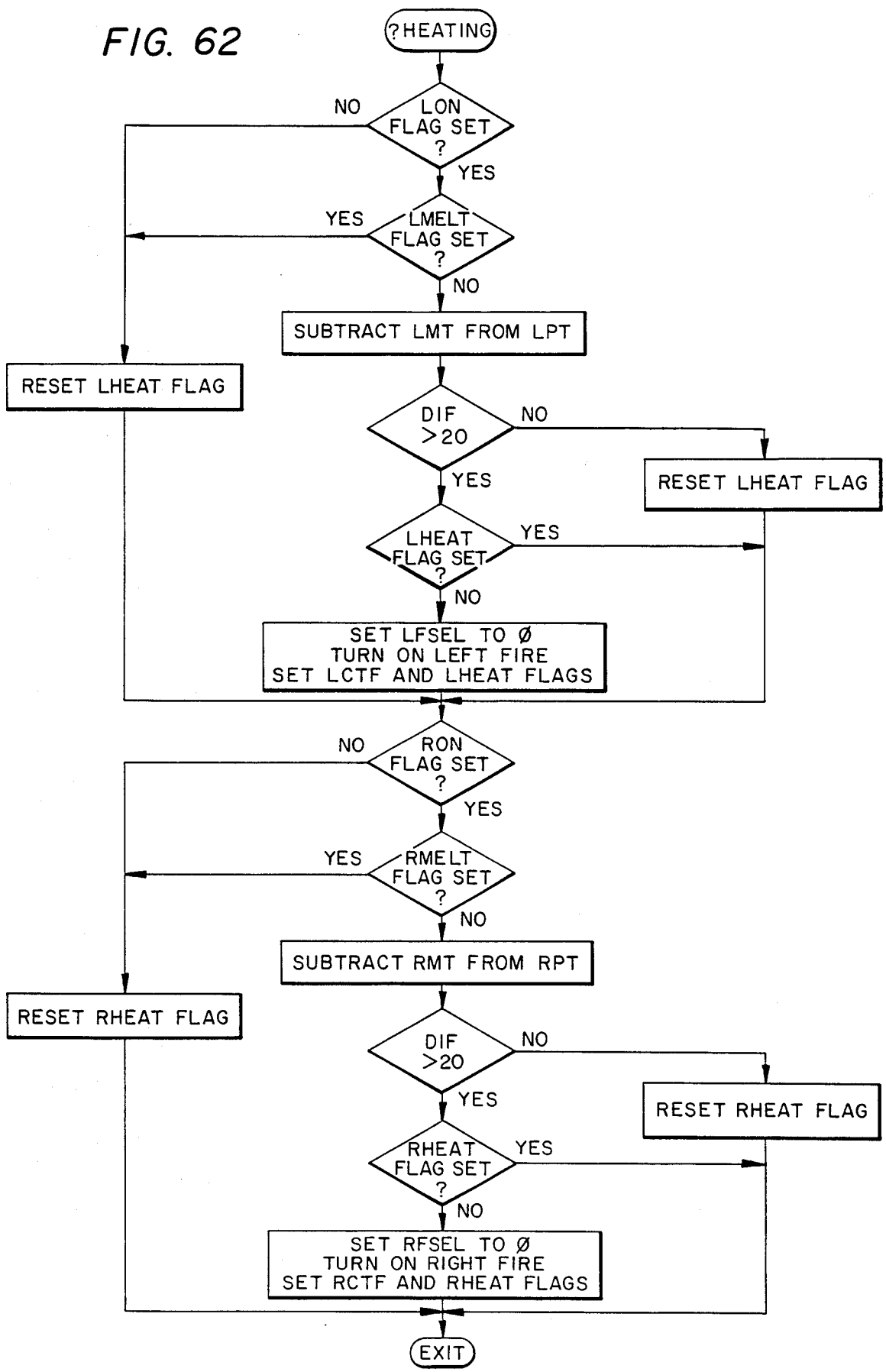
FIG. 62 is a flow chart for the heating cycle procedure that controls the heating of the vat from 180 degrees to 20 degrees below the designated operating temperature.
Figure 63:
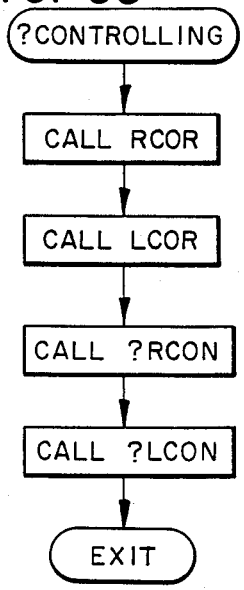
FIGS. 63 through 67 are flow charts for the controlling routine which controls the rate of temperature rise and the amount of heat provided to the cooking oil.
Figure 64:
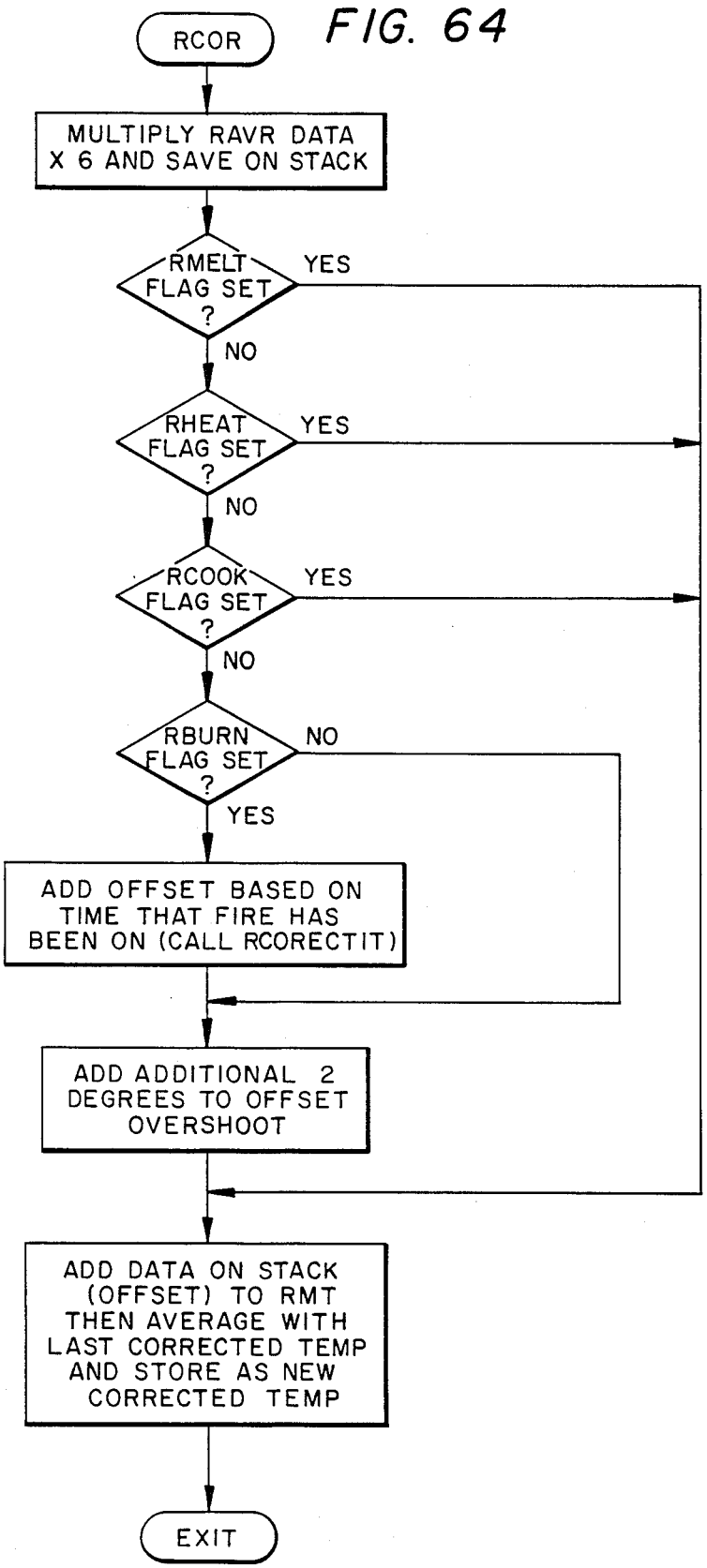
Figure 65:
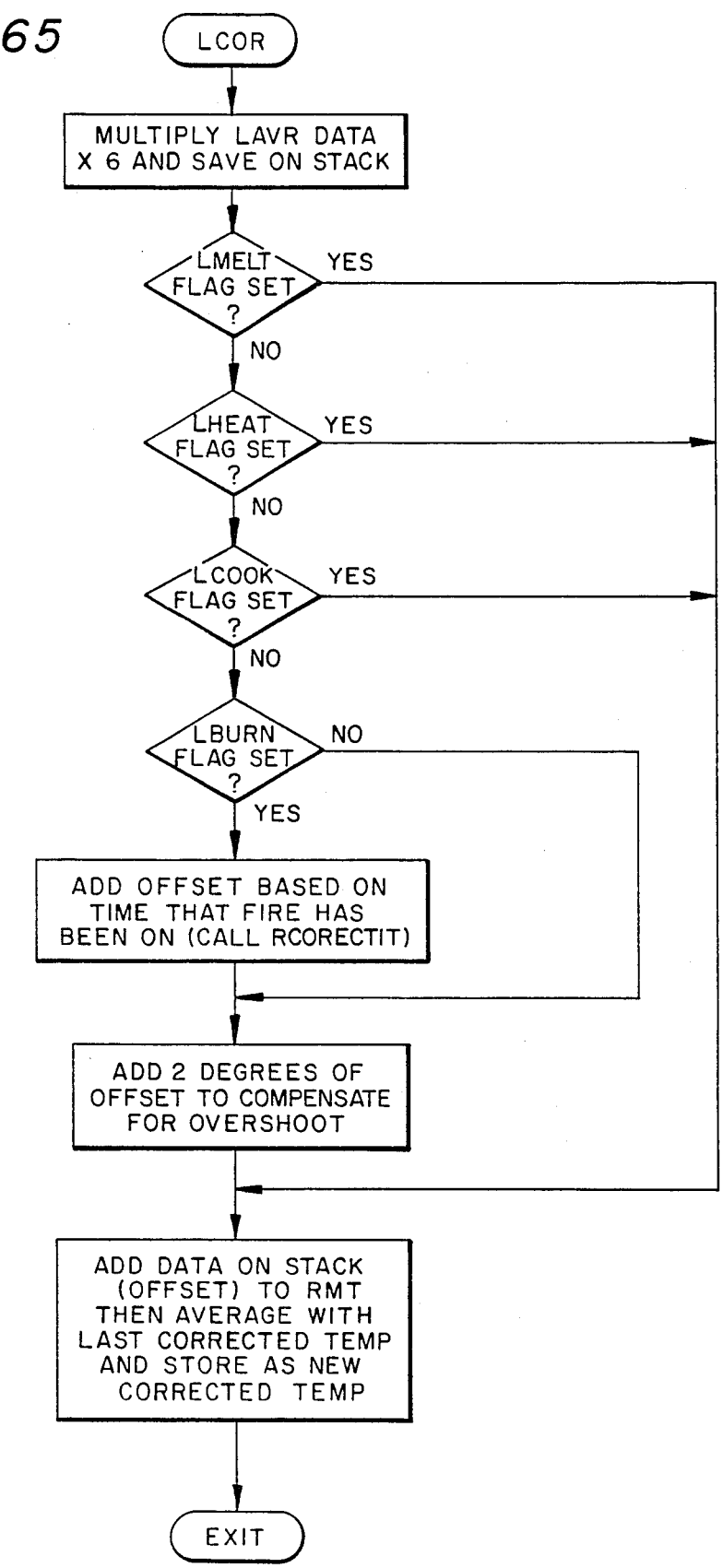
Figure 66:
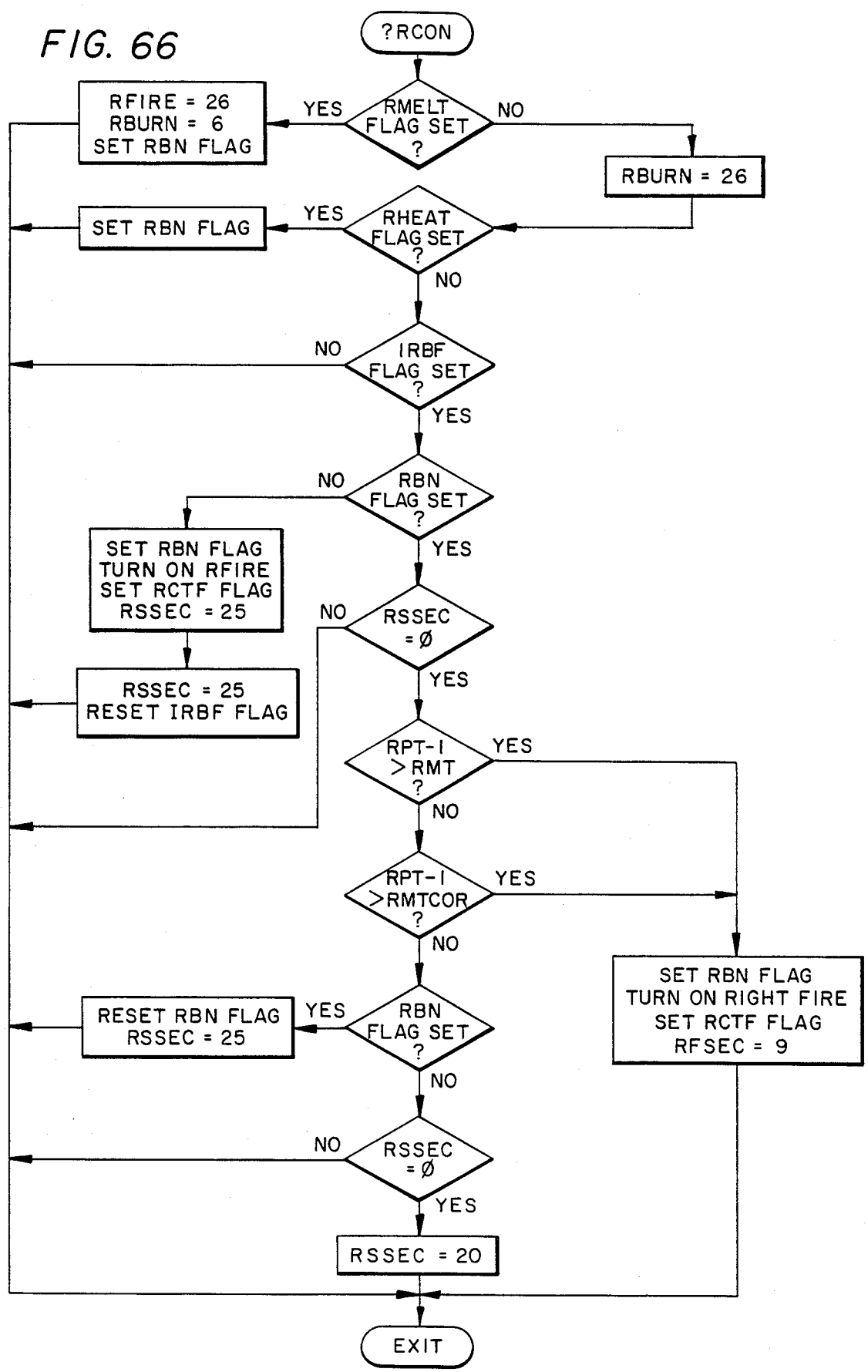
Figure 67:
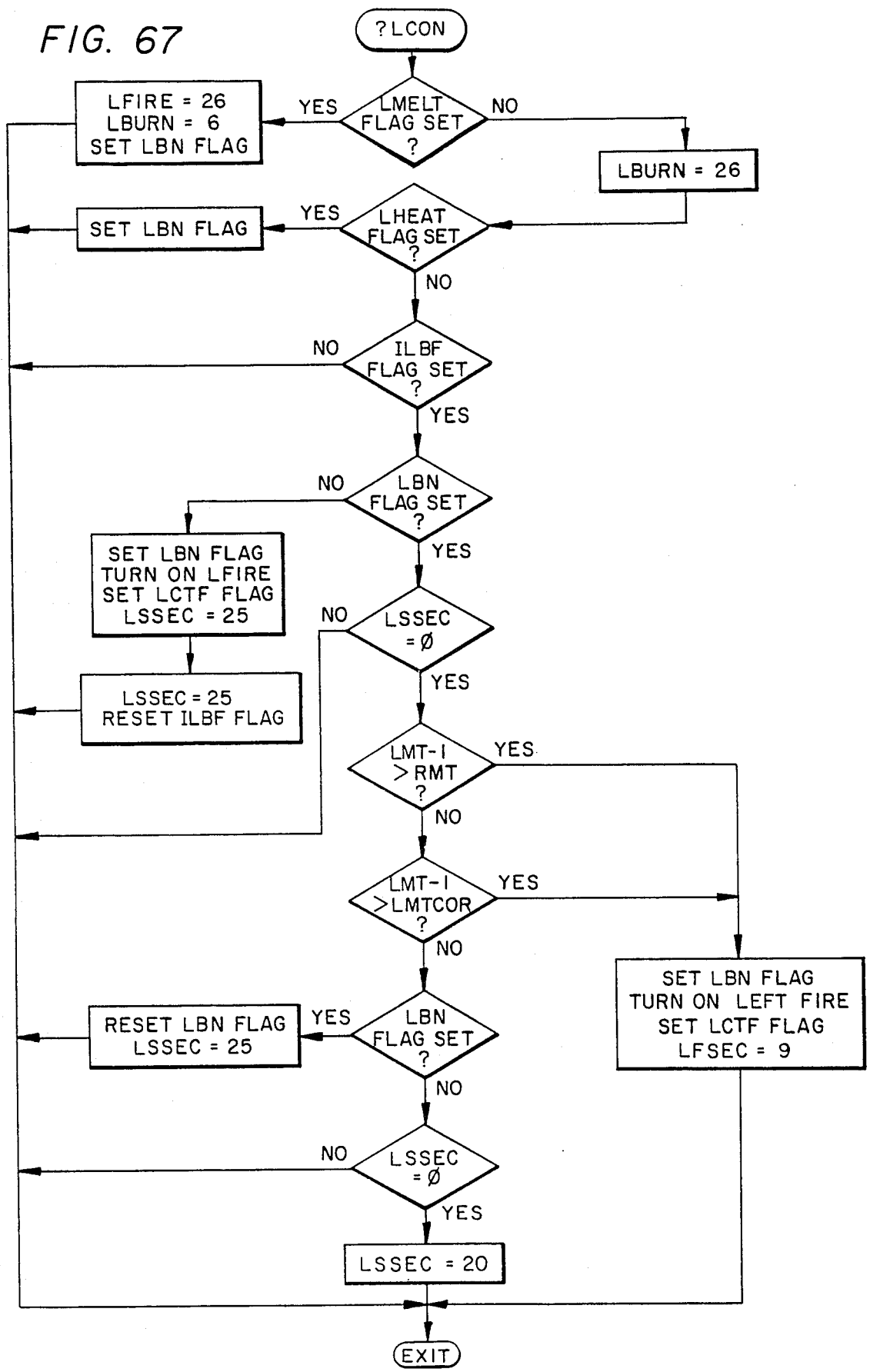
Figure 68:
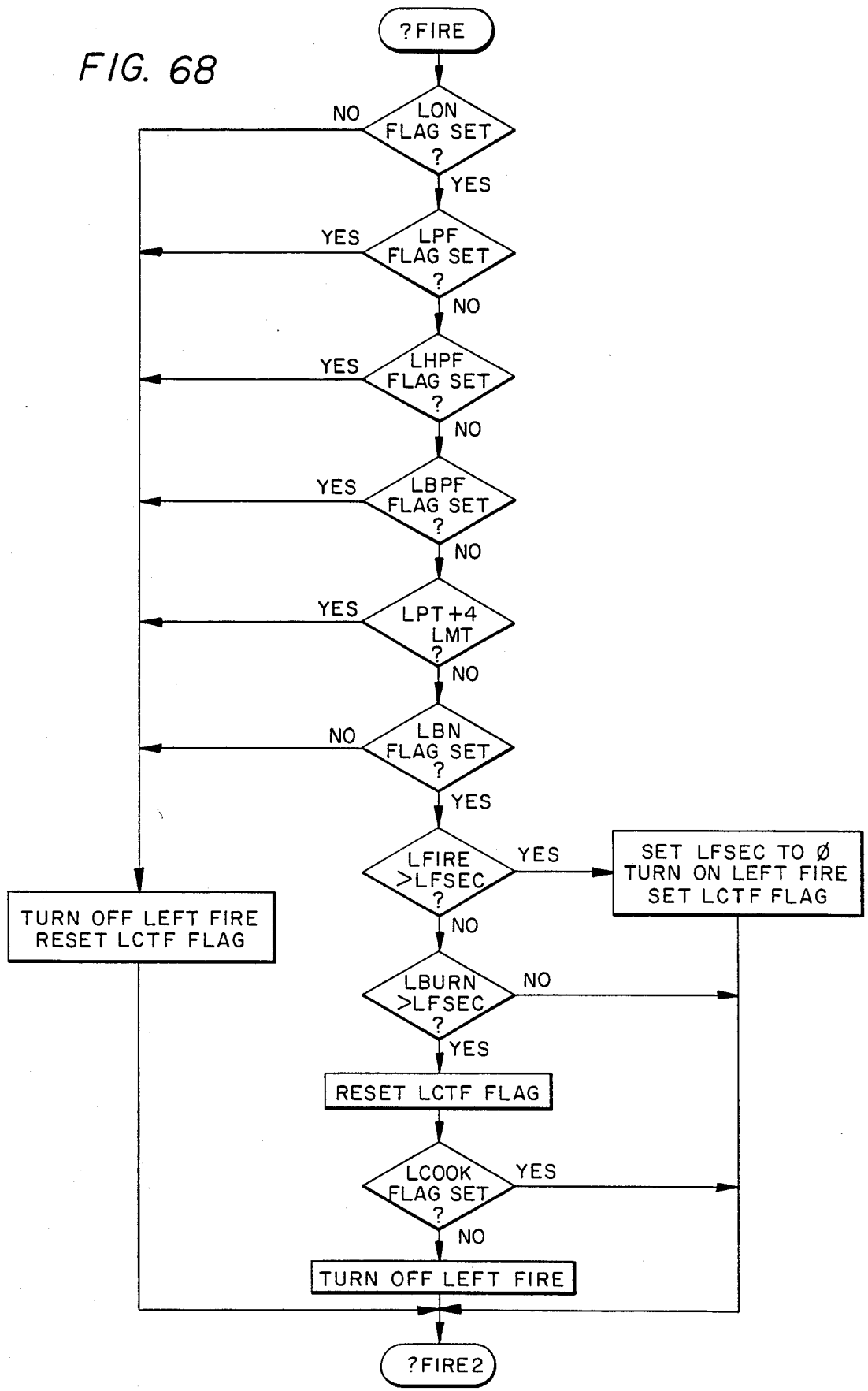
FIGS. 68 and 69 are flow charts for the gas valve control procedures routine.
Figure 69:
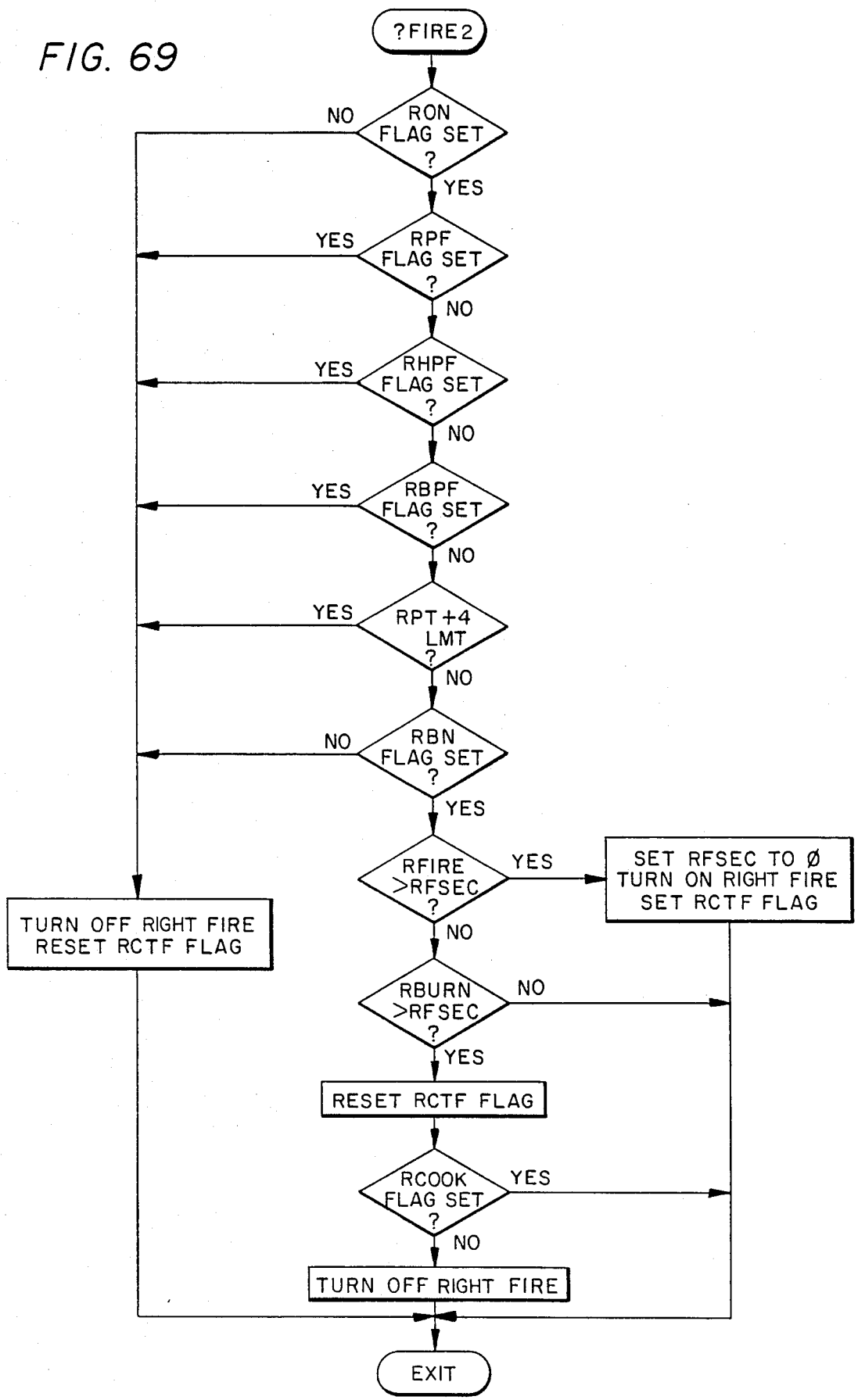
Figure 70:
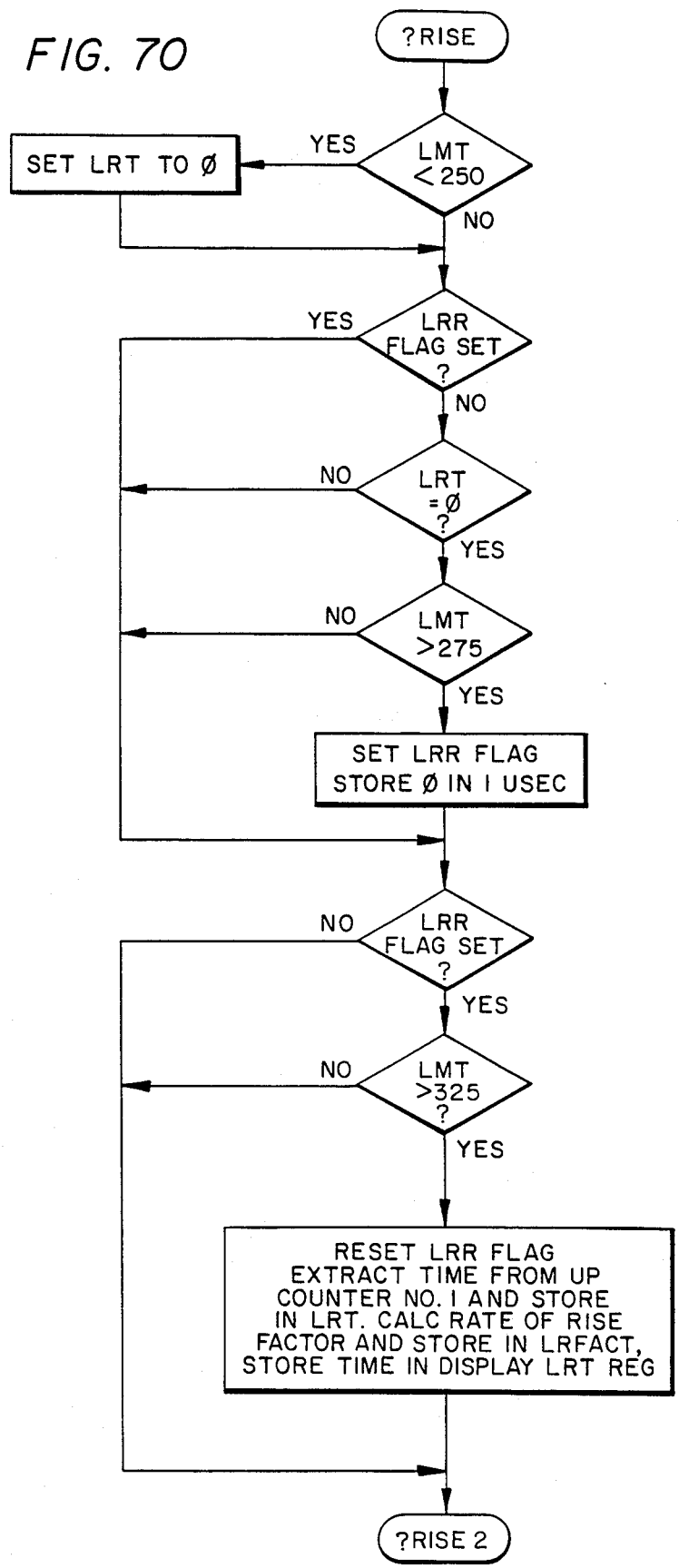
FIGS. 70 and 71 are flow charts for the procedure that computes the rate of temperature rise.
Figure 71:
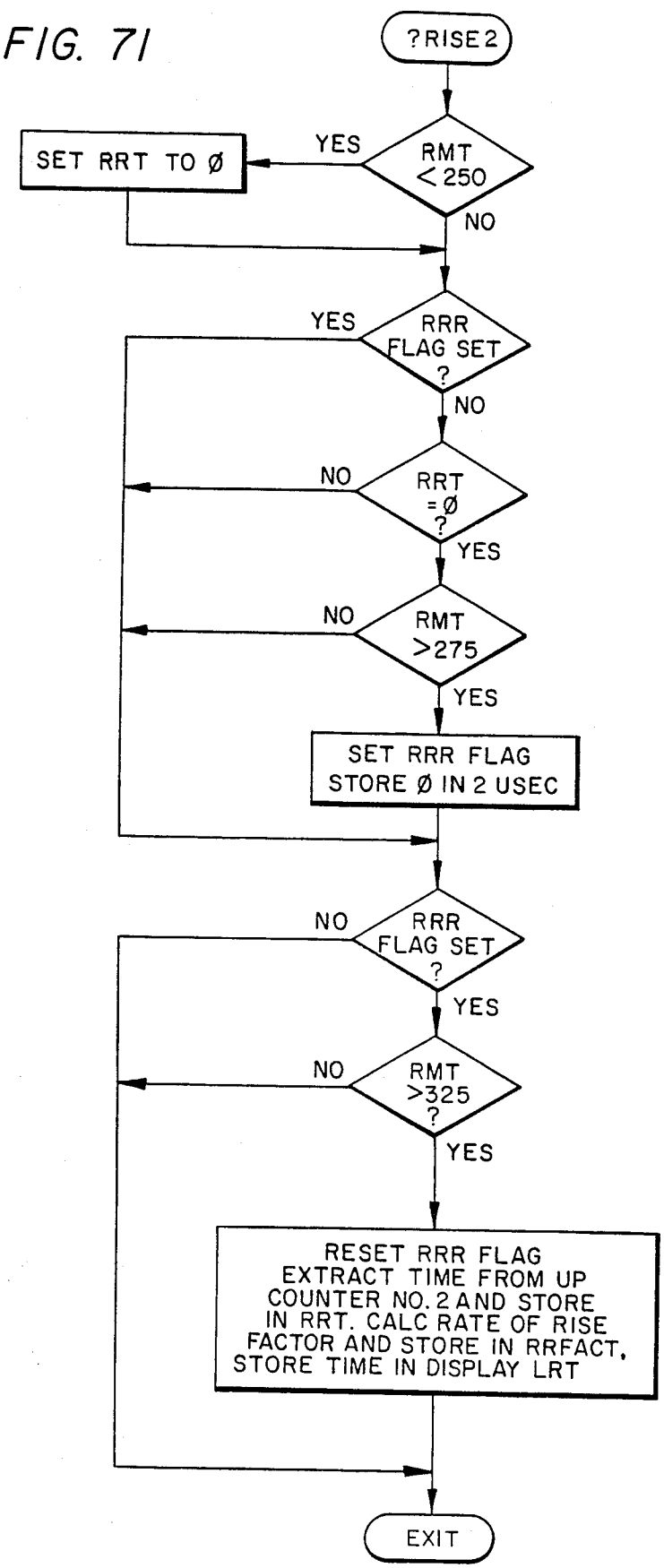
Figure 72:
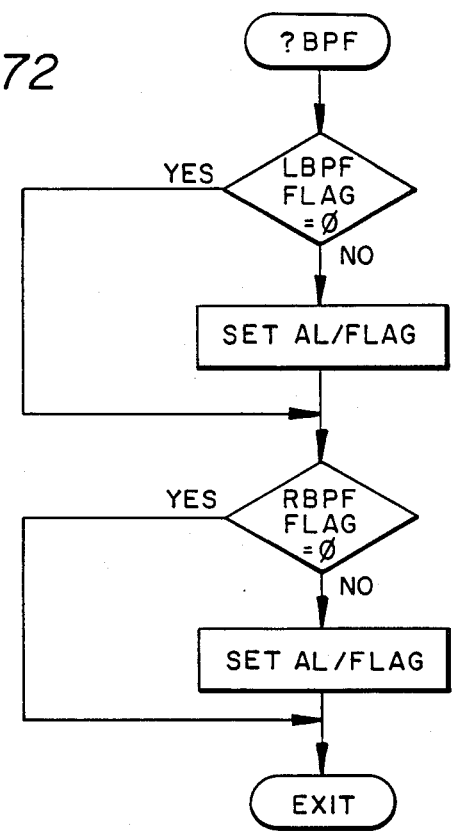
FIG. 72 is a flow chart of the procedure that sounds the alarm when a bad probe is found.
Figure 73:
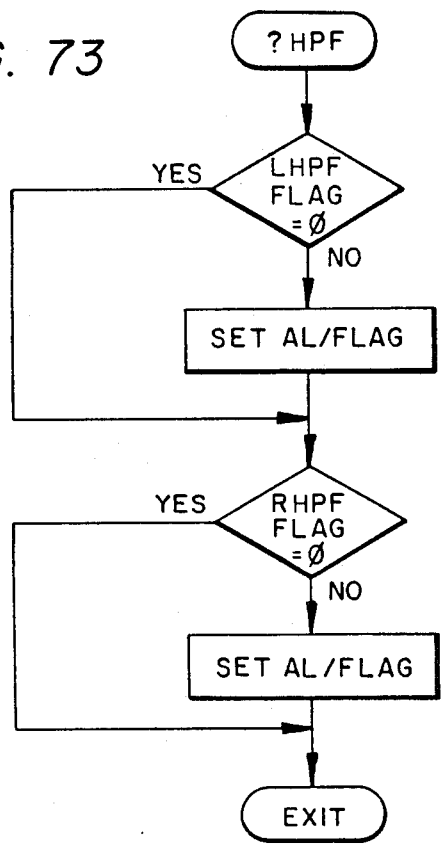
FIG. 73 is a flow chart for the routine that sounds the alarm when the cooking oil temperature exceeds a high limit of 410 degrees F.
Figure 74:
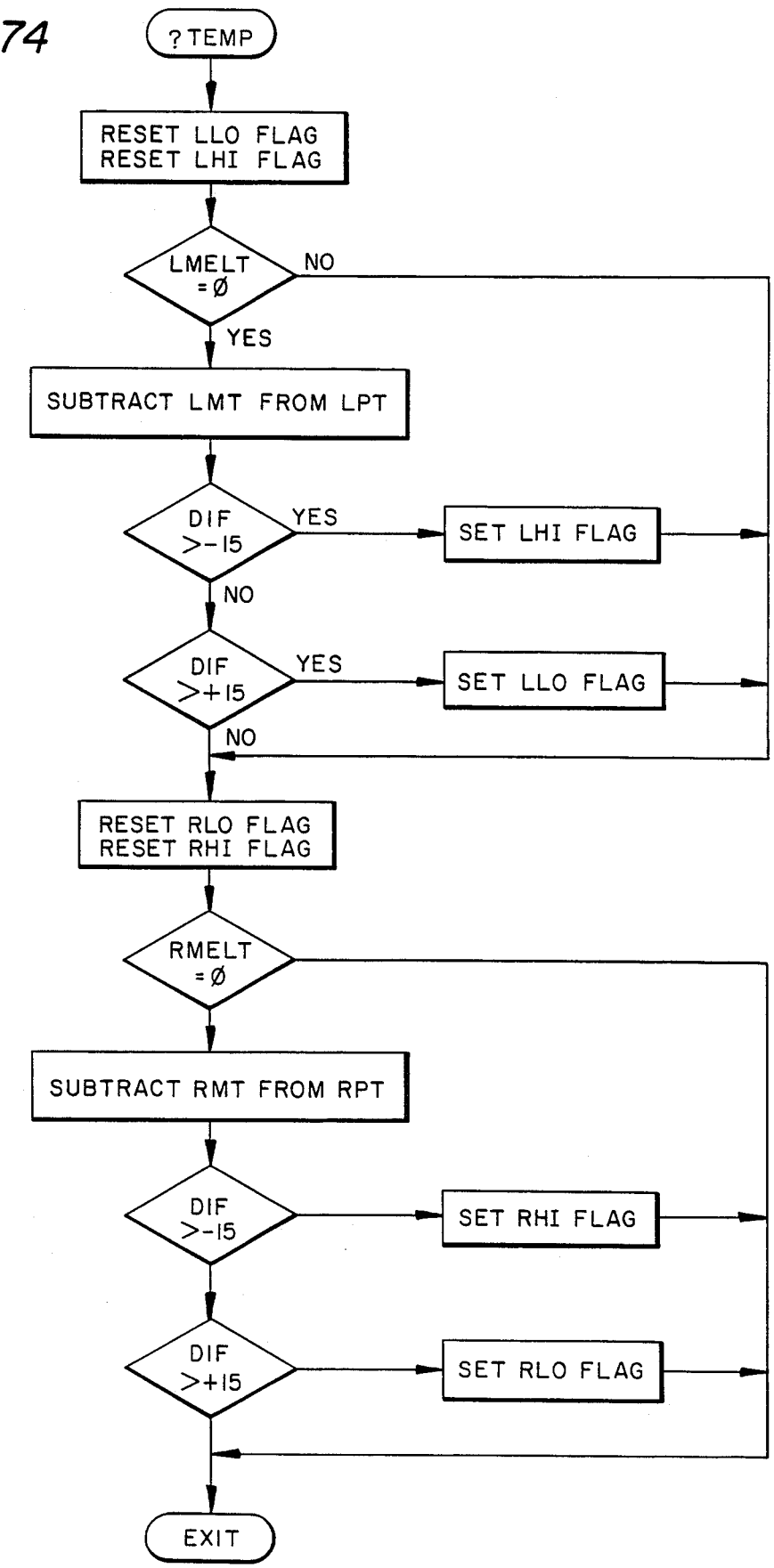
FIG. 74 is a flow chart for a procedure that displays an indication that the temperature of the cooking oil is 15 degrees above or below the set temperature point and if the temperature is within 15 degrees range of the set point dashes are displayed on the seven segment LED displays.

FIG. 61 is a flow chart for the melt cycle procedure routine. FIG. 62 is a flow chart for the heating cycle procedure that controls the heating of the vat from 180 degrees to 20 degrees below the designated operating temperature. FIGS. 63 through 67 are flow charts for the controlling routine which controls the rate of temperature rise and the amount of heat provided to the cooking oil. FIGS. 68 and 69 are flow charts for the gas valve control procedures routine. FIGS. 70 and 71 are flow charts for the procedure that computes the rate of temperature rise. FIG. 72 is a flow chart of the procedure that sounds the alarm when a bad probe is found. FIG. 72 is a flow chart for the routine that sounds the alarm when the cooking oil temperature exceeds a high limit of 410 degrees F. FIG. 74 is a flow chart for a procedure that displays an indication that the temperature of the cooking oil is 15 degrees above or below the set temperature point and if the temperature is within 15 degrees range of the set point dashes are displayed on the seven segment LED displays. FIG. 75 is a flow chart for a procedure that sounds the alarm when the pilot is not fired. Display 76 is a flow chart for a procedure that is activated when there is an input code access error.

While there has been described what are at present considered to be the preferred embodiments of the present invention, it will be obvious to those skilled in the art that various changes and modifications may be made therein without departing from the invention, and it is therefore intended to cover all such changes and modifications as fall within the spirit and scope of the invention.

What is claimed is:

1. A cooking appliance comprising:

heating means for providing heat to a cooking medium for cooking food;

temperature sensing means for detecting the cooking medium temperature and for generating a frequency proportional to the detected temperature;

control means connected to said temperature sensing means for receiving said frequency indicating the cooking medium temperature and for cooking the food according to data stored in the control means, by controlling the heating means, and said control means including temperature detect circuitry for detecting an excessive temperature of the cooking medium and providing an indication of the excessive temperature; and means responsive to said control means for removing the food from the cooking medium in accordance with said data.

2. A cooking appliance according to claim 1 wherein said control means includes input storage circuitry for allowing a user to input the data.

3. A cooking appliance according to claim 2 wherein said control means includes data processing means for computing cooking time and cooking temperature in accordance with a stored algorithm and the stored data.

4. A cooking appliance according to claim 3 wherein said input storage circuitry includes a nonvolatile random access memory for the storage of user input data.

5. A cooking appliance according to claim 4 wherein said control means includes a user output of visible indicia.

6. A cooking appliance according to claim 2 wherein said input storage circuitry further includes a cooking sensitivity input that alters the computation of said cooking temperature.

7. A cooking appliance comprising:
heating means for providing heat to a cooking medium for cooking food;
temperature sensing means for detecting the cooking medium temperature and for generating a frequency proportional to the detected temperature;
control means connected to said temperature sensing means for receiving said frequency indicating the cooking medium temperature and for cooking the food according to data stored in the control means, by controlling the heating means, said control means including input storage circuitry for allowing a user to input the data and a cooking sensitivity input that alters the computation of said temperature; and
means responsive to said control means removing the food from the cooking medium in accordance with said data.

8. A cooking appliance according to claim 7 wherein said control means includes data processing means for computing cooking time and cooking temperature in accordance with a stored algorithm and the stored data.

9. A cooking appliance according to claim 8 wherein said input storage circuitry includes a nonvolatile random access memory for the storage of user input data.

10. A cooking appliance according to claim 9 wherein said control means includes a user output of visible indicia.

11. A cooking appliance according to claim 7 wherein said control means further includes temperature detect circuitry for detecting an excessive temperature of the cooking medium and providing an indication of the excessive temperature.

12. A microprocessor controlled deep fat fryer, which comprises:
a frypot for storing a quantity of cooking oil;
means for heating the cooking oil contained in the frypot to cook a food product;
means for sensing the actual temperature of the cooking oil contained in the frypot;
and a microprocessor controller that is readily programmable by an operator in the field, including;
(a) means for permitting the operator to selectively program a set temperature;
(b) means for permitting the operator to selectively program an initial cooking time independent of the set temperature;
(c) means responsive to the initial cooking time and the sensing means for providing an adjusted cooking time whereby said initial cooking time is varied in response to differences between the actual temperature of the cooking oil and the set temperature; and,
(d) means for signalling the completion of the adjusted cooking time.

13. The deep fat fryer as claimed in claim 12, wherein said microprocessor controller includes:
means responsive to said sensing means for periodically sampling the actual temperature of the cooking oil.

14. The deep fat fryer as claimed in claim 13, wherein said means for providing said adjusted cooking time includes:
a first counter adapted to store a value representing said initial cooking time;
means for producing a value that is a function of the periodically sampled actual temperature of the cooking oil, said value being independent of the selected cooking time;
a second counter adapted to receive said value produced by said producing means;
and means responsive to said second counter for changing the value in said first counter to produce said adjusted cooking time.

15. The deep fat fryer as claimed in claim 14, wherein said means for changing the value in said first counter includes means for decrementing said first counter.

16. The deep fat fryer as claimed in claim 14, wherein said means for changing value in said first counter includes means for incrementing said first counter.

17. The deep fat fryer as claimed in claim 14, including means for decrementing said first counter at periodic regular intervals.

18. The deep fat fryer as claimed in claim 17, wherein said means for changing the value in said first counter includes means for decrementing said first counter when the contents of said second counter is equal to a first value and incrementing said first counter when the contents of said second counter is equal to a second value.

19. A microprocessor controlled deep fat fryer, which comprises:
a frypot having controllable means for heating cooking oil contained in the frypot;
temperature sensing means for producing a signal indicative of the actual cooking oil temperature;
memory means for storing cooking data, said cooking data including a set temperature and an initial cooking time; and,
processing means for adjusting the initial cooking time to compensate for variations between the actual cooking oil temperature and said set point, said processing means including,
(a) a first counter adapted to store a value representative of the selected initial cooking time,
(b) a second counter adapted to store a value related to the actual temperature of the cooking oil, and,
(c) means responsive to said second counter for operation said first counter.

20. The deep fat fryer as claimed in claim 19, wherein said means for operating said first counter includes means for decrementing said first counter when the value stored in said second counter is at least equal to a selected upper value and incrementing said first counter when the value stored in said second counter is at least equal to a selected lower value.

21. A microprocessor controlled deep fat fryer, which comprises:
a frypot for containing a quantity of cooking oil;

means for heating cooking oil contained in the frypot to cook a food product;

means for sensing the actual temperature of the cooking oil contained in the frypot;

and a microprocessor controller that is readily programmable by an operator in the field, including;

(a) means for permitting the operator to selectively input a set temperature;

(b) means for permitting the operator to selectively input an initial cooking time;

(c) means responsive to said sensing means for producing a value that is a function of the actual temperature sensed by the sensing means, said number being independent of the selected cooking time;

(d) means responsive to said value and said initial cooking time for producing an adjusted cooking time whereby said initial cooking time is varied in response to differences between set temperature and sensed temperature; and, (e) means for signalling the completion of said adjusted cooking time.

22. The deep fat fryer as claimed in claim 21, wherein said means for producing said adjusted cooking time includes a first counter adapted to store a value representative of said selected initial cooking time.

23. The deep fat fryer as claimed in claim 22, including a second counter adapted to store said value that is a function of the actual temperature.

24. A microprocessor controlled deep fat fryer, which comprises:

a frypot for containing a quantity of cooking oil;

means for heating cooking oil contained in the frypot to cook a food product;

means for sensing the actual temperature of the cooking oil contained in the frypot;

and a microprocessor controller that is readily programmable by an operator in the field, including;

(a) temperature input means for permitting the operator to selectively program a set temperature;

(b) time input means means for permitting the operator to selectively program an initial cooking time independent of the set temperature;

(c) a first counter responsive to said time input means to store a value representing said selected initial cooking time;

(d) means for periodically sampling the temperature sensed by the sensing means;

(e) means for producing a value that is a function of the sampled temperature, said value being independent of said initial cooking time;

(f) a second counter adapted to store said value that is a function of the sampled temperature;

(g) means responsive to said second counter for changing the value in said first counter to produce an adjusted cooking time whereby said initial cooking time is varied in response to differences between set tempeature and sampled temperature; and (h) means for signalling the completion of said adjusted cooking time.

25. The deep fat fryer as claimed in claim 24, wherein said value that is a function of sampled temperature is equal to the product of (i) the difference between the set temperature and the sampled temperature and (ii) a sensitivity factor.

26. The deep fat fryer as claimed in claim 25, wherein said means for changing the value in said first counter includes means for incrementing said first counter when the value in said second counter is equal the set temperature and decrementing said first counter when the value in said second counter is equal to the negative of the set temperature.

27. A deep fat fryer, which comprises:

a frypot having controllable heating means for heating cooking oil contained in the frypot;

temperature sensing means for producing a signal indicative of the actual cooking oil temperature;

memory means for storing cooking data, said cooking data including a set temperature and an initial cooking time; and, processing means for adjusting the temperature of the cooking oil, said processing means including, (a) means for periodically sampling the signal produced by said temperature sensing means, (b) means for computing from said periodically sampled signal a temperature and a rate of rise of the temperature of said cooking oil and, (c) means for operating said heating means responsive to said temperature and said computed rate of rise to adjust the temperature of the cooking oil to approach said set temperature.

28. The deep fat fryer as claimed in claim 27, wherein said means for operating said heating means includes:

means for projecting from the rate of rise of the temperature at a particular temperature the maximum temperature to which said cooking oil would rise if said heating means were immediately turned off;

and means for turning off said heating means if the extrapolated maximum temperature is at least equal to the set temperature.

29. The deep fat fryer as claimed in claim 27, wherein said processing means includes for adjusting said initial cooking time.

30. The deep fat fryer as claimed in claim 29, wherein said means for adjusting said initial cooking time includes:

counting means responsive to the signal produced by said temperature sensing means for periodically adjusted cooking time such that when the temperature of said cooking oil is greater than the set temperature, actual cooking time is decreased, and when the temperature of said cooking oil is less than the set temperature, actual cooking time is increased.

31. The deep fat fryer as claimed in claim 30, wherein said counting means includes:

a first counter adapted to store a value representative of initial cooking time; and a second counter adapted to store a value related to the actual temperature of the cooking oil.

32. The deep fat fryer as claimed in claim 31, including means for incrementing said first counter when the value store in said second counter is less than a selected lower value and decrementing said first counter when the value stored in said second counter is greater than a selected upper value.

33. A filed programmable microprocessor controlled deep fat fryer, which comprises:

a frypot for storing a quantity of cooking oil;

heating means for heating the cooking oil contained in the frypot to cook a food product;

sensor means for sensing the actual temperature of the cooking oil contained in the frypot;

a microprocessor controller connected to said sensing means and said heating means to control the temperature of the cooking oil and the time that a food product is cooked, said microprocessor controller including:

(a) memory means for storing cooking data, said cooking data including set temperatures and initial cooking times;
(b) user input means for permitting a user in the field to input cooking data to said memory means; and
(c) a central processing unit operably connected to said memory means and said sensor means, said central processing unit including means for controlling the heating means and for adjusting the initial cooking time to compensate for deviations of actual temperature from set temperature.

34. The deep fat fryer as claimed in claim 33, wherein said user input means includes a keyboard including a plurality of keys.

35. The deep fat fryer as claimed in claim 34, wherein said keyboard is mounted on a panel.

36. The deep fat fryer as claimed in claim 34, wherein said microprocessor controller includes security circuit means for allowing user input of cooking data only after a predetermined sequence of keys have been operated.

37. The deep fat fryer of claim 33 wherein said fryer and microprocessor are mounted within a common housing including a control panel accessible to a user, and wherein said user input means includes a plurality of programming keys for selectively entering programming information to provide said cooking data.

* * * * *